(12) United States Patent
Zhang et al.

(10) Patent No.: US 12,174,350 B2
(45) Date of Patent: Dec. 24, 2024

(54) OPTICAL IMAGING SYSTEM

(71) Applicant: ZHEJIANG SUNNY OPTICS CO., LTD., Zhejiang (CN)

(72) Inventors: Jiaying Zhang, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 735 days.

(21) Appl. No.: 17/506,711

(22) Filed: Oct. 21, 2021

(65) Prior Publication Data

US 2022/0128800 A1 Apr. 28, 2022

(30) Foreign Application Priority Data

Oct. 22, 2020 (CN) .......................... 202011140001.8

(51) Int. Cl.
*G02B 13/00* (2006.01)
*G02B 5/04* (2006.01)
*G02B 9/64* (2006.01)

(52) U.S. Cl.
CPC ........... *G02B 13/0045* (2013.01); *G02B 5/04* (2013.01); *G02B 9/64* (2013.01)

(58) Field of Classification Search
CPC ........ G02B 13/0045; G02B 5/04; G02B 9/64; G02B 13/0065; G02B 13/18; G02B 27/0012; G02B 13/005; G03B 30/00
USPC ....................................................... 359/755
See application file for complete search history.

(56) References Cited

U.S. PATENT DOCUMENTS

2017/0108669 A1* 4/2017 Kim ................... G02B 13/0065

FOREIGN PATENT DOCUMENTS

| CN | 107664830 A | 2/2018 |
| CN | 108873252 A | 11/2018 |
| CN | 108873255 A | 11/2018 |
| CN | 110187469 A | 8/2019 |
| CN | 110471164 A | 11/2019 |
| CN | 110858026 A | 3/2020 |
| CN | 111133357 A | 5/2020 |
| TW | 202433118 A * | 8/2019 |

OTHER PUBLICATIONS

Corresponding CN search results issued on Apr. 29, 2022.
Corresponding CN search results issued on Jul. 22, 2022.

* cited by examiner

*Primary Examiner* — Henry Duong
(74) *Attorney, Agent, or Firm* — Samson G. Yu

(57) ABSTRACT

The disclosure provides an optical imaging system, which has a first optical axis, a second optical axis perpendicular to the first optical axis and a third optical axis perpendicular to the second optical axis, the first optical axis is parallel to the third optical axis, the optical imaging system includes: a first imaging lens group, including a first refraction optical element that deflects light entering along a direction of the first optical axis to be propagated along a direction of the second optical axis; a second imaging lens group, sequentially including from an object side to an image side along the second optical axis a first lens to a seventh lens with refractive power; a third imaging lens group, including a second refraction optical element that deflects light entering along the direction of the second optical axis to be propagated along a direction of the third optical axis.

20 Claims, 31 Drawing Sheets longitudinal aberration curve astigmatism curve longitudinal aberration curve (millimeter)

lateral color curve longitudinal aberration curve (millimeter)

OPTICAL IMAGING SYSTEM

CROSS-REFERENCE TO RELATED PRESENT INVENTION(S)

The disclosure claims priority to and the benefit of Chinese Patent Present invention No. 202011140001.8, filed in the China National Intellectual Property Administration (CNIPA) on 22 Oct. 2020, which is incorporated herein by reference in its entirety.

TECHNICAL FIELD

The disclosure relates to the technical field of optical elements, and more particularly to an optical imaging system.

BACKGROUND

With the upgrading of consumer electronic products and the development of image software functions and video software functions in consumer electronic products, requirements of consumers on the shooting quality of electronic products such as mobile phones have been constantly increased. Meanwhile, consumers expect electronic products such as mobile phones to be lighter, thinner and have a characteristic of miniaturization.

Camera modules are usually arranged in portable devices such as mobile phones to endow the mobile phones with camera functions. There is usually arranged in a camera module a Charge-Coupled Device (CCD) type image sensor or a Complementary Metal Oxide Semiconductor (CMOS) type image sensor as well as an optical imaging system. The optical imaging system may converge light of an object side, imaged light follows a light path of the optical imaging system and irradiates the image sensor, and furthermore, the image sensor converts an optical signal into an electric signal to form image data.

The optical imaging system configured in the camera module includes a telephoto lens usually with a relatively long structure size. There is a need for an optical imaging system capable of combining an ultra-thin design, a large focal length and an ultra-low distortion, to satisfy a miniaturization requirement and an imaging requirement.

SUMMARY

An embodiment of the disclosure provides an optical imaging system, which sequentially includes from an object side to an image side along an optical axis: a first optical axis, a second optical axis perpendicular to the first optical axis and a third optical axis perpendicular to the second optical axis, wherein the first optical axis is parallel to the third optical axis, the optical imaging system includes: a first imaging lens group, arranged along the first optical axis and including a first refraction optical element configured to deflect light entering along a direction of the first optical axis to be propagated along a direction of the second optical axis; a second imaging lens group, sequentially including from an object side to an image side along the second optical axis: a first lens, a second lens, a third lens, a fourth lens, a fifth lens, a sixth lens and a seventh lens with refractive power respectively; and a third imaging lens group, arranged along the third optical axis and including a second refraction optical element configured to deflect light entering along the direction of the second optical axis to be propagated along a direction of the third optical axis; wherein TTLz is a distance from an object-side end of the first imaging lens group to an imaging surface of the optical imaging system in a direction parallel to the direction of the third optical axis, and TTLz and a total effective focal length f of the optical imaging system may satisfy TTLz/f<0.7.

In an implementation mode, an object-side surface of the first lens to an image-side surface of the seventh lens include at least one aspheric mirror surface.

In an implementation mode, an optical distortion Dist of the optical imaging system may satisfy |Dist|<0.1%.

In an implementation mode, an effective focal length f1 of the first lens and an effective focal length f4 of the fourth lens may satisfy 0<f1/f4<1.0.

In an implementation mode, an effective focal length f2 of the second lens, an effective focal length f6 of the sixth lens and an effective focal length f7 of the seventh lens may satisfy 0.5<(f2+f6)/f7<2.0.

In an implementation mode, the first refraction optical element is a first prism, and the second refraction optical element is a second prism.

In an implementation mode, $\Sigma CT$ is a sum of thicknesses of any lens in the first lens to the seventh lens on the second optical axis, PL1 is a sum of a thickness of the first prism on the first optical axis and a thickness of the first prism on the second optical axis, and $\Sigma CT$ and PL1 may satisfy $0.5<\Sigma CT/PL1<1.0$.

In an implementation mode, $\Sigma AT$ is a sum of spacing distances of any two adjacent lenses in the first lens to the seventh lens on the second optical axis, PL2 is a sum of a thickness of the second prism on the second optical axis and a thickness of the second prism on the third optical axis, and $\Sigma AT$ and PL2 may satisfy $0.3<\Sigma AT/PL2<0.8$.

In an implementation mode, a curvature radius R1 of an object-side surface of the first lens, a curvature radius R3 of an object-side surface of the second lens and a curvature radius R4 of an image-side surface of the second lens may satisfy 0.3<R1/(R3−R4)<1.3.

In an implementation mode, a curvature radius R6 of an image-side surface of the third lens and a curvature radius R7 of an object-side surface of the fourth lens may satisfy 0.5<R6/R7<1.5.

In an implementation mode, a curvature radius R14 of an image-side surface of the seventh lens and the total effective focal length f of the optical imaging system may satisfy 0<R14/f<1.0.

In an implementation mode, a center thickness CT1 of the first lens on the second optical axis, a center thickness CT6 of the sixth lens on the second optical axis and a center thickness CT7 of the seventh lens on the second optical axis may satisfy 0<CT6/(CT1+CT7)<1.0.

In an implementation mode, a center thickness CT4 of the fourth lens on the second optical axis, a center thickness CT5 of the fifth lens on the second optical axis and a spacing distance T45 of the fourth lens and the fifth lens on the second optical axis may satisfy 0.6<(CT4+CT5)/T45<1.6.

In an implementation mode, the first lens has a positive refractive power, and an object-side surface thereof is a convex surface; the second lens has a negative refractive power; an image-side surface of the third lens is a concave surface; the fourth lens has a positive refractive power, and an object-side surface thereof is a convex surface; and an image-side surface of the seventh lens is a concave surface.

Another embodiment of the disclosure provides an optical imaging system, which has a first optical axis, a second optical axis perpendicular to the first optical axis and a third optical axis perpendicular to the second optical axis, wherein the first optical axis is parallel to the third optical axis, the optical imaging system includes: a first imaging lens group, arranged along the first optical axis and including a first refraction optical element configured to deflect light entering along a direction of the first optical axis to be propagated along a direction of the second optical axis; a second imaging lens group, sequentially including from an object side to an image side along the second optical axis: a first lens, a second lens, a third lens, a fourth lens, a fifth lens, a sixth lens and a seventh lens with refractive power respectively; and a third imaging lens group, arranged along the third optical axis and including a second refraction optical element configured to deflect light entering along the direction of the second optical axis to be propagated along a direction of the third optical axis; wherein an optical distortion Dist of the optical imaging system may satisfy |Dist|<0.1%.

In an implementation mode, an effective focal length f1 of the first lens and an effective focal length f4 of the fourth lens may satisfy 0<f1/f4<1.0.

In an implementation mode, TTLz is a distance from an object-side end of the first imaging lens group to an imaging surface of the optical imaging system in a direction parallel to the direction of the third optical axis, and TTLz and a total effective focal length f of the optical imaging system may satisfy TTLz/f<0.7.

In an implementation mode, an effective focal length f2 of the second lens, an effective focal length f6 of the sixth lens and an effective focal length f7 of the seventh lens may satisfy 0.5<(f2+f6)/f7<2.0.

In an implementation mode, the first refraction optical element is a first prism, and the second refraction optical element is a second prism.

In an implementation mode, ΣCT is a sum of thicknesses of any lens in the first lens to the seventh lens on the second optical axis, PL1 is a sum of a thickness of the first prism on the first optical axis and a thickness of the first prism on the second optical axis, and ΣCT and PL1 may satisfy 0.5<ΣCT/PL1<1.0.

In an implementation mode, ΣAT is a sum of spacing distances of any two adjacent lenses in the first lens to the seventh lens on the second optical axis, PL2 is a sum of a thickness of the second prism on the second optical axis and a thickness of the second prism on the third optical axis, and ΣAT and PL2 may satisfy 0.3<ΣAT/PL2<0.8.

In an implementation mode, a curvature radius R1 of an object-side surface of the first lens, a curvature radius R3 of an object-side surface of the second lens and a curvature radius R4 of an image-side surface of the second lens may satisfy 0.3<R1/(R3−R4)<1.3.

In an implementation mode, a curvature radius R6 of an image-side surface of the third lens and a curvature radius R7 of an object-side surface of the fourth lens may satisfy 0.5<R6/R7<1.5.

In an implementation mode, a curvature radius R14 of an image-side surface of the seventh lens and a total effective focal length f of the optical imaging system may satisfy 0<R14/f<1.0.

In an implementation mode, a center thickness CT1 of the first lens on the second optical axis, a center thickness CT6 of the sixth lens on the second optical axis and a center thickness CT7 of the seventh lens on the second optical axis may satisfy 0<CT6/(CT1+CT7)<1.0.

In an implementation mode, a center thickness CT4 of the fourth lens on the second optical axis, a center thickness CT5 of the fifth lens on the second optical axis and a spacing distance T45 of the fourth lens and the fifth lens on the second optical axis may satisfy 0.6<(CT4+CT5)/T45<1.6.

In an implementation mode, the first lens has a positive refractive power, and an object-side surface thereof is a convex surface; the second lens has a negative refractive power; an image-side surface of the third lens is a concave surface; the fourth lens has a positive refractive power, and an object-side surface thereof is a convex surface; and an image-side surface of the seventh lens is a concave surface.

According to the disclosure, the refraction optical elements and the seven lenses are adopted. With the arrangement of the prisms, an incidence direction of light forms a 90° included angle with the arrangement direction of the multiple lenses, so that the size of the optical imaging system in the incidence direction of light is reduced. In addition, the refractive power and surface types of each lens, the center thickness of each lens, on-axis spacing distances between the lenses and the like are reasonably configured to achieve at least one beneficial effect of large focal length, ultra-low distortion and the like of the optical imaging system.

BRIEF DESCRIPTION OF THE DRAWINGS

Detailed descriptions are made to unrestrictive embodiments below in combination with the drawings to make the other features, objectives and advantages of the disclosure more apparent. In the drawings.

DETAILED DESCRIPTION OF THE EMBODIMENTS

Figure 1:
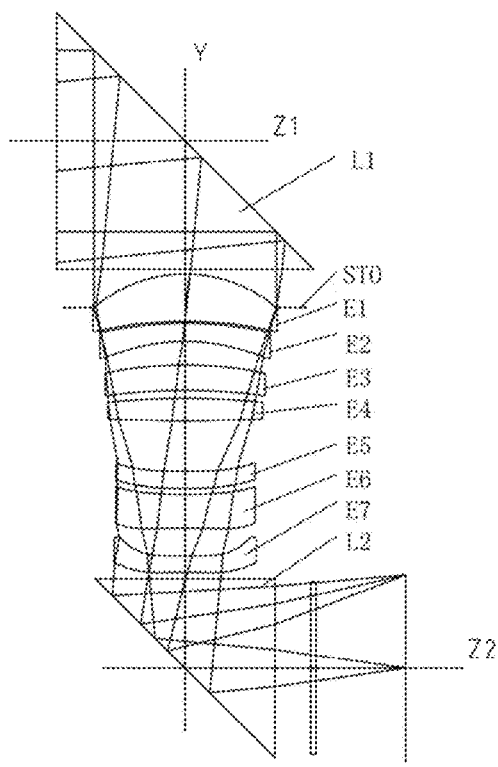
FIG. 1 shows a structural schematic diagram of an optical imaging system according to an embodiment of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings as commonly understood by those of ordinary skill in the art of the disclosure. It should also be understood that the terms (for example, terms defined in a common dictionary) should be explained to have the same meanings as those in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging system according to the exemplary embodiment of the disclosure may include, for example, three imaging lens groups, i.e., a first imaging lens group, a second imaging lens group and a third imaging lens group. The three imaging lens groups may be sequentially arranged from an object side to an image side along a total optical axis.

Referring to FIG. 1, the optical imaging system may have a first optical axis Z1, a second optical axis Y and a third optical axis Z2. The first optical axis Z1 and the third optical axis Z2 are parallel to each other and perpendicular to the second optical axis Y respectively. More specifically, the first optical axis Z1 and the third optical axis Z2 are intersected with the second optical axis Y respectively.

The first imaging lens group is arranged along the first optical axis Z1 and includes a first refraction optical element L1. The first refraction optical element L1 is configured to deflect light entering along a direction of the first optical axis Z1 to be propagated along a direction of the second optical axis Y.

The second imaging lens group may include seven lenses with refractive power, i.e., a first lens E1, a second lens E2, a third lens E3, a fourth lens E4, a fifth lens E5, a sixth lens E6 and a sixth lens E7. The seven lenses are sequentially arranged from an object side to an image side along the second optical axis Y. There may be an air space between any two adjacent lenses in the first lens E1 to the seventh lens E7.

The third imaging lens group is arranged along the third optical axis Z2 and includes a second refraction optical element L2. The second refraction optical element L2 is configured to deflect light entering along the second optical axis Y to be along a direction of the third optical axis Z2.

The optical imaging system provided in the disclosure has a periscopic structure.

In the exemplary embodiment, the first lens E1 may have a positive refractive power, and an object-side surface thereof may be a convex surface; the second lens E2 may have a negative refractive power; exemplarily, the third lens E3 has a positive refractive power or a negative refractive power, and an image-side surface thereof may be a concave surface; the fourth lens E4 may have a positive refractive power, and an object-side surface thereof may be a convex surface; the fifth lens E5 has a positive refractive power or a negative refractive power; the sixth lens E6 has a positive refractive power or a negative refractive power; the seventh lens E7 has a positive refractive power or a negative refractive power, and an image-side surface thereof may be a concave surface. The first lens E1 with the positive refractive power, the second lens E2 with the negative refractive power and the fourth lens E4 with the positive refractive power may converge light better. In addition, the refractive power of the first lens E1, the second lens E2 and the fourth lens E4 are configured reasonably to help to improve a total effective focal length of the optical imaging system and ensure a telephoto property of the optical imaging system. Moreover, concave and convex surfaces of each lens of the optical imaging system may be controlled to effectively avoid the generation of ghost images and also help to improve a field curvature of the optical imaging system.

According to the optical imaging system provided in the disclosure, the distribution of elements of the first optical imaging lens, the second imaging lens group and the third imaging lens group is controlled to help to achieve the characteristic of ultra-low distortion of the optical imaging system.

In the exemplary embodiment, the optical imaging system of the disclosure may satisfy a conditional expression TTLz/f<0.7, wherein TTLz is a distance from an object-side end of the first imaging lens group to an imaging surface of the optical imaging system in a direction parallel to the direction of the third optical axis Z2 (i.e., in the direction of the first optical axis Z1), and f is a total effective focal length of the optical imaging system. The optical imaging system satisfies TTLz/f<0.7, so that a total length of the optical imaging system in the direction of the third optical axis Z2 may be controlled reasonably under the condition of increasing the total effective focal length of the system to further implement miniaturization. More specifically, TTLz and f may satisfy 0.51<TTLz/f<0.59.

In the exemplary embodiment, the optical imaging system of the disclosure may satisfy a conditional expression |Dist|<0.1%, wherein Dist is an optical distortion of the optical imaging system. The optical imaging lens satisfies |Dist|<0.1%, so that the characteristic of ultra-low distortion may be achieved, reduction in an aberration of the optical imaging system is facilitated, and furthermore, the imaging quality of the optical imaging system is greatly improved. When used, the optical imaging system with an ultra-low optical distortion may maximally restore a real feature of an object. More specifically, Dist may satisfy |Dist|<0.08%.

In the exemplary embodiment, the optical imaging system of the disclosure may satisfy a conditional expression 0<f1/f4<1.0, wherein f1 is an effective focal length of the first lens E1, and f4 is an effective focal length of the fourth lens E4. A ratio of the effective focal length of the first lens E1 to the effective focal length of the fourth lens E4 may be controlled in this range to reasonably control a refractive power contribution rate of the fourth lens E4 and balance a high-order spherical aberration generated by the optical imaging system. More specifically, f1 and f4 may satisfy 0.33<f1/f4<0.82.

In the exemplary embodiment, the optical imaging system of the disclosure may satisfy a conditional expression 0.5<(f2+f6)/f7<2.0, wherein f2 is an effective focal length of the second lens E2, f6 is an effective focal length of the sixth lens E6, and f7 is an effective focal length of the seventh lens E7. The optical imaging system satisfies 0.5<(f2+f6)/f7<2.0, so that the refractive power thereof may be distributed reasonably to effectively improve the total effective focal length, and meanwhile, the aberration thereof may be corrected well to further improve the imaging quality. More specifically, f2, f6 and f7 may satisfy 0.75<(f2+f6)/f7<1.52.

In the exemplary embodiment, the first refraction optical element L1 may be a first prism. The first prism includes an incidence surface on the first optical axis Z1, an emergence surface on the third optical axis Z2, and a reflecting surface between the incidence surface and the emergence surface. The reflecting surface may form a 45° included angle with the first optical axis Z1 to reflect light entering along the direction of the first optical axis Z1 by 90°.

In the exemplary embodiment, the second refraction optical element L2 may be a second prism. The second prism includes an incidence surface on the second optical axis Y, an emergence surface on the third optical axis Z2, and a reflecting surface between the incidence surface and the emergence surface. An included angle between the reflecting surface of the second prism and the second optical axis Y may be 45°. The second prism may be configured to deflect light entering along the second optical axis Y by 90°.

In the exemplary embodiment, the optical imaging system of the disclosure may satisfy a conditional expression 0.5<ΣCT/PL1<1.0, wherein ΣCT is a sum of thicknesses of any lens in the first lens E1 to the seventh lens E7 on the second optical axis Y, and PL1 is a sum of a thickness of the first prism on the first optical axis Z1 and a thickness of the first prism on the second optical axis Y. Exemplarily, ΣCT=CT1+CT2+CT3+CT4+CT5+CT6+CT7, wherein CT1 is a center thickness of the first lens E1 on the second optical axis Y. Exemplarily, the thickness of the first prism on the first optical axis Z1 is equal to a spacing distance of the incidence surface and the reflecting surface of the first prism on the first optical axis Z1. The optical imaging system satisfies 0.5<ΣCT/PL1<1.0, so that an incidence angle of light may be controlled well, and meanwhile, the optical total length of the optical imaging system in the direction of the second optical axis Y is favorably controlled to further reduce the length of the optical imaging system in the direction of the second optical axis Y. More specifically, ΣCT and PL1 may satisfy 0.66<ΣCT/PL1<0.85.

In the exemplary embodiment, the optical imaging system of the disclosure may satisfy a conditional expression 0.3<ΣAT/PL2<0.8, wherein ΣAT is a sum of spacing distances of any two adjacent lenses in the first lens E1 to the seventh lens E7 on the second optical axis Y, and PL2 is a sum of a thickness of the second prism on the second optical axis Y and a thickness of the second prism on the third optical axis Z2. Exemplarily, ΣAT=T12+T23+T34+T45+T56+T67. The optical imaging system satisfies 0.3<ΣAT/PL2<0.8, so that emergence angles of light at the first lens E1 to the seventh lens E7 may be controlled effectively to make the structure of the optical imaging system more compact and further miniaturize the optical imaging system. More specifically, ΣAT and PL2 may satisfy 0.50<ΣAT/PL2<0.70.

In the exemplary embodiment, the optical imaging system of the disclosure may satisfy a conditional expression 0.3<R1/(R3−R4)<1.3, wherein R1 is a curvature radius of an object-side surface of the first lens E1, R3 is a curvature radius of an object-side surface of the second lens E2, and R4 is a curvature radius of an image-side surface of the second lens E2. The optical imaging system satisfies 0.3<R1/(R3−R4)<1.3, so that a chromatic aberration thereof may be corrected better to further improve the imaging quality, and meanwhile, the problem of higher system tolerance sensitivity caused by the excessive concentration of the refractive power or the overbending of the surface may be solved. More specifically, R1, R3 and R4 may satisfy 0.55<R1/(R3−R4)<1.00.

In the exemplary embodiment, the optical imaging system of the disclosure may satisfy a conditional expression 0.5<R6/R7<1.5, wherein R6 is a curvature radius of an image-side surface of the third lens E3, and R7 is a curvature radius of an object-side surface of the fourth lens E4. The optical imaging system satisfies 0.5<R6/R7<1.5, so that a light angle in a marginal field of view may be controlled in a reasonable range, and the sensitivity of the optical imaging system may be reduced effectively. More specifically, R6 and R7 may satisfy 0.8<R6/R7<1.25.

In the exemplary embodiment, the optical imaging system of the disclosure may satisfy a conditional expression 0<R14/f<1.0, wherein R14 is a curvature radius of an image-side surface of the seventh lens E7, and f is the total effective focal length of the optical imaging system. The optical imaging system satisfies 0<R14/f<1.0, so that a contribution of the seventh lens E7 to a fifth-order spherical aberration of the optical imaging system may be controlled well to further compensate a third-order spherical aberration of the optical imaging system to achieve high on-axis imaging quality of the optical imaging system. More specifically, R14 and f may satisfy 0.35<R14/f<0.85.

In the exemplary embodiment, the optical imaging system of the disclosure may satisfy a conditional expression 0<CT6/(CT1+CT7)<1.0, wherein CT1 is a center thickness of the first lens E1 on the second optical axis Y, CT6 is a center thickness of the sixth lens E6 on the second optical axis Y, and CT7 is a center thickness of the seventh lens E7 on the second optical axis Y. The optical imaging system satisfies 0<CT6/(CT1+CT7)<1.0, so that distortion contributions in each field of view of the optical imaging system may be controlled in a reasonable range to improve the imaging quality of the optical imaging system. More specifically, CT1, CT6 and CT7 may satisfy 0.24<CT6/(CT1+CT7)<0.55.

In the exemplary embodiment, the optical imaging system of the disclosure may satisfy a conditional expression 0.6<(CT4+CT5)/T45<1.6, wherein CT4 is a center thickness of the fourth lens E4 on the second optical axis Y, CT5 is a center thickness of the fifth lens E5 on the second optical axis Y, and T45 is a spacing distance of the fourth lens E4 and the fifth lens E5 on the second optical axis Y. The optical imaging system satisfies 0.6<(CT4+CT5)/T45<1.6, so that a field curvature in each field of view may be improved to control contributions of the fourth lens E4 and the fifth lens E5 to the field curvature in a reasonable range. More specifically, CT4, CT5 and T45 may satisfy 0.78<(CT4+CT5)/T45<1.47.

In the exemplary embodiment, the optical imaging system may further include at least one diaphragm STO. The diaphragm STO may be arranged at a proper position as required, for example, arranged between the object side and the first lens E1. More specifically, the diaphragm STO may be arranged on the second optical axis Y. Optionally, the optical imaging system may further include an optical filter configured to correct a chromatic aberration and/or a protective glass configured to protect a photosensitive element on the imaging surface.

The optical imaging system according to the embodiments of the disclosure may adopt multiple lenses, for example, the above-mentioned nine. The refractive power and surface types of each lens, the center thickness of each lens, on-axis spacing distances between the lenses and the like are reasonably configured to effectively reduce the size of the optical imaging system, reduce the sensitivity of the optical imaging system and improve the machinability of the optical imaging system such that the optical imaging system is more favorable for production and machining and applicable to a portable electronic product. With the adoption of the first refraction optical element L1 and the second refraction optical element L2, the optical imaging system has three optical axes, and the size of the optical imaging system in a normal direction of the imaging surface is reduced. In addition, the optical imaging system of the disclosure also has high optical performance such as large focal length, ultra-low distortion and high imaging quality.

In an embodiment of the disclosure, at least one of mirror surfaces of each lens is an aspheric mirror surface, namely at least one of an object-side surface of the first lens E1 to an image-side surface of the seventh lens E7 is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatism aberrations during imaging may be eliminated as much as possible, thereby improving the imaging quality. More specifically, at least one of the object-side surface and the image-side surface of each lens in the first lens E1, the second lens E2, the third lens E3, the fourth lens E4, the fifth lens E5, the sixth lens E6 and the seventh lens E7 is an aspheric mirror surface. More specifically, both the object-side surface and the image-side surface of each lens in the first lens E1, the second lens E2, the third lens E3, the fourth lens E4, the fifth lens E5, the sixth lens E6 and the seventh lens E7 are aspheric mirror surfaces.

However, those skilled in the art should know that the number of the lenses forming the optical imaging system may be changed without departing from the technical solutions claimed in the disclosure to achieve each result and advantage described in the specification. For example, although descriptions are made in the embodiment with seven lenses as an example, the optical imaging system is not limited to include seven lenses. If necessary, the optical imaging system may also include another number of lenses.

Specific embodiments applied to the optical imaging system of the above-mentioned embodiments will further be described below with reference to the drawings.

Embodiment 1

Figure 2:
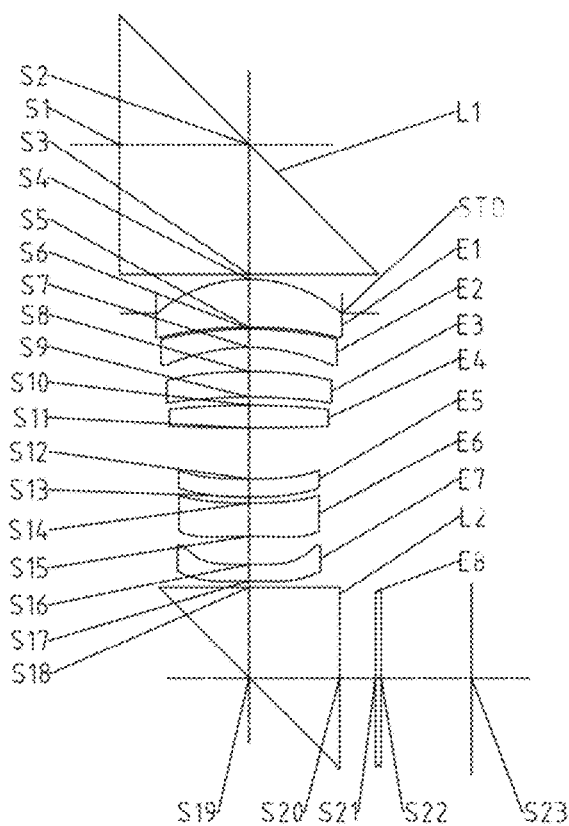
FIG. 2 shows a structural schematic diagram of an optical imaging system according to Embodiment 1 of the disclosure.

An optical imaging system according to Embodiment 1 of the disclosure will be described below with reference to FIGS. 2-3D and FIG. 22A. FIG. 2 shows a structural schematic diagram of an optical imaging system according to Embodiment 1 of the disclosure.

As shown in FIG. 2, the optical imaging system sequentially includes from an object side to an image side along a second optical axis: a first prism L1, a diaphragm STO, a first lens E1, a second lens E2, a third lens E3, a fourth lens E4, a fifth lens E5, a sixth lens E6, a seventh lens E7, a second prism L2 and an optical filter E8. The first prism L1 is a first refraction optical element in a first imaging lens group, the second prism L2 is a second refraction optical element in a second imaging lens group.

The first prism L1 includes an incidence surface S1, a reflecting surface S2 and an emergence surface S3. The first lens E1 has a positive refractive power, an object-side surface S4 thereof is a convex surface, and an image-side surface S5 is a concave surface. The second lens E2 has a negative refractive power, an object-side surface S6 thereof is a convex surface, and an image-side surface S7 is a concave surface. The third lens E3 has a negative refractive power, an object-side surface S8 thereof is a concave surface, and an image-side surface S9 is a convex surface. The fourth lens E4 has a positive refractive power, an object-side surface S10 thereof is a convex surface, and an image-side surface S11 is a concave surface. The fifth lens E5 has a positive refractive power, an object-side surface S12 thereof is a concave surface, and an image-side surface S13 is a convex surface. The sixth lens E6 has a negative refractive power, an object-side surface S14 thereof is a concave surface, and an image-side surface S15 is a convex surface. The seventh lens E7 has a negative refractive power, an object-side surface S16 thereof is a convex surface, and an image-side surface S17 is a concave surface. The second prism L2 includes an incidence surface S18, a reflecting surface S19, and an emergence surface S20. The optical filter E8 has an object-side surface S21 and an image-side surface S22. The optical imaging system has an imaging surface S23. Light from an object penetrates through the incidence surface S1 of the first prism L1 along a first optical axis, sequentially penetrates through each of the surfaces S3 to S18 after deflected by the reflecting surface S2 of the first prism L1 to be along the second optical axis, then sequentially penetrates through each of the surfaces S20 to S21 after deflected by the reflecting surface S19 of the second prism L2 to be along a third optical axis, and is finally imaged on the imaging surface S23.

Table 1 shows a basic parameter table of the optical imaging system of Embodiment 1, wherein the units of the curvature radius, the thickness/distance and the focal length are all millimeters (mm).

In Embodiment 1, a value of a total effective focal length f of the optical imaging system is 24.90 mm. TTLz is an on-axis distance from the object-side surface S1 of the first prism L1 to the imaging surface S23 on the first optical axis (or a normal direction of the imaging surface S23), and a value of TTLz is 13.59 mm. ImgH is a half of a diagonal length of an effective pixel region on the imaging surface S23, and a value of ImgH is 3.65 mm. FOV is a maximum field of view, and a value of FOV is 16.7°.

In Embodiment 1, both the object-side surface and the image-side surface of any lens in the first lens E1 to the seventh lens E7 are aspheric surfaces, and a surface type x of each aspheric lens may be defined through but not limited to, the following aspheric surface formula:

$$x = \frac{ch^2}{1+\sqrt{1-(k+1)c^2h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1 above); k is a conic coefficient; and Ai is a correction coefficient of the i-th order of the aspheric surface. Table 2 shows high-order coefficients A4, A6, A8, A10, A12, A14, A16, A18 and A20 that can be used for each of the aspheric mirror surfaces S4 to S17 in Embodiment 1.

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Spherical | Infinite | 5.0000 | 1.52 | 64.2 | | |
| S2 | Spherical | Infinite | 5.0000 | 1.52 | 64.2 | | |
| S3 | Spherical | Infinite | 1.5000 | | | | |
| STO | Spherical | Infinite | −1.3103 | | | | |
| S4 | Aspheric | 5.4864 | 1.8593 | 1.55 | 56.1 | 12.60 | 0.0034 |
| S5 | Aspheric | 23.8413 | 0.0601 | | | | 2.3325 |
| S6 | Aspheric | 13.5335 | 0.7129 | 1.67 | 19.2 | −23.25 | 0.6333 |
| S7 | Aspheric | 7.1225 | 0.9366 | | | | −0.0343 |
| S8 | Aspheric | 24.9984 | 0.9869 | 1.55 | 56.1 | −347.97 | −0.8101 |
| S9 | Aspheric | 21.7831 | 0.3105 | | | | 4.2142 |
| S10 | Aspheric | 26.6121 | 0.8786 | 1.55 | 56.1 | 28.91 | −7.6150 |
| S11 | Spherical | −38.3380 | 1.9729 | | | | −99.0000 |
| S12 | Spherical | −51.8353 | 0.6819 | 1.67 | 19.2 | 61.00 | 8.9996 |
| S13 | Spherical | −23.1054 | 0.2352 | | | | 19.6206 |
| S14 | Aspheric | 13.5765 | 1.2812 | 1.55 | 56.1 | −17.81 | −2.4573 |
| S15 | Aspheric | 35.3763 | 1.0889 | | | | 93.2392 |
| S16 | Aspheric | 53.9753 | 0.6480 | 1.55 | 56.1 | −46.69 | −20.8085 |
| S17 | Aspheric | 17.2384 | 0.2466 | | | | −61.2236 |
| S18 | Spherical | Infinite | 3.5000 | 1.52 | 64.2 | | |
| S19 | Spherical | Infinite | 3.5000 | 1.52 | 64.2 | | |
| S20 | Spherical | Infinite | 1.3882 | | | | |
| S21 | Spherical | Infinite | 0.2100 | 1.52 | 64.2 | | |
| S22 | Spherical | Infinite | 3.4911 | | | | |
| S23 | Spherical | Infinite | | | | | |

TABLE 2

| Surface number | A4 | A6 | A8 | A10 | A12 | A14 | A16 | A18 | A20 |
|---|---|---|---|---|---|---|---|---|---|
| S4 | −1.1861E−02 | 7.7705E−03 | −6.6749E−04 | 1.8243E−04 | 1.1754E−04 | 1.4394E−06 | 2.4694E−05 | −2.5345E−06 | −1.4287E−07 |
| S5 | −1.5219E−01 | 2.2492E−02 | −5.1892E−03 | 1.9543E−03 | 2.5537E−04 | 4.6528E−04 | 1.5384E−04 | 1.9590E−04 | 2.2980E−05 |
| S6 | 4.8926E−02 | −4.0554E−03 | −2.0266E−04 | 6.9919E−04 | 7.6382E−05 | 6.0410E−04 | 5.3238E−06 | 2.3865E−04 | −4.9899E−07 |
| S7 | 7.9294E−02 | 4.9971E−03 | −3.2761E−04 | 2.8785E−04 | 4.5860E−05 | 2.9193E−04 | −1.5919E−04 | 7.5034E−05 | −1.4106E−05 |
| S8 | −1.4971E−01 | 2.1576E−02 | −4.3995E−03 | 3.1183E−03 | 8.1852E−05 | −1.3421E−04 | −1.9384E−04 | −4.9398E−05 | −1.3694E−05 |
| S9 | 1.7348E−02 | −1.0710E−02 | 5.7220E−03 | −4.7958E−04 | 6.5289E−04 | −6.2545E−04 | −1.3327E−04 | −2.5065E−04 | −9.7488E−05 |
| S10 | 1.3291E−02 | −6.5059E−03 | 1.6472E−03 | −1.5786E−03 | 1.2557E−03 | 8.7197E−05 | 8.6138E−05 | −2.6093E−04 | −1.4986E−04 |
| S11 | −5.4383E−02 | 2.0826E−02 | −4.7158E−03 | 1.9247E−03 | 3.4401E−04 | 4.4098E−04 | 6.9352E−05 | −7.6997E−05 | −6.2396E−05 |
| S12 | 2.3716E−01 | −1.0775E−02 | 4.4549E−03 | 3.4547E−03 | −6.0281E−04 | 4.9032E−04 | 3.9764E−05 | −3.7139E−06 | −1.8888E−05 |
| S13 | 1.8869E−01 | −1.8208E−02 | 3.1344E−03 | 2.9688E−03 | −6.0415E−04 | 6.3004E−04 | 1.3454E−04 | 2.8498E−05 | −5.1316E−05 |
| S14 | 6.5010E−03 | 3.0237E−02 | −8.3535E−03 | 1.0017E−03 | 2.9278E−05 | 7.5919E−05 | 3.1750E−04 | 1.0655E−04 | −2.3563E−05 |
| S15 | 2.5666E−01 | 4.3554E−02 | −7.0824E−03 | −4.4200E−04 | −5.9752E−04 | −3.4489E−04 | 1.9843E−04 | 3.7821E−05 | −1.0416E−05 |
| S16 | 7.9437E−01 | −2.2172E−02 | −5.0804E−03 | −3.6383E−03 | −1.6875E−03 | −4.2371E−04 | 1.3572E−04 | 8.7842E−05 | 6.8500E−06 |
| S17 | 5.9105E−01 | −5.8089E−02 | −5.0511E−04 | −1.9611E−03 | −8.0377E−04 | −2.3974E−04 | −4.1964E−05 | −4.1088E−05 | −2.0416E−05 |

Figure 3A:
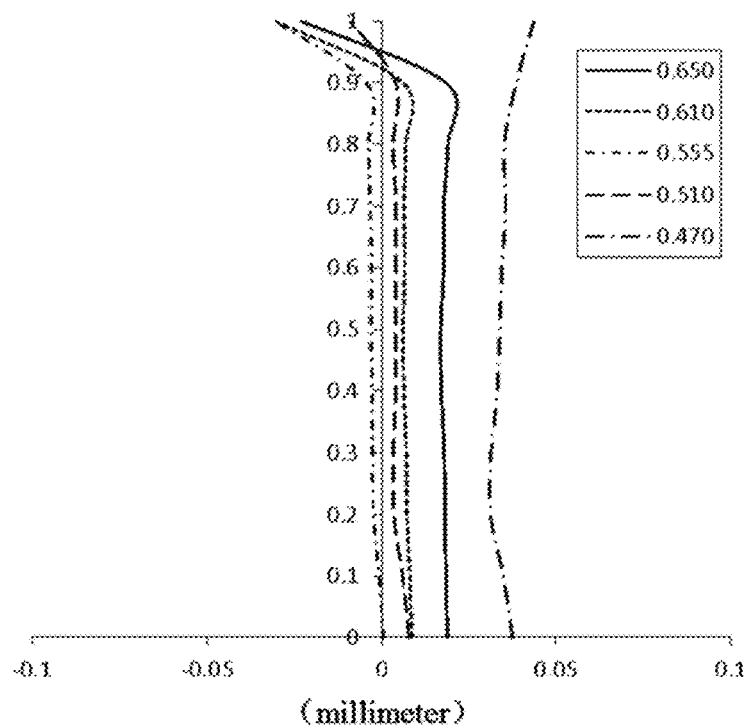
FIGS. 3A-3D show a longitudinal aberration curve, an astigmatism curve, a distortion curve and a lateral color curve of an optical imaging system according to Embodiment 1 respectively.
Figure 3B:
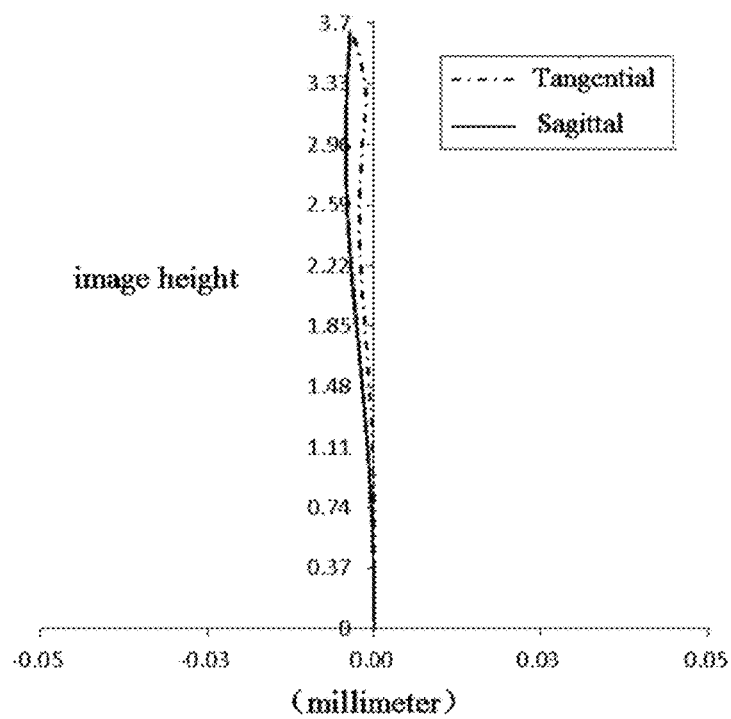
Figure 3C:
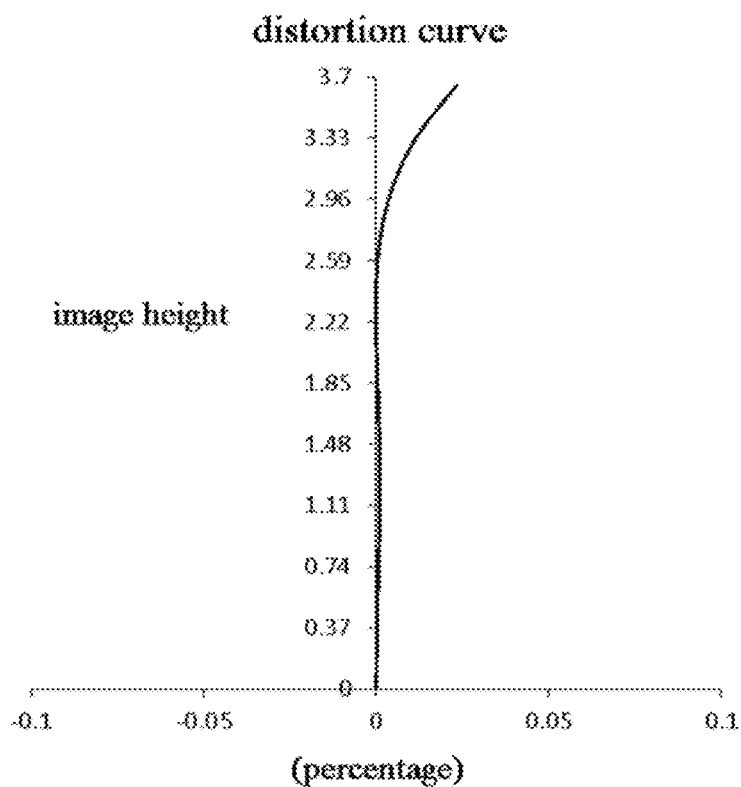
Figure 3D:
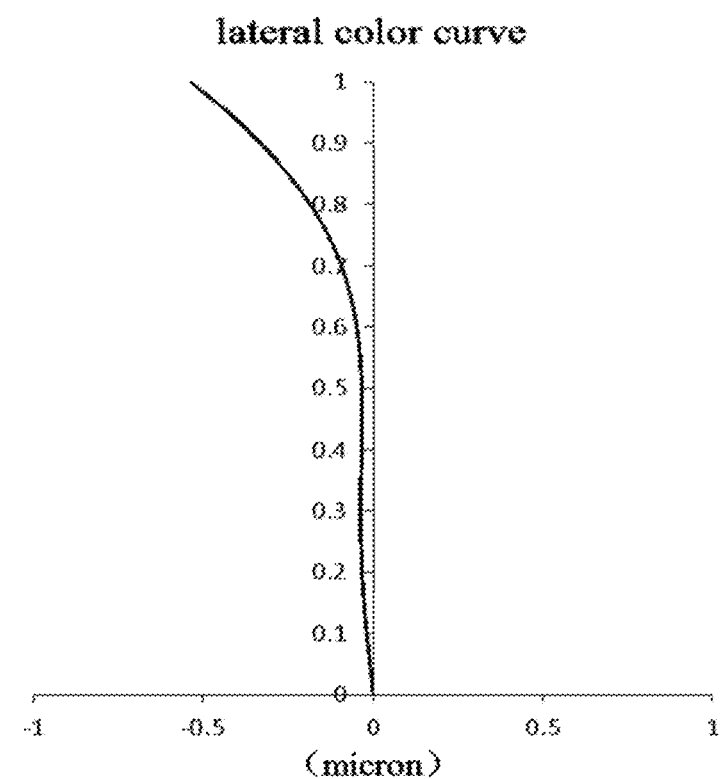
Figure 22A:
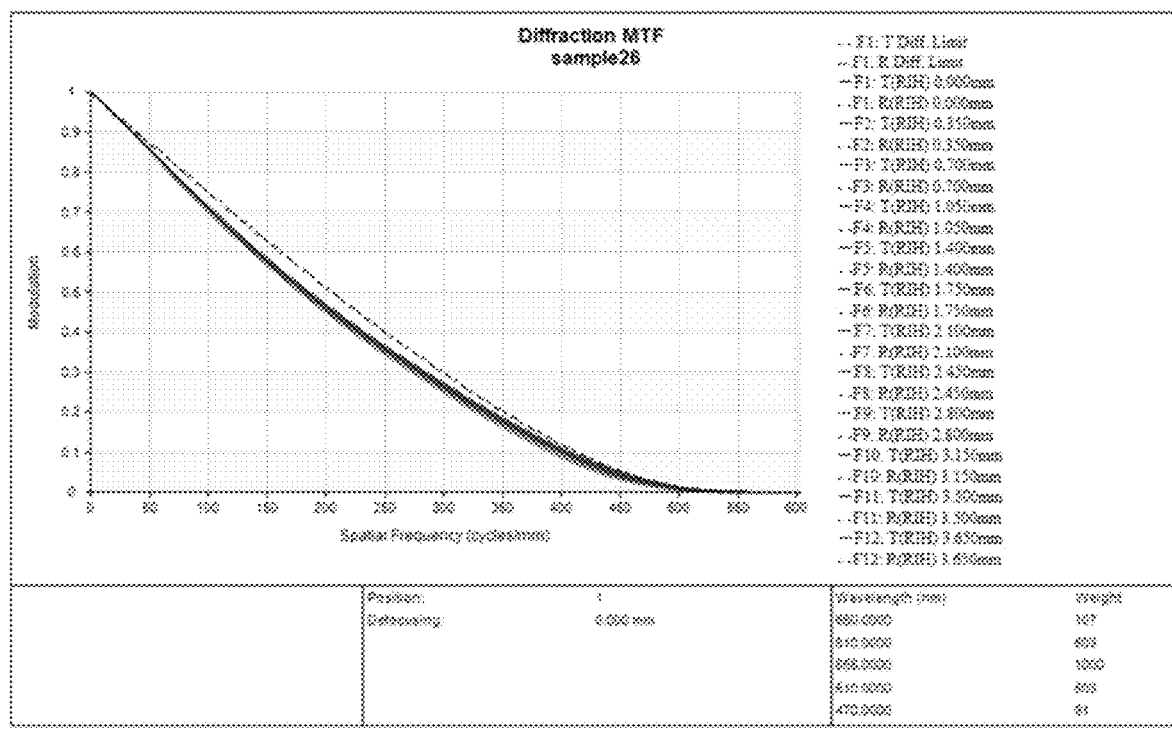
FIGS. 22A to 22J show Modulation Transfer Function (MTF) curves of optical imaging systems according to Embodiment 1 to Embodiment 10 of the disclosure.

FIG. 3A shows a longitudinal aberration curve of the optical imaging system according to Embodiment 1 to represent deviations of a convergence focal point after light with different wavelengths passes through the lens. FIG. 3B shows an astigmatism curve of the optical imaging system according to Embodiment 1 to represent a tangential image surface curvature and a sagittal image surface curvature. FIG. 3C shows a distortion curve of the optical imaging system according to Embodiment 1 to represent distortion values corresponding to different image heights. FIG. 3D shows a lateral color curve of the optical imaging system according to Embodiment 1 to represent deviations of different image heights on the imaging surface after the light passes through the lens. FIG. 22A shows a MTF curve of the optical imaging system according to Embodiment 1 to represent variations of a modulation degree with a spatial frequency. According to FIGS. 3A-3D and FIG. 22A, it can be seen that the optical imaging system provided in Embodiment 1 may achieve high imaging quality.

Embodiment 2

Figure 4:
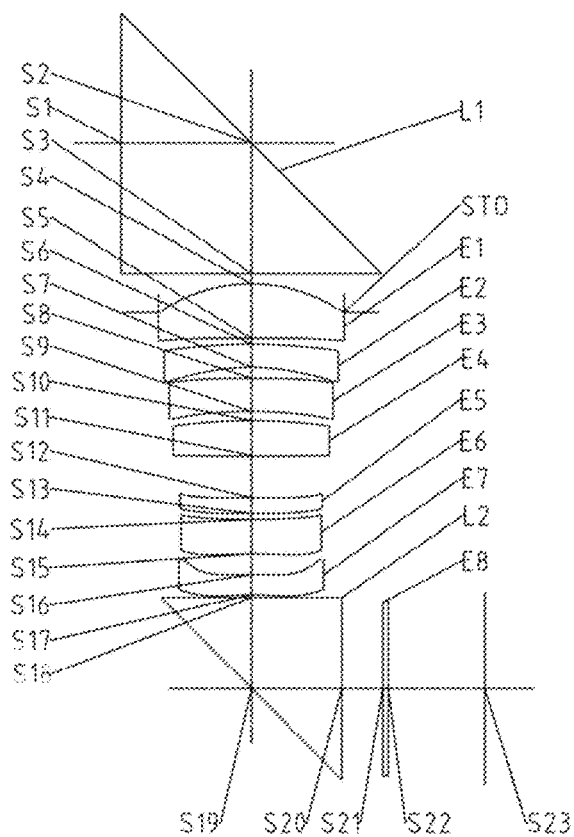
FIG. 4 shows a structural schematic diagram of an optical imaging system according to Embodiment 2 of the disclosure.

An optical imaging system according to Embodiment 2 of the disclosure will be described below with reference to FIGS. 4-5D. In the embodiment and the following embodiments, parts of descriptions similar to those about Embodiment 1 are omitted for simplicity. FIG. 4 shows a structural schematic diagram of an optical imaging system according to Embodiment 2 of the disclosure.

As shown in FIG. 4, the optical imaging system sequentially includes from an object side to an image side along a second optical axis: a first prism L1, a diaphragm STO, a first lens E1, a second lens E2, a third lens E3, a fourth lens E4, a fifth lens E5, a sixth lens E6, a seventh lens E7, a second prism L2 and an optical filter E8. The first prism L1 is a first refraction optical element in a first imaging lens group, the second prism L2 is a second refraction optical element in a second imaging lens group.

The first prism L1 includes an incidence surface S1, a reflecting surface S2 and an emergence surface S3. The first lens E1 has a positive refractive power, an object-side surface S4 thereof is a convex surface, and an image-side surface S5 is a convex surface. The second lens E2 has a negative refractive power, an object-side surface S6 thereof is a convex surface, and an image-side surface S7 is a concave surface. The third lens E3 has a negative refractive power, an object-side surface S8 thereof is a convex surface, and an image-side surface S9 is a concave surface. The fourth lens E4 has a positive refractive power, an object-side surface S10 thereof is a convex surface, and an image-side surface S11 is a convex surface. The fifth lens E5 has a positive refractive power, an object-side surface S12 thereof is a convex surface, and an image-side surface S13 is a concave surface. The sixth lens E6 has a negative refractive power, an object-side surface S14 thereof is a concave surface, and an image-side surface S15 is a concave surface. The seventh lens E7 has a negative refractive power, an object-side surface S16 thereof is a convex surface, and an image-side surface S17 is a concave surface. The second prism L2 includes an incidence surface S18, a reflecting surface S19 and an emergence surface S20. The optical filter E8 has an object-side surface S21 and an image-side surface S22. The optical imaging system has an imaging surface S23. Light from an object penetrates through the incidence surface S1 of the first prism L1 along a first optical axis, sequentially penetrates through each of the surfaces S3 to S18 after deflected by the reflecting surface S2 of the first prism L1 to be along the second optical axis, then sequentially penetrates through each of the surfaces S20 to S21 after deflected by the reflecting surface S19 of the second prism L2 to be along a third optical axis, and is finally imaged on the imaging surface S23.

In Embodiment 2, a value of a total effective focal length f of the optical imaging system is 24.90 mm. TTLz is an on-axis distance from the object-side surface S1 of the first prism L1 to the imaging surface S23 on the first optical axis (or a normal direction of the imaging surface S23), and a value of TTLz is 13.93 mm. ImgH is a half of a diagonal length of an effective pixel region on the imaging surface S23, and a value of ImigH is 3.65 mm. FOV is a maximum field of view, and a value of FOV is 16.7°.

Table 3 shows a basic parameter table of the optical imaging system of Embodiment 2, wherein the units of the curvature radius, the thickness/distance and the focal length are all millimeters (mm). Table 4 shows high-order coefficients that can be used for each aspheric mirror surface in Embodiment 2. A surface type of each aspheric surface may be defined by formula (1) given in Embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Spherical | Infinite | 5.0000 | 1.52 | 64.2 | | |
| S2 | Spherical | Infinite | 5.0000 | 1.52 | 64.2 | | |
| S3 | Spherical | Infinite | 1.5000 | | | | |
| STO | Spherical | Infinite | −1.0997 | | | | |
| S4 | Aspheric | 6.2462 | 2.1043 | 1.55 | 56.1 | 10.85 | −0.0390 |
| S5 | Aspheric | −100.0000 | 0.2226 | | | | −88.7111 |
| S6 | Aspheric | 19.2956 | 0.8943 | 1.67 | 19.2 | −22.69 | 0.5222 |
| S7 | Aspheric | 8.3930 | 0.4257 | | | | −0.0673 |
| S8 | Aspheric | 267.9564 | 1.2725 | 1.55 | 56.1 | −30.51 | 99.0000 |
| S9 | Aspheric | 15.6531 | 0.3587 | | | | 1.7181 |
| S10 | Aspheric | 20.5609 | 1.3766 | 1.55 | 56.1 | 27.24 | −1.1511 |
| S11 | Spherical | −52.4299 | 1.5953 | | | | −91.5244 |
| S12 | Spherical | 37.3638 | 0.6117 | 1.67 | 19.2 | 64.78 | 97.3065 |
| S13 | Spherical | 250.7841 | 0.2270 | | | | 99.0000 |
| S14 | Aspheric | −21.5715 | 1.3038 | 1.55 | 56.1 | −22.16 | −27.0472 |
| S15 | Aspheric | 28.1194 | 0.7982 | | | | 89.3853 |
| S16 | Aspheric | 13.7641 | 0.7815 | 1.55 | 56.1 | −55.67 | 3.6304 |
| S17 | Aspheric | 9.2835 | 0.1075 | | | | −26.7838 |
| S18 | Spherical | Infinite | 3.5000 | 1.52 | 64.2 | | |
| S19 | Spherical | Infinite | 3.5000 | 1.52 | 64.2 | | |
| S20 | Spherical | Infinite | 1.5837 | | | | |
| S21 | Spherical | Infinite | 0.2100 | 1.52 | 64.2 | | |
| S22 | Spherical | Infinite | 3.6865 | | | | |
| S23 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S4 | −4.4479E−03 | 6.6523E−03 | 1.9914E−04 | 9.3993E−05 | 5.6736E−05 | 1.9098E−05 | 8.2671E−06 | −8.3695E−06 | −1.9458E−06 |
| S5 | −1.5279E−01 | 2.2576E−02 | −4.4710E−03 | 1.4494E−03 | −2.6984E−04 | 2.2188E−04 | −1.3250E−04 | 2.7785E−05 | 2.6326E−05 |
| S6 | 4.7042E−02 | −5.1561E−03 | −6.9230E−04 | 8.1456E−04 | −4.4227E−04 | 3.3532E−04 | −1.6706E−04 | 9.3859E−05 | 3.2154E−05 |
| S7 | 7.9115E−02 | −6.1501E−03 | −6.2178E−04 | 4.9732E−04 | −5.0870E−04 | 2.0998E−04 | −2.2356E−04 | 2.6087E−05 | −4.7546E−06 |
| S8 | −1.5812E−01 | 1.8931E−02 | −5.5798E−03 | 2.1212E−03 | −4.8281E−04 | 1.0080E−04 | −2.5892E−04 | −7.8801E−05 | −1.8545E−05 |
| S9 | 2.1856E−02 | −1.0526E−02 | 3.1672E−03 | 4.0479E−04 | 8.5066E−04 | 4.9108E−06 | −3.2324E−04 | −1.7389E−04 | −7.4477E−07 |
| S10 | 9.1905E−03 | −6.6508E−03 | 3.0994E−03 | −1.5449E−03 | 1.7372E−03 | 3.0043E−04 | −9.1598E−05 | −1.0268E−04 | −3.8193E−06 |
| S11 | −5.7140E−02 | 1.9040E−02 | −2.7562E−03 | −3.8183E−04 | 7.4772E−04 | 1.9504E−05 | 4.2407E−06 | −3.6088E−05 | −1.3976E−05 |
| S12 | 2.4151E−01 | −8.1241E−03 | 4.4025E−03 | 2.0674E−03 | −2.2459E−04 | −2.3941E−04 | 7.6563E−05 | −6.6365E−05 | −3.2828E−05 |
| S13 | 2.0546E−01 | −1.6134E−02 | 4.6732E−03 | 2.1199E−03 | 5.2868E−05 | 2.0935E−05 | 1.9475E−04 | −5.6526E−05 | −5.6795E−05 |
| S14 | −1.1943E−02 | 2.9705E−02 | −8.1891E−03 | 9.2250E−04 | 9.0718E−04 | 3.1498E−04 | 1.1367E−04 | 5.5133E−05 | −4.3784E−05 |
| S15 | 2.6462E−01 | 4.6091E−02 | −4.8475E−03 | −1.0760E−04 | 1.2566E−05 | −3.4681E−04 | −1.0686E−04 | 9.5845E−05 | −9.7294E−06 |
| S16 | 8.0485E−01 | −1.5854E−02 | 1.2923E−03 | −1.5283E−03 | −7.9949E−04 | −5.0478E−04 | −1.6714E−04 | 6.6912E−05 | 8.9439E−06 |
| S17 | 5.4060E−01 | −4.7529E−02 | 2.2370E−03 | −9.9154E−04 | −4.4469E−04 | −2.0193E−04 | −5.4521E−05 | 1.9936E−06 | −2.7357E−05 |

Figure 5A:
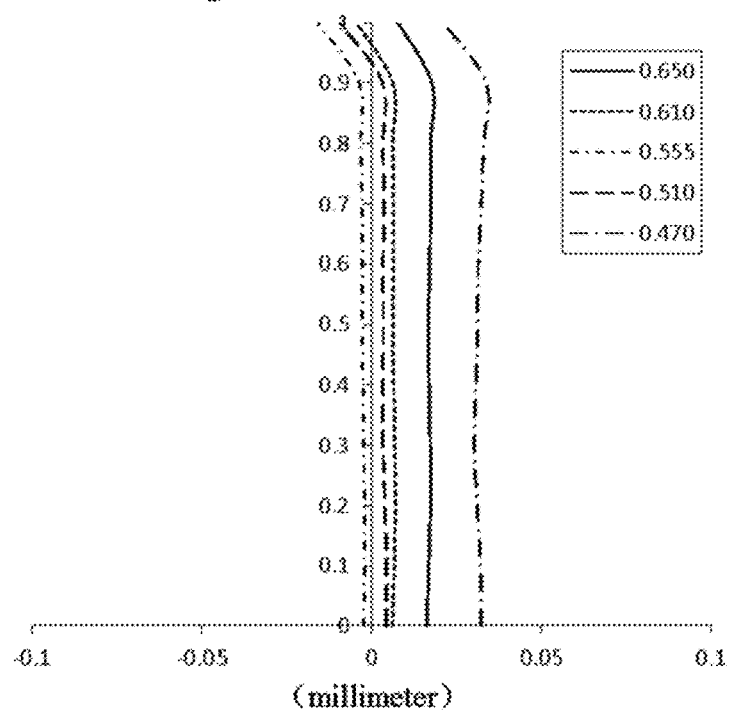
FIGS. 5A-5D show a longitudinal aberration curve, an astigmatism curve, a distortion curve and a lateral color curve of an optical imaging system according to Embodiment 2 respectively.
Figure 5B:
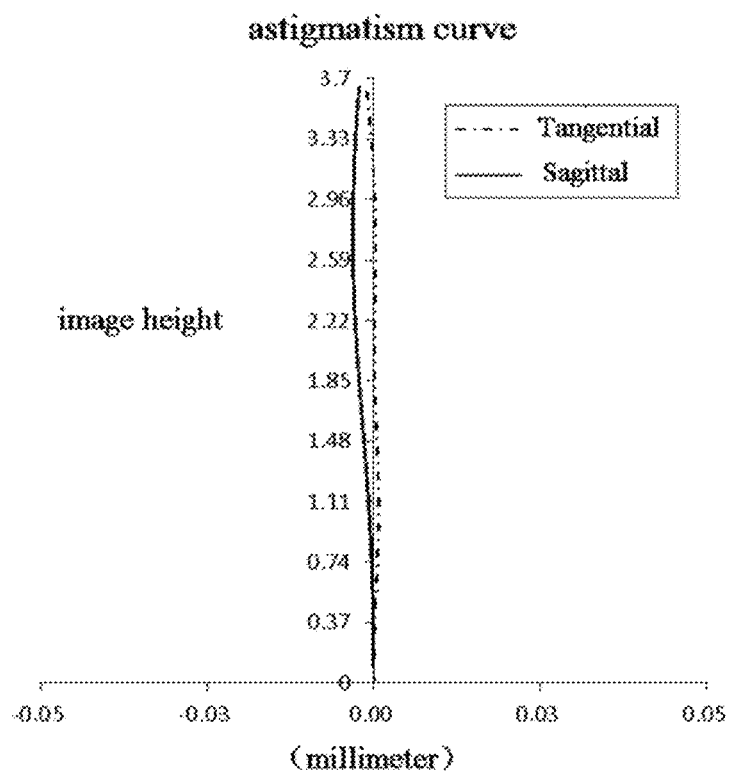
Figure 5C:
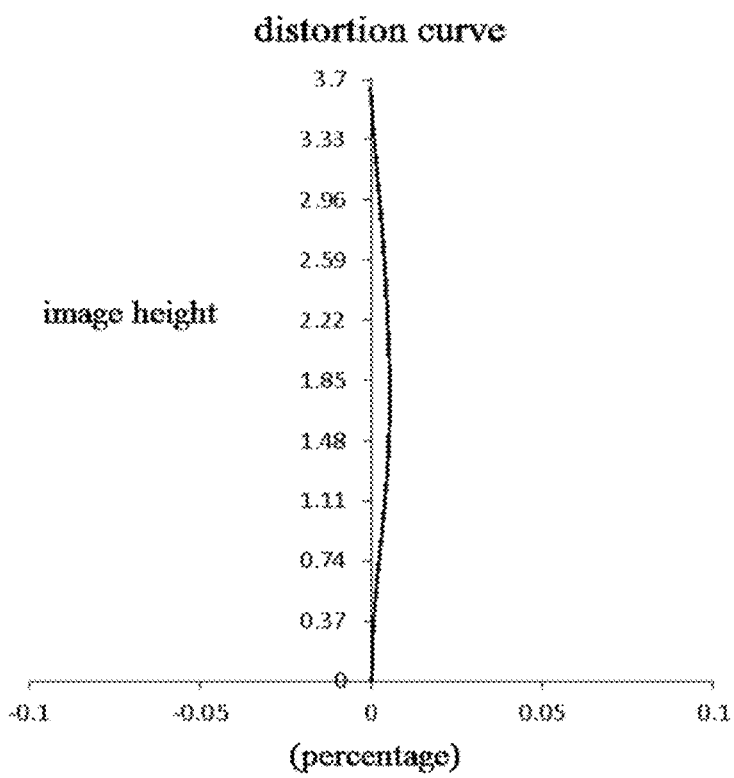
Figure 5D:
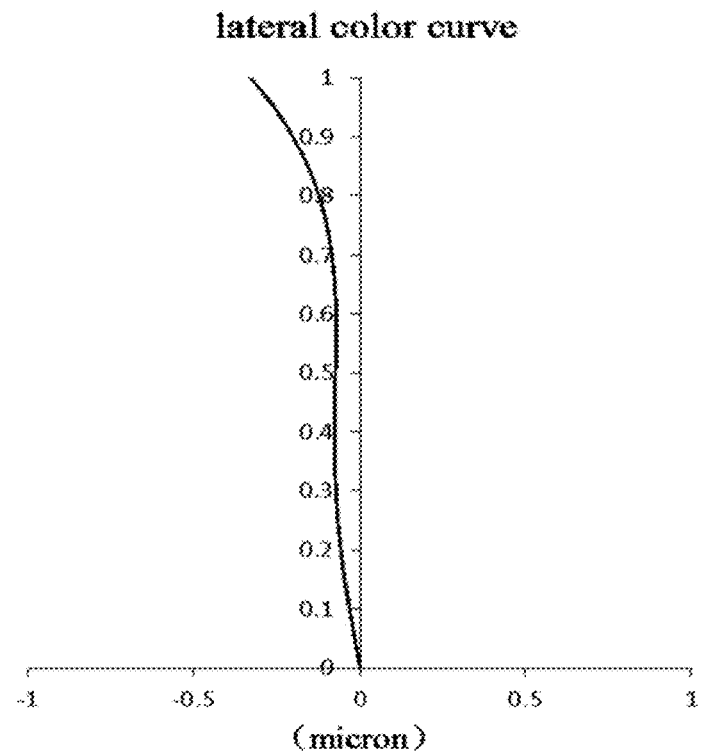
Figure 22B:
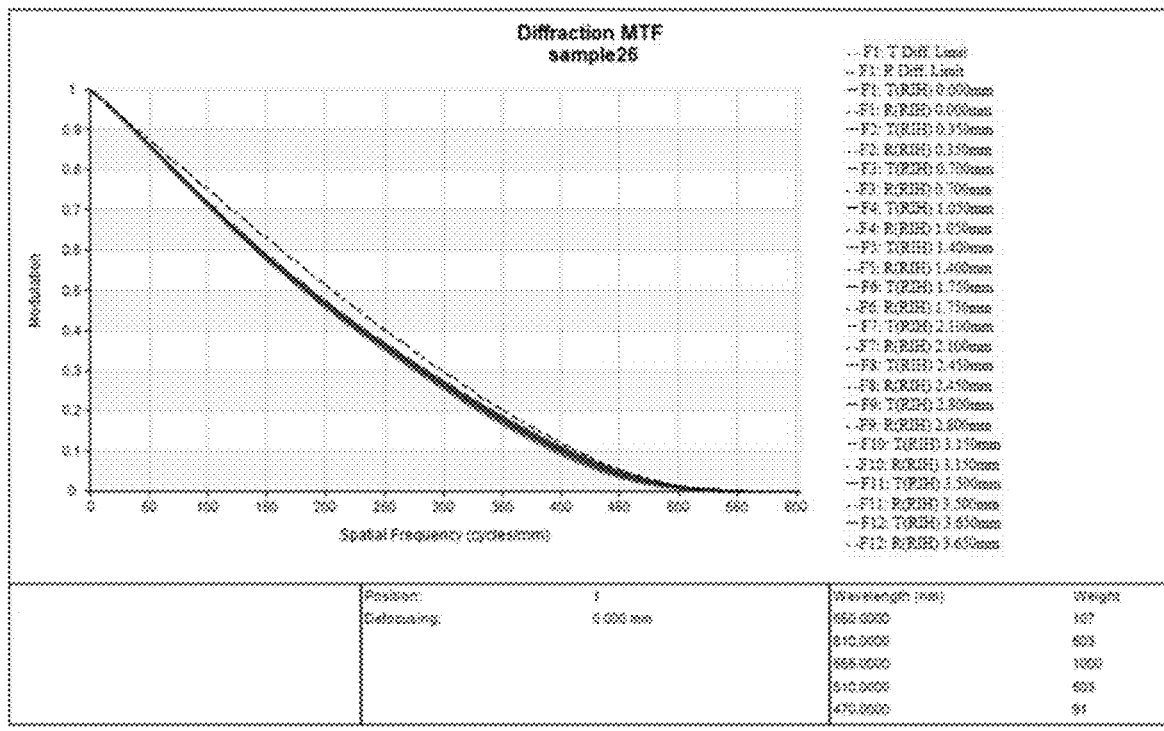
Figure 22:
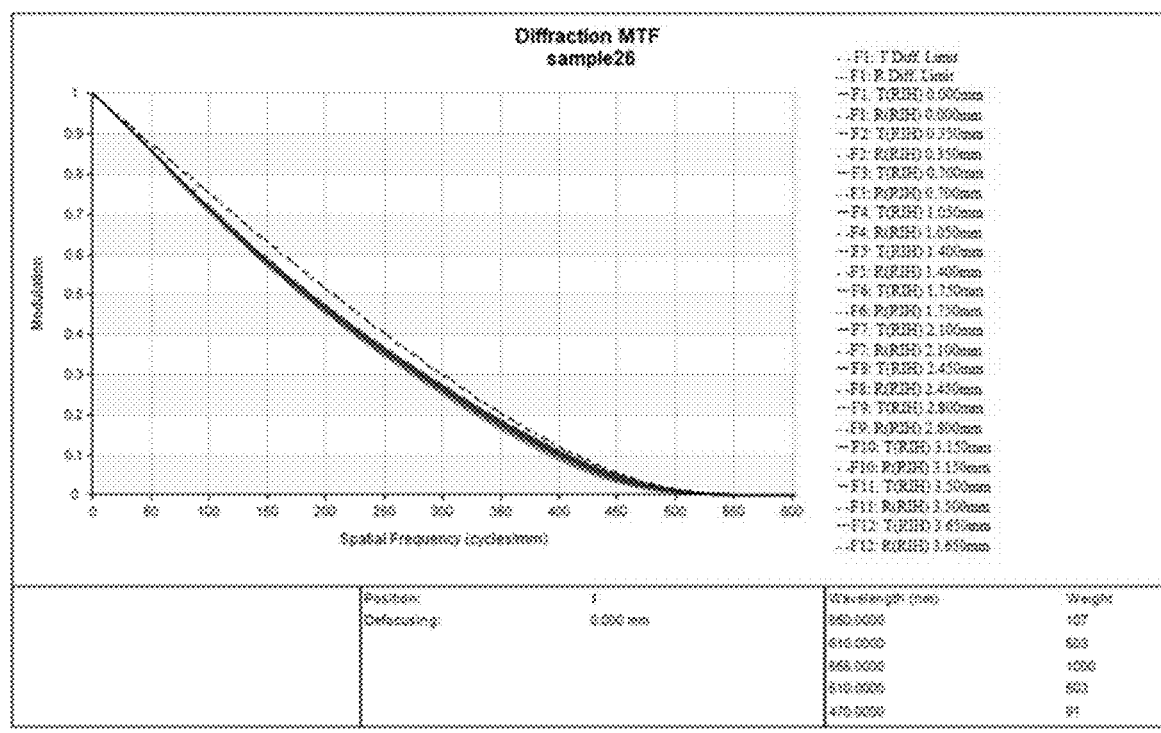
Figure 22:
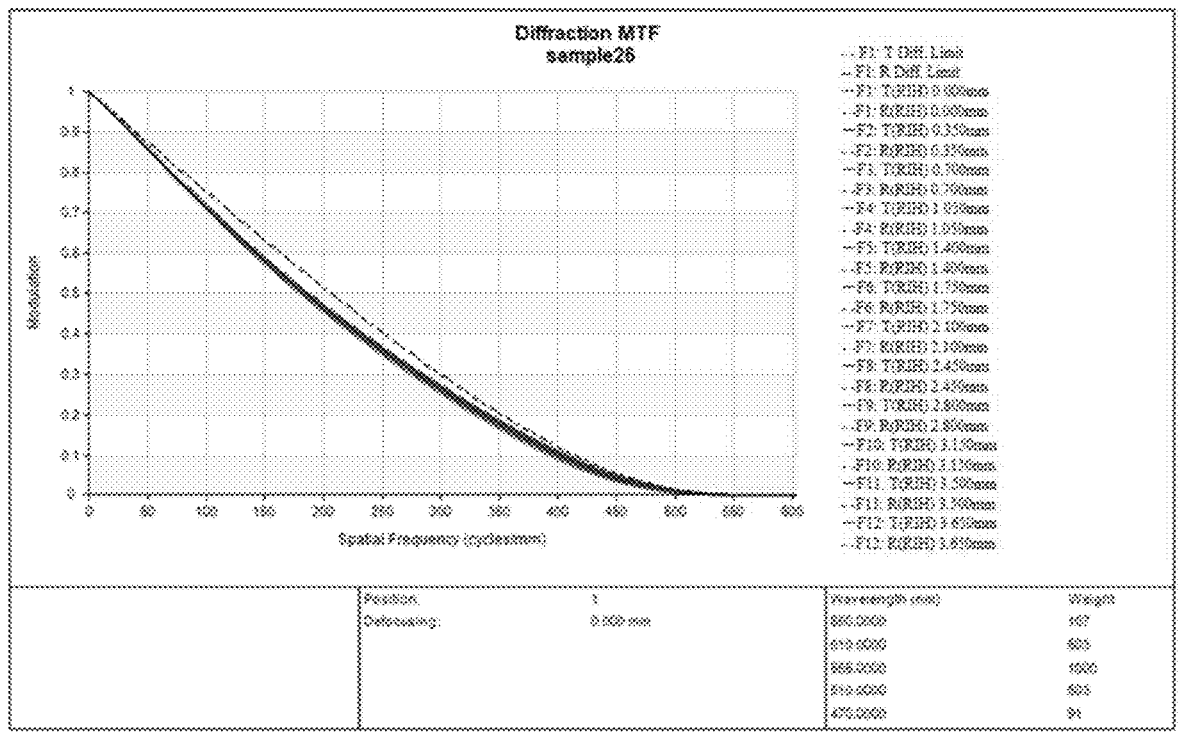
Figure 22:
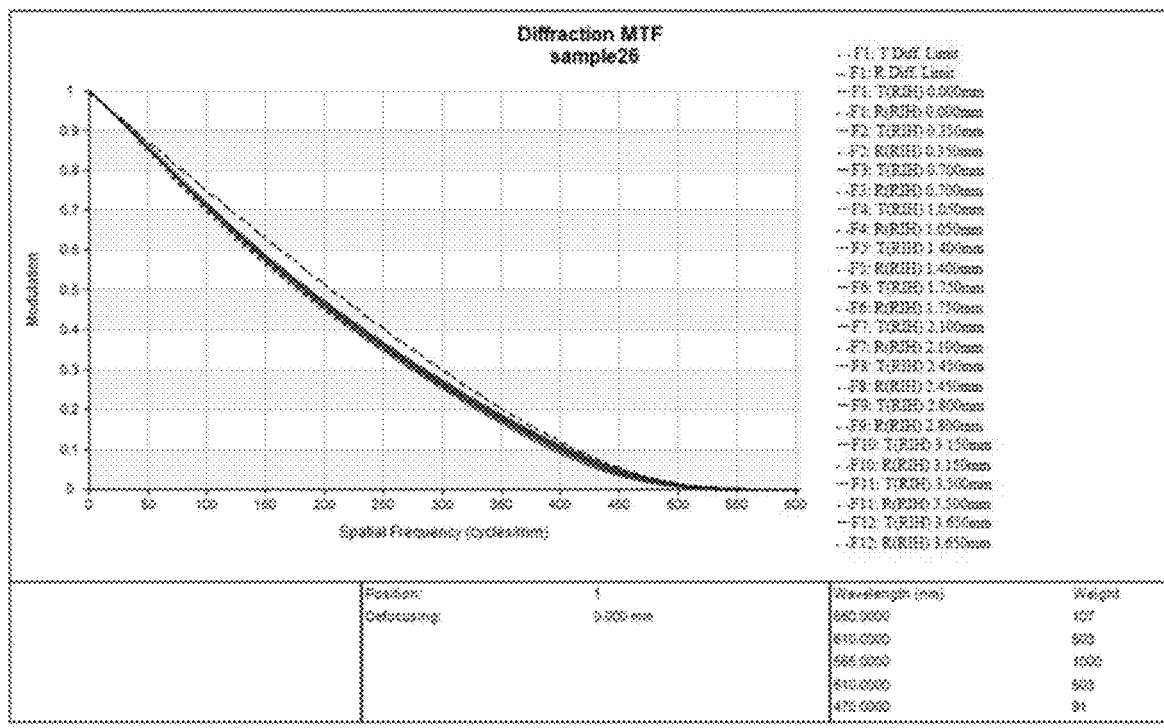
Figure 22:
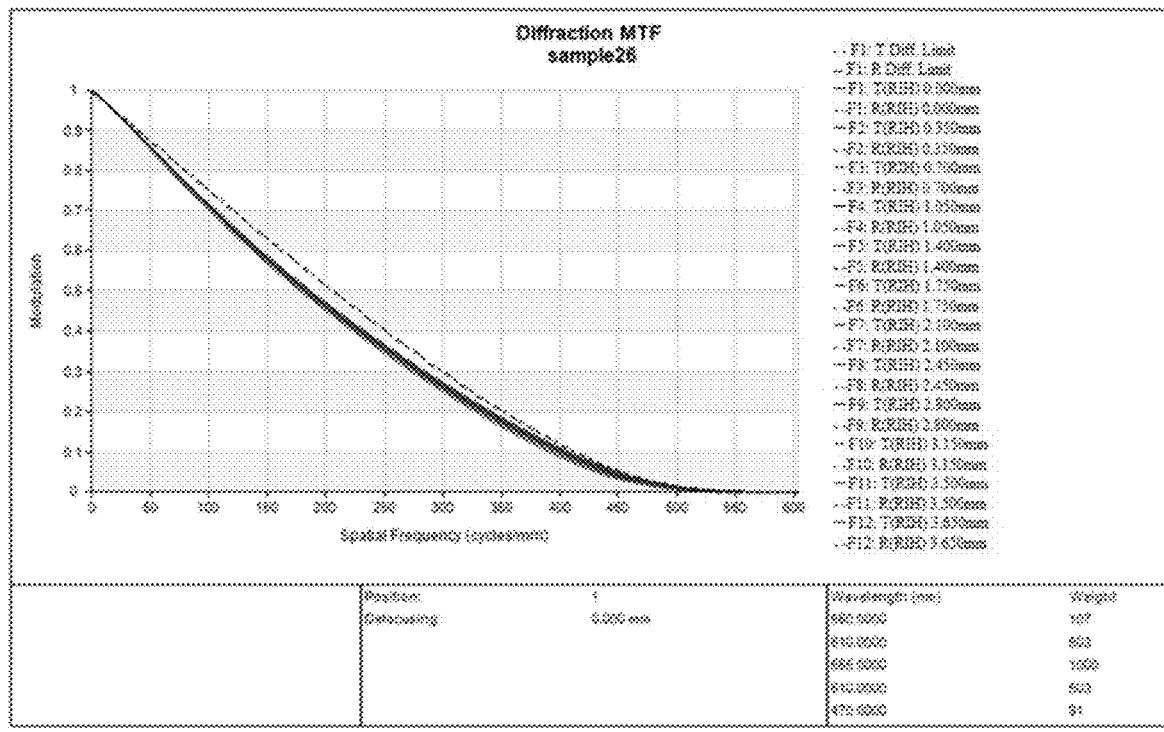
Figure 22:
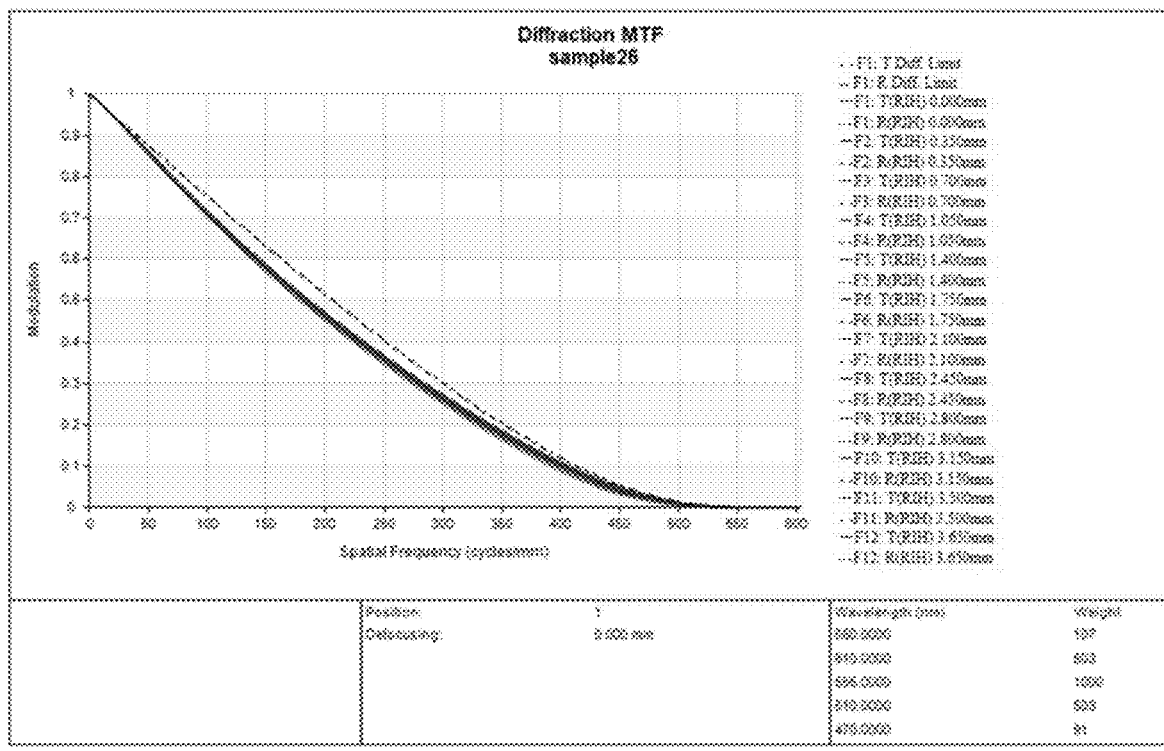
Figure 22:
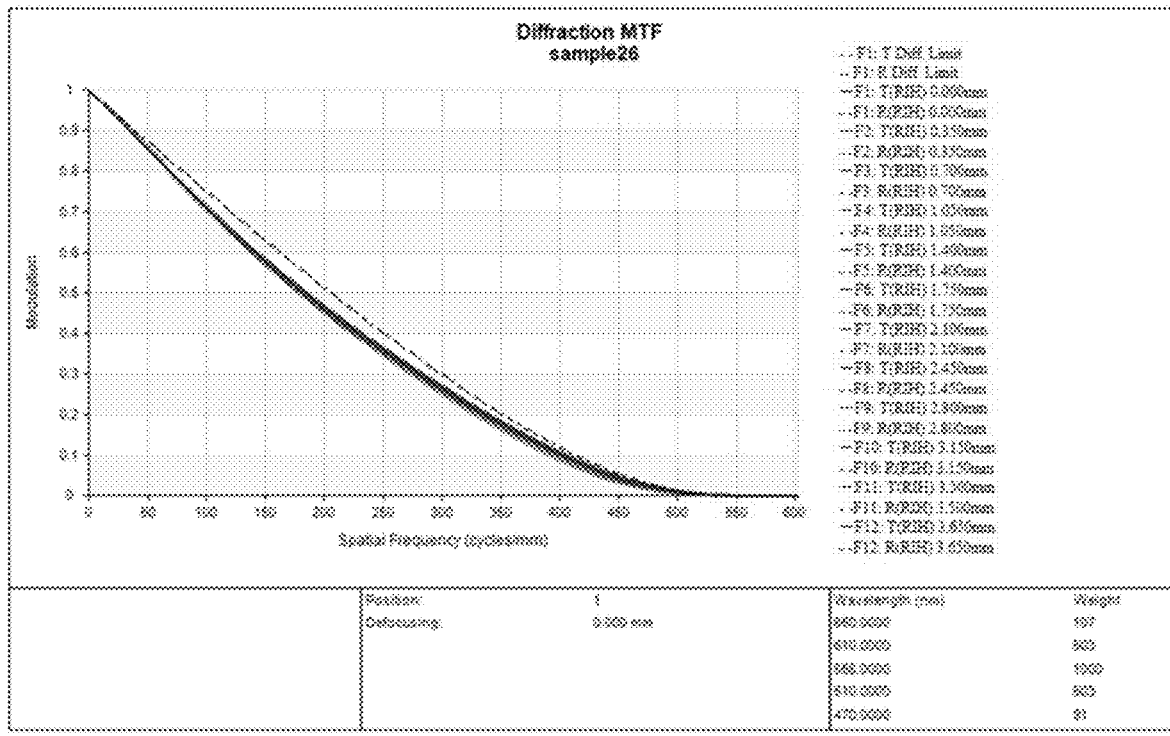
Figure 22:
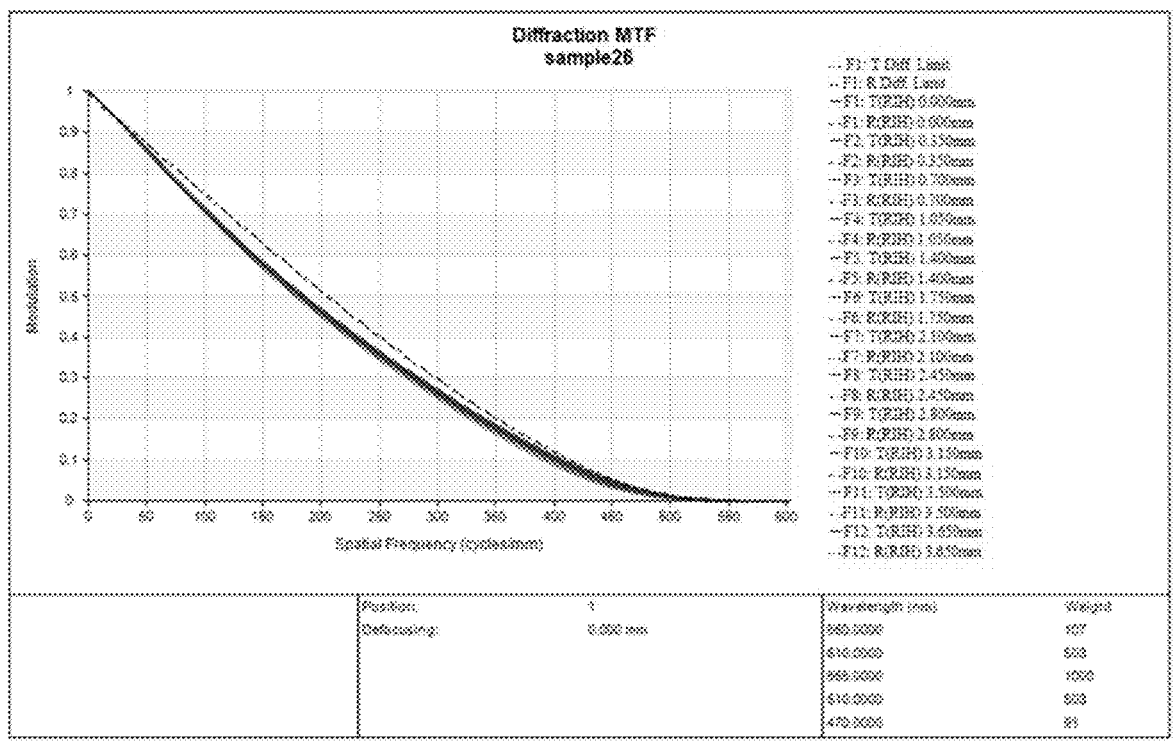

FIG. 5A shows a longitudinal aberration curve of the optical imaging system according to Embodiment 2 to represent deviations of a convergence focal point after light with different wavelengths passes through the lens. FIG. 5B shows an astigmatism curve of the optical imaging system according to Embodiment 2 to represent a tangential image surface curvature and a sagittal image surface curvature. FIG. 5C shows a distortion curve of the optical imaging system according to Embodiment 2 to represent distortion values corresponding to different image heights. FIG. 5D shows a lateral color curve of the optical imaging system according to Embodiment 2 to represent deviations of different image heights on the imaging surface after the light passes through the lens. FIG. 22B shows a MTF curve of the optical imaging system according to Embodiment 2 to represent variations of a modulation degree with a spatial frequency. According to FIGS. 5A-5D and FIG. 22B, it can be seen that the optical imaging system provided in Embodiment 2 may achieve high imaging quality.

Embodiment 3

Figure 6:
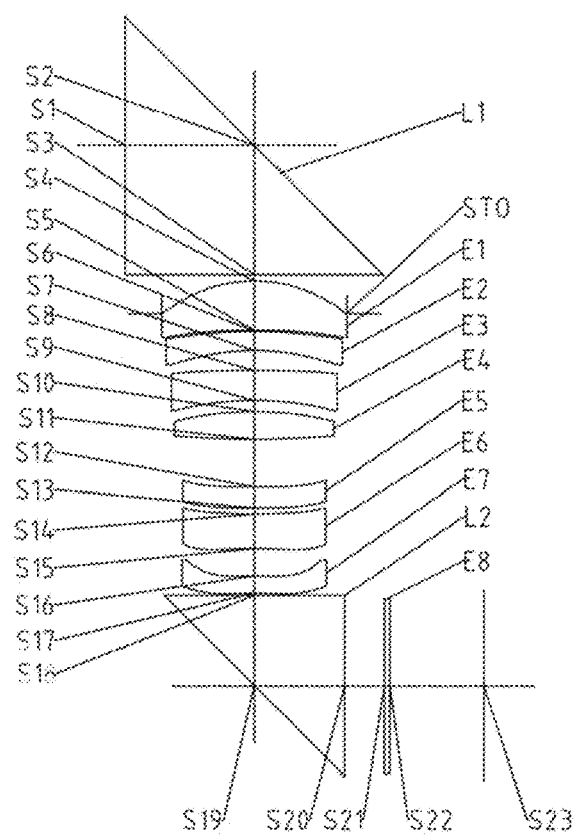
FIG. 6 shows a structural schematic diagram of an optical imaging system according to Embodiment 3 of the disclosure.

An optical imaging system according to Embodiment 3 of the disclosure will be described below with reference to FIGS. 6-7D. FIG. 6 shows a structural schematic diagram of an optical imaging system according to Embodiment 3 of the disclosure.

As shown in FIG. 6, the optical imaging system sequentially includes from an object side to an image side along a second optical axis, a first prism L1, a diaphragm STO, a first lens E1, a second lens E2, a third lens E3, a fourth lens E4, a fifth lens E5, a sixth lens E6, a seventh lens E7, a second prism L2 and an optical filter E8. The first prism L1 is a first refraction optical element in a first imaging lens group, the second prism L2 is a second refraction optical element in a second imaging lens group.

The first prism L1 includes an incidence surface S1, a reflecting surface S2 and an emergence surface S3. The first lens E1 has a positive refractive power, an object-side surface S4 thereof is a convex surface, and an image-side surface S5 is a concave surface. The second lens E2 has a negative refractive power, an object-side surface S6 thereof is a convex surface, and an image-side surface S7 is a concave surface. The third lens E3 has a negative refractive power, an object-side surface S8 thereof is a concave surface, and an image-side surface S9 is a concave surface. The fourth lens E4 has a positive refractive power, an object-side surface S10 thereof is a convex surface, and an image-side surface S11 is a convex surface. The fifth lens E5 has a positive refractive power, an object-side surface S12 thereof is a convex surface, and an image-side surface S13 is a convex surface. The sixth lens E6 has a negative refractive power, an object-side surface S14 thereof is a concave surface, and an image-side surface S15 is a concave surface. The seventh lens E7 has a negative refractive power, an object-side surface S16 thereof is a convex surface, and an image-side surface S17 is a concave surface. The second prism L2 includes an incidence surface S18, a reflecting surface S19 and an emergence surface S20. The optical filter E8 has an object-side surface S21 and an image-side surface S22. The optical imaging system has an imaging surface S23. Light from an object penetrates through the incidence surface S1 of the first prism L1 along a first optical axis, sequentially penetrates through each of the surfaces S3 to S18 after deflected by the reflecting surface S2 of the first prism L1 to be along the second optical axis, then sequentially penetrates through each of the surfaces S20 to S21 after deflected by the reflecting surface S19 of the second prism L2 to be along a third optical axis, and is finally imaged on the imaging surface S23.

In Embodiment 3, a value of a total effective focal length f of the optical imaging system is 24.90 mm. TTLz is an on-axis distance from the object-side surface S1 of the first prism L1 to the imaging surface S23 on the first optical axis (or a normal direction of the imaging surface S23), and a value of TTLz is 13.93 mm. ImgH is a half of a diagonal length of an effective pixel region on the imaging surface S23, and a value of ImgH is 3.65 mm. FOV is a maximum field of view, and a value of FOV is 16.7°.

Table 5 shows a basic parameter table of the optical imaging system of Embodiment 3, wherein the units of the curvature radius, the thickness/distance and the focal length are all millimeters (mm). Table 6 shows high-order coefficients that can be used for each aspheric mirror surface in Embodiment 3. A surface type of each aspheric surface may be defined by formula (1) given in Embodiment 1.

TABLE 5

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| S1 | Spherical | Infinite | 5.0000 | 1.52 | 64.2 | | |
| S2 | Spherical | Infinite | 5.0000 | 1.52 | 64.2 | | |
| S3 | Spherical | Infinite | 1.5000 | | | | |
| STO | Spherical | Infinite | −1.2587 | | | | |
| S4 | Aspheric | 5.6423 | 1.9073 | 1.55 | 56.1 | 11.71 | −0.0038 |
| S5 | Aspheric | 42.3054 | 0.0398 | | | | 2.2933 |
| S6 | Aspheric | 17.0934 | 0.7396 | 1.67 | 19.2 | −25.54 | 0.6854 |
| S7 | Aspheric | 8.4455 | 0.7831 | | | | −0.0655 |
| S8 | Aspheric | −213.7609 | 1.1536 | 1.55 | 56.1 | −20.80 | −99.0000 |
| S9 | Aspheric | 12.0123 | 0.4339 | | | | 0.4846 |
| S10 | Aspheric | 13.1025 | 1.0717 | 1.55 | 56.1 | 14.68 | 3.1574 |
| S11 | Spherical | −20.0450 | 1.8304 | | | | −90.6814 |
| S12 | Spherical | 194.7918 | 0.8080 | 1.67 | 19.2 | 96.83 | 99.0000 |
| S13 | Spherical | −98.6311 | 0.2325 | | | | 99.0000 |
| S14 | Aspheric | −16.5037 | 1.3389 | 1.55 | 56.1 | −18.61 | −15.0526 |
| S15 | Aspheric | 27.1734 | 1.0537 | | | | 79.1019 |
| S16 | Aspheric | 20.1482 | 0.6713 | 1.55 | 56.1 | −56.83 | 26.1605 |
| S17 | Aspheric | 12.0712 | 0.0879 | | | | −31.8813 |
| S18 | Spherical | Infinite | 3.5000 | 1.52 | 64.2 | | |
| S19 | Spherical | Infinite | 3.5000 | 1.52 | 64.2 | | |
| S20 | Spherical | Infinite | 1.5401 | | | | |
| S21 | Spherical | Infinite | 0.2100 | 1.52 | 64.2 | | |
| S22 | Spherical | Infinite | 3.6430 | | | | |
| S23 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S4 | −1.0533E−02 | 8.0936E−03 | 2.8452E−04 | 2.7234E−04 | 1.1232E−04 | 1.2236E−05 | 4.0008E−07 | −4.5868E−06 | −1.3779E−06 |
| S5 | −1.5146E−01 | 2.3260E−02 | −3.9621E−03 | 1.5465E−03 | 1.4365E−04 | 2.0407E−04 | 1.0889E−04 | 9.5772E−05 | 1.2158E−05 |
| S6 | 4.8770E−02 | −4.8519E−03 | −3.6228E−04 | 6.5844E−04 | 1.0531E−04 | 3.4923E−04 | 1.1010E−04 | 9.5163E−05 | 1.8585E−06 |
| S7 | 8.0049E−02 | −4.5063E−03 | −5.9864E−04 | 5.4798E−04 | 3.3983E−05 | 2.1761E−04 | −3.8000E−05 | −3.4531E−05 | −1.5351E−05 |
| S8 | −1.5202E−01 | 2.0561E−02 | −4.9255E−03 | 2.5358E−03 | −1.8272E−04 | 9.4350E−05 | −1.7545E−04 | −6.3602E−05 | 3.6828E−06 |
| S9 | 1.8850E−02 | −1.1533E−02 | 4.5183E−03 | −3.3775E−05 | 5.1139E−04 | −3.2325E−04 | −5.0320E−04 | 1.6234E−05 | 5.1048E−05 |
| S10 | 1.2769E−02 | −4.5716E−03 | 1.5381E−03 | −1.7743E−03 | 1.8154E−03 | 3.8183E−04 | −3.1249E−04 | −3.3149E−05 | 2.5148E−06 |
| S11 | −5.3922E−02 | 1.7817E−02 | −3.4596E−03 | 7.8672E−04 | 1.0943E−03 | 3.2926E−05 | −2.7528E−04 | −8.3531E−05 | −2.6359E−05 |
| S12 | 2.2939E−01 | −7.0984E−03 | 3.3434E−03 | 2.0413E−03 | −4.4504E−04 | 3.0353E−05 | 1.0458E−05 | −2.9921E−05 | −1.2033E−05 |

TABLE 6-continued

| Surface number | A4 | A6 | A8 | A10 | A12 | A14 | A16 | A18 | A20 |
|---|---|---|---|---|---|---|---|---|---|
| S13 | 1.9467E−01 | −1.6303E−02 | 2.4314E−03 | 1.4922E−03 | −3.5776E−04 | 1.8117E−04 | 1.1283E−04 | −4.3391E−05 | −9.8845E−06 |
| S14 | −1.1771E−02 | 3.2350E−02 | −8.7073E−03 | 1.1495E−03 | 4.1511E−04 | 1.0000E−04 | 1.1472E−04 | −2.3035E−05 | −2.4970E−06 |
| S15 | 2.5786E−01 | 4.7390E−02 | −7.2858E−03 | 1.1428E−03 | 1.2249E−04 | −2.7458E−04 | 3.9042E−06 | 3.2271E−05 | −2.3930E−07 |
| S16 | 7.8572E−01 | −2.0968E−02 | −3.1069E−03 | −3.1657E−04 | −4.7391E−04 | −4.0203E−04 | −5.7873E−05 | 5.9883E−05 | 1.0532E−05 |
| S17 | 5.6277E−01 | −5.8825E−02 | 6.6080E−04 | −2.2396E−04 | −4.7388E−04 | −1.9634E−04 | −2.8531E−06 | 1.0193E−05 | −1.6506E−05 |

Figure 7A:
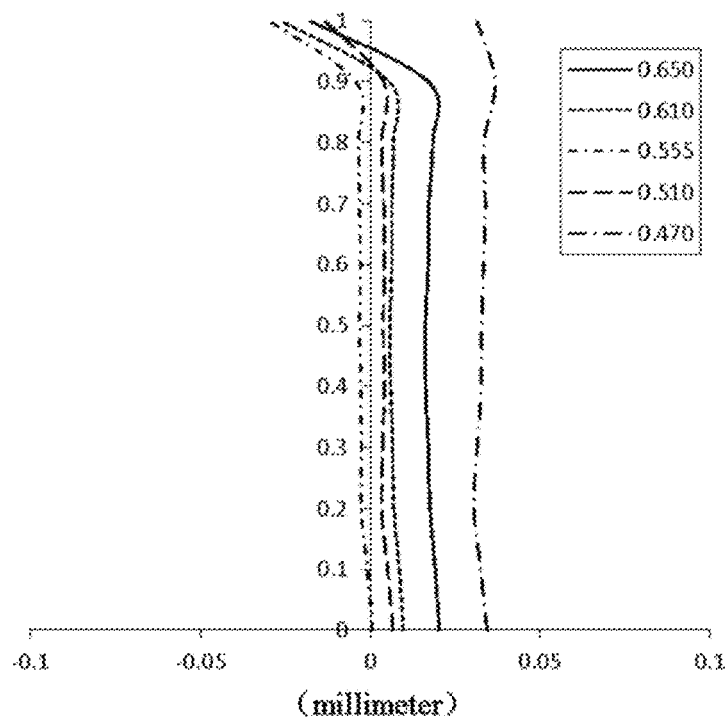
FIGS. 7A-7D show a longitudinal aberration curve, an astigmatism curve, a distortion curve and a lateral color curve of an optical imaging system according to Embodiment 3 respectively.
Figure 7B:
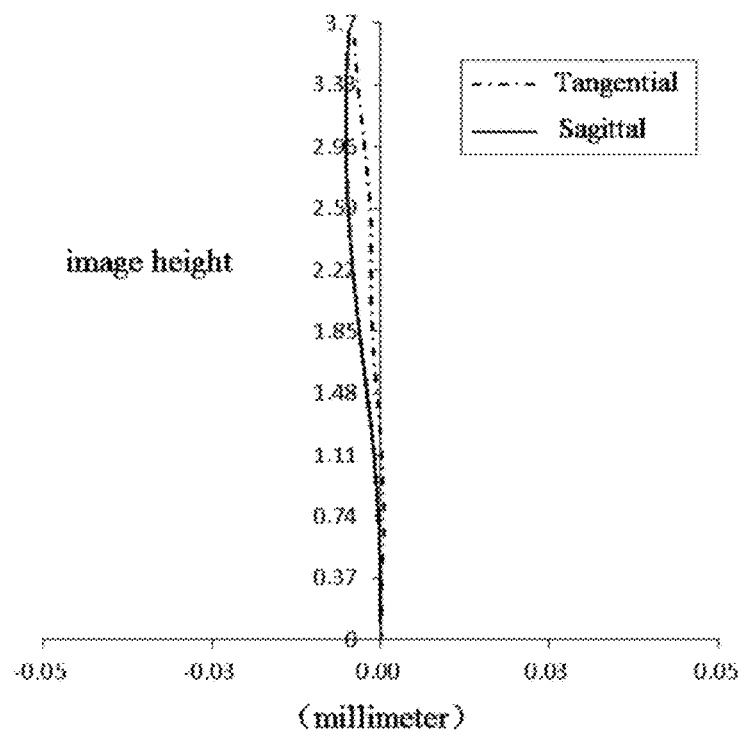
Figure 7C:
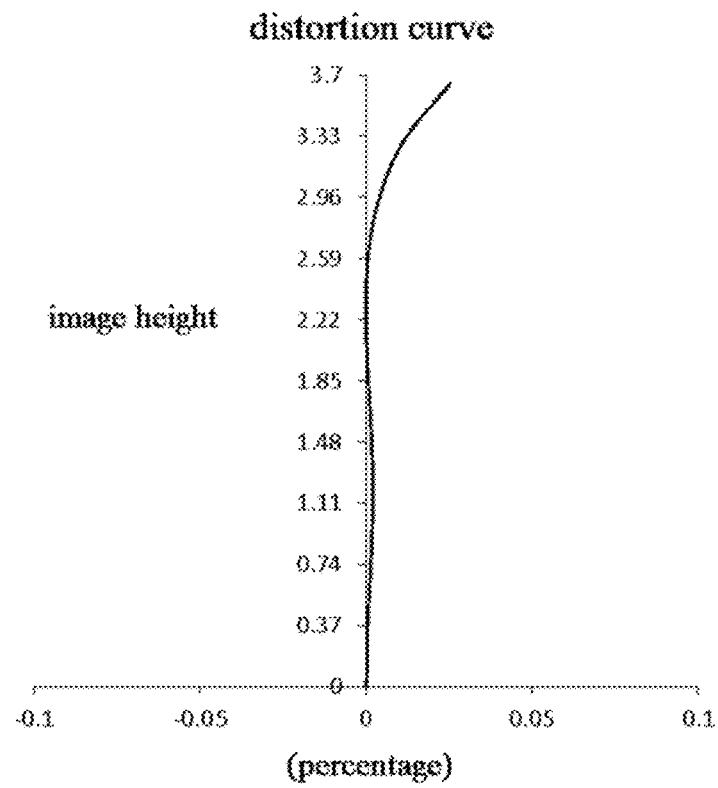
Figure 7D:
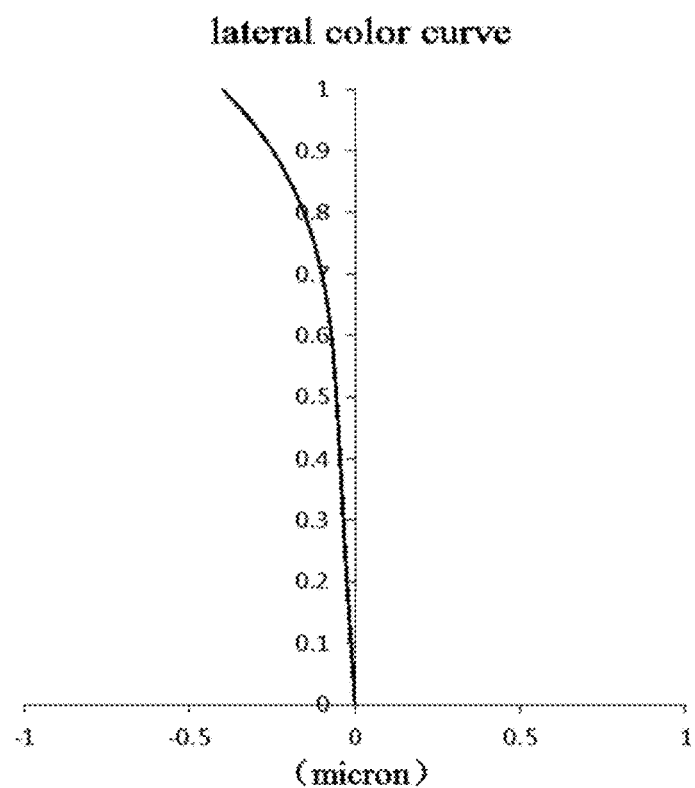

FIG. 7A shows a longitudinal aberration curve of the optical imaging system according to Embodiment 3 to represent deviations of a convergence focal point after light with different wavelengths passes through the lens. FIG. 7B shows an astigmatism curve of the optical imaging system according to Embodiment 3 to represent a tangential image surface curvature and a sagittal image surface curvature. FIG. 7C shows a distortion curve of the optical imaging system according to Embodiment 3 to represent distortion values corresponding to different image heights. FIG. 7D shows a lateral color curve of the optical imaging system according to Embodiment 3 to represent deviations of different image heights on the imaging surface after the light passes through the lens. FIG. 22C shows a MTF curve of the optical imaging system according to Embodiment 3 to represent variations of a modulation degree with a spatial frequency. According to FIGS. 7A-7D and FIG. 22C, it can be seen that the optical imaging system provided in Embodiment 3 may achieve high imaging quality.

Embodiment 4

Figure 8:
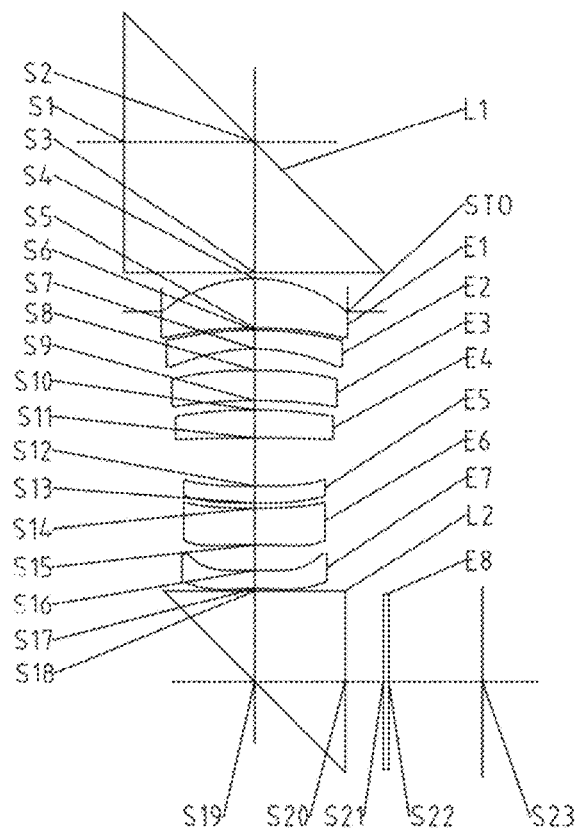
FIG. 8 shows a structural schematic diagram of an optical imaging system according to Embodiment 4 of the disclosure.

An optical imaging system according to Embodiment 4 of the disclosure will be described below with reference to FIGS. 8-9D. FIG. 8 shows a structural schematic diagram of an optical imaging system according to Embodiment 4 of the disclosure.

As shown in FIG. 8, the optical imaging system sequentially includes from an object side to an image side along a second optical axis, a first prism L1, a diaphragm STO, a first lens E1, a second lens E2, a third lens E3, a fourth lens E4, a fifth lens E5, a sixth lens E6, a seventh lens E7, a second prism L2 and an optical filter E8. The first prism L1 is a first refraction optical element in a first imaging lens group, the second prism L2 is a second refraction optical element in a second imaging lens group.

The first prism L1 includes an incidence surface S1, a reflecting surface S2 and an emergence surface S3. The first lens E1 has a positive refractive power, an object-side surface S4 thereof is a convex surface, and an image-side surface S5 is a concave surface. The second lens E2 has a negative refractive power, an object-side surface S6 thereof is a convex surface, and an image-side surface S7 is a concave surface. The third lens E3 has a negative refractive power, an object-side surface S8 thereof is a convex surface, and an image-side surface S9 is a concave surface. The fourth lens E4 has a positive refractive power, an object-side surface S10 thereof is a convex surface, and an image-side surface S11 is a concave surface. The fifth lens E5 has a positive refractive power, an object-side surface S12 thereof is a convex surface, and an image-side surface S13 is a convex surface. The sixth lens E6 has a negative refractive power, an object-side surface S14 thereof is a concave surface, and an image-side surface S15 is a concave surface. The seventh lens E7 has a negative refractive power, an object-side surface S16 thereof is a convex surface, and an image-side surface S17 is a concave surface. The second prism L2 includes an incidence surface S18, a reflecting surface S19 and an emergence surface S20. The optical filter E8 has an object-side surface S21 and an image-side surface S22. The optical imaging system has an imaging surface S23. Light from an object penetrates through the incidence surface S1 of the first prism L1 along a first optical axis, sequentially penetrates through each of the surfaces S3 to S18 after deflected by the reflecting surface S2 of the first prism L1 to be along the second optical axis, then sequentially penetrates through each of the surfaces S20 to S21 after deflected by the reflecting surface S19 of the second prism L2 to be along a third optical axis, and is finally imaged on the imaging surface S23.

In Embodiment 4, a value of a total effective focal length f of the optical imaging system is 24.90 mm. TTLz is an on-axis distance from the object-side surface S1 of the first prism L1 to the imaging surface S23 on the first optical axis (or a normal direction of the imaging surface S23), and a value of TTLz is 13.73 mm. ImgH is a half of a diagonal length of an effective pixel region on the imaging surface S23, and a value of ImgH is 3.65 mm. FOV is a maximum field of view, and a value of FOV is 16.7°.

Table 7 shows a basic parameter table of the optical imaging system of Embodiment 4, wherein the units of the curvature radius, the thickness/distance and the focal length are all millimeters (mm). Table 8 shows high-order coefficients that can be used for each aspheric mirror surface in Embodiment 4. A surface type of each aspheric surface may be defined by formula (1) given in Embodiment 1.

TABLE 7

| Surface number | Surface type | Curvature radius | Thickness/ distance | Material | | Focal length | Conic coefficient |
|---|---|---|---|---|---|---|---|
| | | | | Refractive index | Abbe number | | |
| OBJ | Spherical | Infinite | Infinite | | | | |
| S1 | Spherical | Infinite | 5.0000 | 1.52 | 64.2 | | |
| S2 | Spherical | Infinite | 5.0000 | 1.52 | 64.2 | | |
| S3 | Spherical | Infinite | 1.5000 | | | | |
| STO | Spherical | Infinite | −1.2653 | | | | |
| S4 | Aspheric | 5.6302 | 1.9045 | 1.55 | 56.1 | 12.86 | 0.0009 |
| S5 | Aspheric | 25.0368 | 0.0746 | | | | 0.8644 |

TABLE 7-continued

| Surface number | Surface type | Curvature radius | Thickness/ distance | Material Refractive index | Abbe number | Focal length | Conic coefficient |
|---|---|---|---|---|---|---|---|
| S6 | Aspheric | 13.1668 | 0.7288 | 1.67 | 19.2 | −23.68 | 0.5697 |
| S7 | Aspheric | 7.0674 | 0.8236 | | | | −0.0238 |
| S8 | Aspheric | 25.0455 | 1.1662 | 1.55 | 56.1 | −229.70 | 0.4141 |
| S9 | Aspheric | 20.5325 | 0.3558 | | | | 4.6332 |
| S10 | Aspheric | 16.7680 | 1.0843 | 1.55 | 56.1 | 32.01 | −8.7791 |
| S11 | Spherical | 404.7020 | 1.8472 | | | | −99.0000 |
| S12 | Spherical | 787.0915 | 0.6674 | 1.67 | 19.2 | 64.51 | 99.0000 |
| S13 | Spherical | −46.2174 | 0.1964 | | | | 50.2863 |
| S14 | Aspheric | −17.2058 | 1.3844 | 1.55 | 56.1 | −19.70 | −9.1800 |
| S15 | Aspheric | 29.5035 | 0.9821 | | | | 87.0784 |
| S16 | Aspheric | 18.9704 | 0.7018 | 1.55 | 56.1 | −51.79 | 0.9774 |
| S17 | Aspheric | 11.2045 | 0.0912 | | | | −35.2756 |
| S18 | Spherical | Infinite | 3.5000 | 1.52 | 64.2 | | |
| S19 | Spherical | Infinite | 3.5000 | 1.52 | 64.2 | | |
| S20 | Spherical | Infinite | 1.4650 | | | | |
| S21 | Spherical | Infinite | 0.2100 | 1.52 | 64.2 | | |
| S22 | Spherical | Infinite | 3.5679 | | | | |
| S23 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S4 | −1.1377E−02 | 7.6812E−03 | 3.8789E−05 | 1.6887E−04 | 1.3015E−04 | 9.4929E−06 | 9.8880E−06 | −2.2743E−06 | −3.7025E−07 |
| S5 | −1.5041E−01 | 2.3145E−02 | −3.9707E−03 | 1.7446E−03 | 3.2533E−04 | 3.2226E−04 | 1.2483E−04 | 1.5277E−04 | 3.3466E−05 |
| S6 | 4.9487E−02 | −4.6519E−03 | −3.2651E−04 | 8.7620E−04 | 4.9340E−05 | 4.6610E−04 | 5.0183E−05 | 1.7781E−04 | 1.9377E−05 |
| S7 | 7.8777E−02 | −4.8108E−03 | −3.5445E−04 | 7.4373E−04 | −1.8322E−05 | 2.7305E−04 | −9.9288E−05 | 4.4664E−05 | −1.2131E−05 |
| S8 | −1.5077E−01 | 2.0662E−02 | −4.5548E−03 | 3.1375E−03 | −5.9557E−06 | −8.6788E−05 | −2.4924E−04 | −6.6549E−05 | −2.1772E−05 |
| S9 | 1.6792E−02 | −1.0869E−02 | 4.6913E−03 | 5.2173E−04 | 4.7307E−04 | −4.9056E−04 | −6.4708E−04 | −2.2452E−04 | −4.7379E−05 |
| S10 | 1.4091E−02 | −6.3823E−03 | 2.0936E−03 | −1.9296E−03 | 1.8263E−03 | 4.4877E−04 | −2.4851E−04 | −1.2188E−04 | −4.1743E−05 |
| S11 | −5.6975E−02 | 2.1166E−02 | −4.0659E−03 | 6.7291E−04 | 1.3315E−03 | 3.1417E−04 | −1.2242E−04 | −7.2935E−05 | −2.9255E−05 |
| S12 | 2.3117E−01 | −9.0349E−03 | 4.2331E−03 | 2.3475E−03 | −3.5048E−04 | 7.4461E−05 | 1.6046E−05 | −2.7754E−05 | −1.7913E−05 |
| S13 | 1.9401E−01 | −1.6019E−02 | 2.9696E−03 | 2.1166E−03 | −4.4891E−04 | 2.6113E−04 | 8.8037E−05 | 1.5204E−06 | −3.2895E−05 |
| S14 | −2.1175E−03 | 3.0274E−02 | −8.5623E−03 | 1.1243E−03 | 5.3286E−04 | 1.8975E−04 | 9.0700E−05 | 5.2757E−05 | −2.1703E−05 |
| S15 | 2.5744E−01 | 4.5088E−02 | −6.6827E−03 | 5.5648E−04 | 1.6592E−04 | −3.1838E−04 | −5.6013E−06 | 5.6457E−05 | −5.7699E−06 |
| S16 | 7.9212E−01 | −1.7557E−02 | −2.3220E−03 | −1.4104E−03 | −7.0831E−04 | −4.7893E−04 | −8.8933E−05 | 6.6329E−05 | 9.5352E−06 |
| S17 | 5.7081E−01 | −5.3792E−02 | 5.1591E−04 | −8.9033E−04 | −5.3121E−04 | −2.5183E−04 | −4.3097E−05 | −3.1702E−06 | −2.4135E−05 |

Figure 9A:
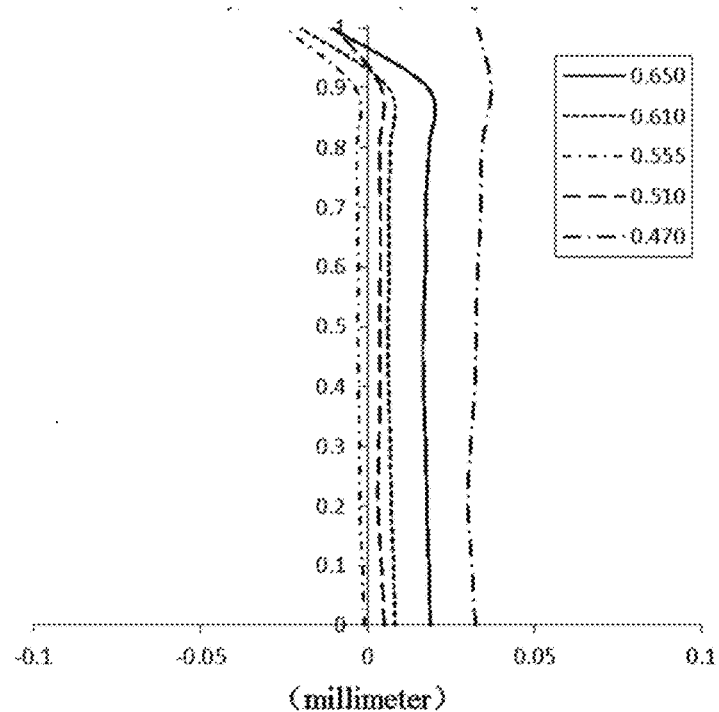
FIGS. 9A-9D show a longitudinal aberration curve, an astigmatism curve, a distortion curve and a lateral color curve of an optical imaging system according to Embodiment 4 respectively.
Figure 9B:
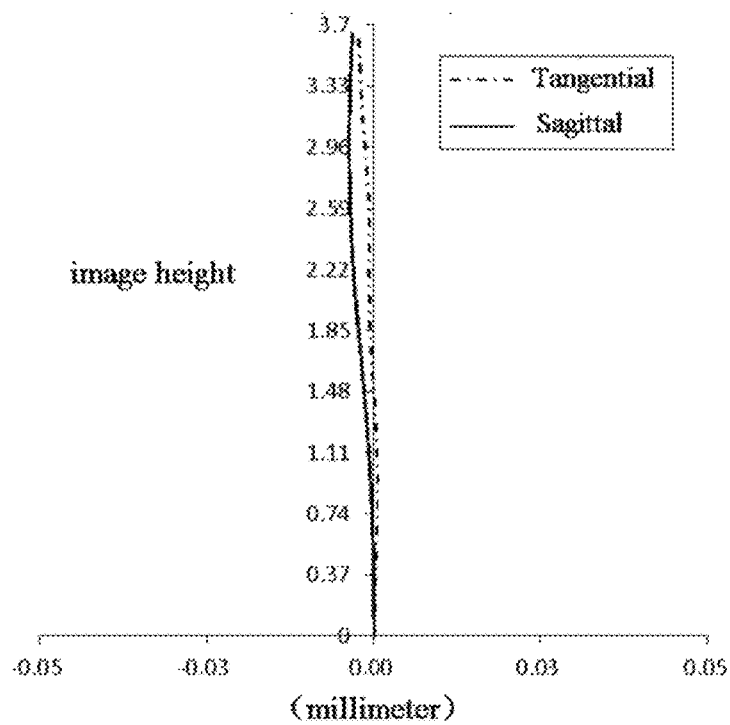
Figure 9C:
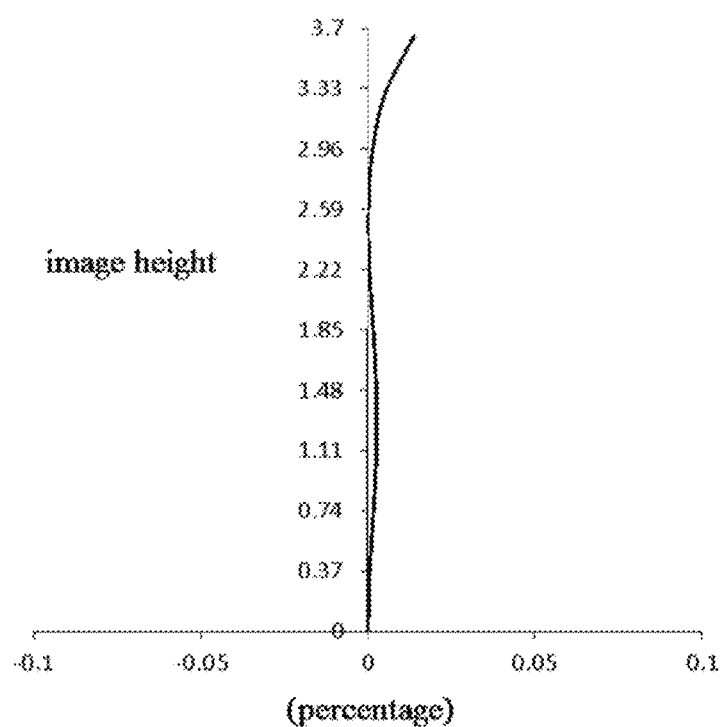
Figure 9D:
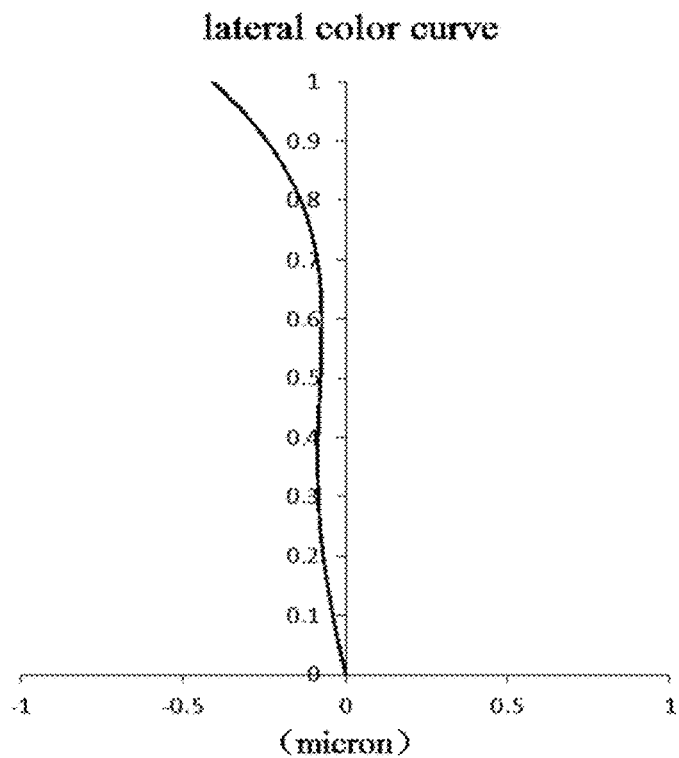

FIG. 9A shows a longitudinal aberration curve of the optical imaging system according to Embodiment 4 to represent deviations of a convergence focal point after light with different wavelengths passes through the lens. FIG. 9B shows an astigmatism curve of the optical imaging system according to Embodiment 4 to represent a tangential image surface curvature and a sagittal image surface curvature. FIG. 9C shows a distortion curve of the optical imaging system according to Embodiment 4 to represent distortion values corresponding to different image heights. FIG. 9D shows a lateral color curve of the optical imaging system according to Embodiment 4 to represent deviations of different image heights on the imaging surface after the light passes through the lens. FIG. 22D shows a MTF curve of the optical imaging system according to Embodiment 4 to represent variations of a modulation degree with a spatial frequency. According to FIGS. 9A-9D and FIG. 22D, it can be seen that the optical imaging system provided in Embodiment 4 may achieve high imaging quality.

Embodiment 5

Figure 10:
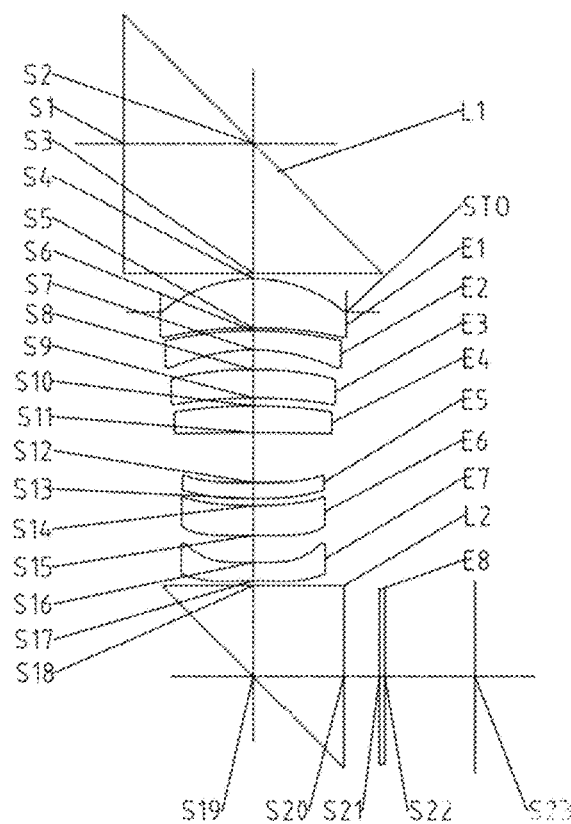
FIG. 10 shows a structural schematic diagram of an optical imaging system according to Embodiment 5 of the disclosure.

An optical imaging system according to Embodiment 5 of the disclosure will be described below with reference to FIGS. 10-11D. FIG. 10 shows a structural schematic diagram of an optical imaging system according to Embodiment 5 of the disclosure.

As shown in FIG. 10, the optical imaging system sequentially includes from an object side to an image side along a second optical axis: a first prism L1, a diaphragm STO, a first lens E1, a second lens E2, a third lens E3, a fourth lens E4, a fifth lens E5, a sixth lens E6, a seventh lens E7, a second prism L2 and an optical filter E8. The first prism L1 is a first refraction optical element in a first imaging lens group, the second prism L2 is a second refraction optical element in a second imaging lens group.

The first prism L1 includes an incidence surface S1, a reflecting surface S2 and an emergence surface S3. The first lens E1 has a positive refractive power, an object-side surface S4 thereof is a convex surface, and an image-side surface S5 is a concave surface. The second lens E2 has a negative refractive power, an object-side surface S6 thereof is a convex surface, and an image-side surface S7 is a concave surface. The third lens E3 has a negative refractive power, an object-side surface S8 thereof is a convex surface, and an image-side surface S9 is a concave surface. The fourth lens E4 has a positive refractive power, an object-side surface S10 thereof is a convex surface, and an image-side surface S11 is a convex surface. The fifth lens E5 has a positive refractive power, an object-side surface S12 thereof is a concave surface, and an image-side surface S13 is a convex surface. The sixth lens E6 has a negative refractive power, an object-side surface S14 thereof is a concave surface, and an image-side surface S15 is a convex surface. The seventh lens E7 has a negative refractive power, an object-side surface S16 thereof is a convex surface, and an image-side surface S17 is a concave surface. The second prism L2 includes an incidence surface S18, a reflecting surface S19 and an emergence surface S20. The optical filter E8 has an object-side surface S21 and an image-side surface S22. The optical imaging system has an imaging surface S23. Light from an object penetrates through the incidence surface S1 of the first prism L1 along a first optical axis, sequentially penetrates through each of the surfaces S3 to S18 after deflected by the reflecting surface S2 of the first prism L1 to be along the second optical axis, then sequentially penetrates through each of the surfaces S20 to S21 after deflected by the reflecting surface S19 of the second prism L2 to be along a third optical axis, and is finally imaged on the imaging surface S23.

In Embodiment 5, a value of a total effective focal length f of the optical imaging system is 24.90 mm. TTLz is an on-axis distance from the object-side surface S1 of the first prism L1 to the imaging surface S23 on the first optical axis (or a normal direction of the imaging surface S23), and a value of TTLz is 13.56 mm. ImgH is a half of a diagonal length of an effective pixel region on the imaging surface S23, and a value of ImigH is 3.65 mm. FOV is a maximum field of view, and a value of FOV is 16.7°.

Table 9 shows a basic parameter table of the optical imaging system of Embodiment 5, wherein the units of the curvature radius, the thickness/distance and the focal length are all millimeters (mm). Table 10 shows high-order coefficients that can be used for each aspheric mirror surface in Embodiment 5. A surface type of each aspheric surface may be defined by formula (1) given in Embodiment 1.

TABLE 9

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| S1 | Spherical | Infinite | 5.0000 | 1.52 | 64.2 | | |
| S2 | Spherical | Infinite | 5.0000 | 1.52 | 64.2 | | |
| S3 | Spherical | Infinite | 1.5000 | | | | |
| STO | Spherical | Infinite | −1.2865 | | | | |
| S4 | Aspheric | 5.5633 | 1.9045 | 1.55 | 56.1 | 12.54 | 0.0039 |
| S5 | Aspheric | 26.1064 | 0.0951 | | | | 1.1500 |
| S6 | Aspheric | 13.5639 | 0.7429 | 1.67 | 19.2 | −22.40 | 0.5662 |
| S7 | Aspheric | 7.0014 | 0.7669 | | | | −0.0280 |
| S8 | Aspheric | 20.9395 | 1.0930 | 1.55 | 56.1 | −279.32 | −0.2235 |
| S9 | Aspheric | 18.0717 | 0.3057 | | | | 4.3878 |
| S10 | Aspheric | 17.5371 | 1.0371 | 1.55 | 56.1 | 31.29 | −8.5956 |
| S11 | Spherical | −639.3964 | 1.9227 | | | | 99.0000 |
| S12 | Spherical | −110.0866 | 0.6000 | 1.67 | 19.2 | 55.17 | −39.1287 |
| S13 | Spherical | −27.9465 | 0.2763 | | | | 26.3420 |
| S14 | Aspheric | −11.6742 | 1.1504 | 1.55 | 56.1 | −23.05 | −3.2105 |
| S15 | Aspheric | −167.5057 | 1.0363 | | | | 99.0000 |
| S16 | Aspheric | 51.2873 | 0.7229 | 1.55 | 56.1 | −31.03 | 80.2145 |
| S17 | Aspheric | 12.6706 | 0.1828 | | | | −32.0946 |
| S18 | Spherical | Infinite | 3.5000 | 1.52 | 64.2 | | |
| S19 | Spherical | Infinite | 3.5000 | 1.52 | 64.2 | | |
| S20 | Spherical | Infinite | 1.3680 | | | | |
| S21 | Spherical | Infinite | 0.2100 | 1.52 | 64.2 | | |
| S22 | Spherical | Infinite | 3.4720 | | | | |
| S23 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S4 | −1.1985E−02 | 7.5543E−03 | 9.4104E−06 | 1.8977E−04 | 1.0734E−04 | 1.9366E−05 | 2.0661E−05 | 2.6786E−07 | −6.1647E−07 |
| S5 | −1.5084E−01 | 2.2979E−02 | −4.1940E−03 | 1.6885E−03 | 2.9697E−04 | 3.4125E−04 | 1.3529E−04 | 1.6196E−04 | 2.2398E−07 |
| S6 | 4.9501E−02 | −4.5451E−03 | −2.5353E−04 | 8.1598E−04 | 8.0043E−05 | 4.5871E−04 | 6.7377E−05 | 2.0108E−04 | −6.6742E−06 |
| S7 | 7.8931E−02 | −4.6711E−03 | −3.7457E−04 | 6.6087E−04 | −2.7395E−05 | 2.7054E−04 | −6.1740E−05 | 5.7489E−05 | 1.0262E−05 |
| S8 | −1.5031E−01 | 2.0624E−02 | −4.8731E−03 | 3.0253E−03 | 7.1518E−06 | −1.3488E−04 | −2.4019E−04 | −1.0913E−04 | 3.7804E−05 |
| S9 | 1.7389E−02 | −1.0656E−02 | 4.9348E−03 | 3.2026E−04 | 6.0061E−04 | −5.5071E−04 | −6.1585E−04 | −2.6154E−04 | 4.3660E−05 |
| S10 | 1.3423E−02 | −6.2537E−03 | 2.0403E−03 | −1.7642E−03 | 1.6511E−03 | 4.5896E−04 | −2.4804E−04 | −1.7150E−04 | −2.5426E−05 |
| S11 | −5.5325E−02 | 1.9865E−02 | −4.4512E−03 | 1.1506E−03 | 1.0986E−03 | 4.2955E−04 | −1.5434E−04 | −1.2183E−04 | −5.9423E−05 |
| S12 | 2.3402E−01 | −8.1341E−03 | 4.1135E−03 | 2.8748E−03 | −5.2254E−04 | 2.2893E−04 | 3.2217E−05 | −5.1778E−05 | −3.7000E−05 |
| S13 | 1.9081E−01 | −1.7044E−02 | 3.1732E−03 | 2.5321E−03 | −3.6354E−04 | 4.0527E−04 | 1.3529E−04 | −5.9572E−05 | −5.7369E−05 |
| S14 | 3.5022E−03 | 3.2419E−02 | −8.1448E−03 | 1.1752E−03 | 5.6662E−04 | 1.2644E−04 | 1.7689E−04 | 2.8633E−05 | −2.5020E−05 |
| S15 | 2.4359E−01 | 4.4716E−02 | −8.2843E−03 | 6.6008E−04 | 4.1425E−05 | −3.1385E−04 | 5.7858E−05 | 4.8285E−05 | −1.0252E−05 |
| S16 | 7.8833E−01 | −2.4530E−02 | −3.3492E−03 | −2.1340E−03 | −1.0759E−03 | −4.6844E−04 | −2.3975E−05 | 7.3874E−05 | 5.7127E−06 |
| S17 | 5.6355E−01 | −6.0925E−02 | 1.9775E−03 | −1.4994E−03 | −6.1438E−04 | −2.4491E−04 | −4.2692E−05 | −1.3744E−05 | −2.2435E−05 |

Figure 11A:
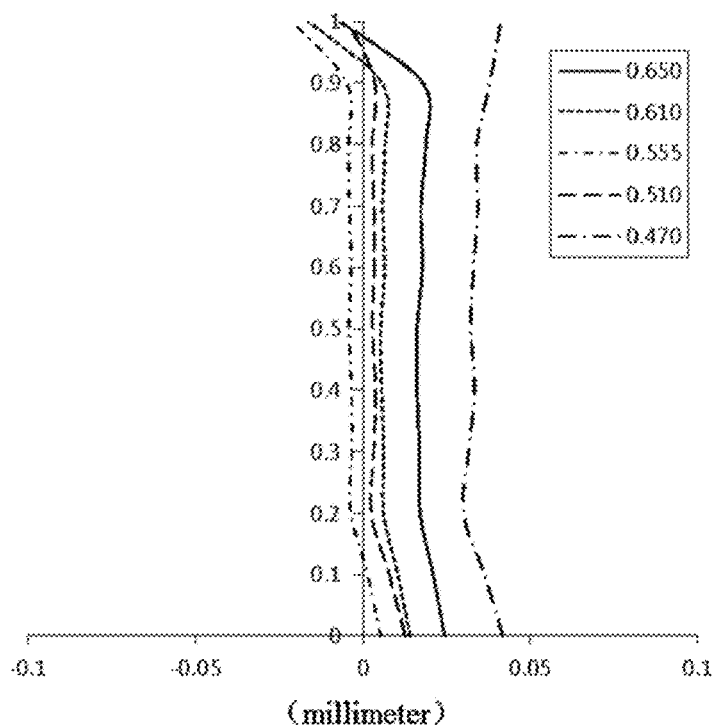
FIGS. 11A-11D show a longitudinal aberration curve, an astigmatism curve, a distortion curve and a lateral color curve of an optical imaging system according to Embodiment 5 respectively.
Figure 11B:
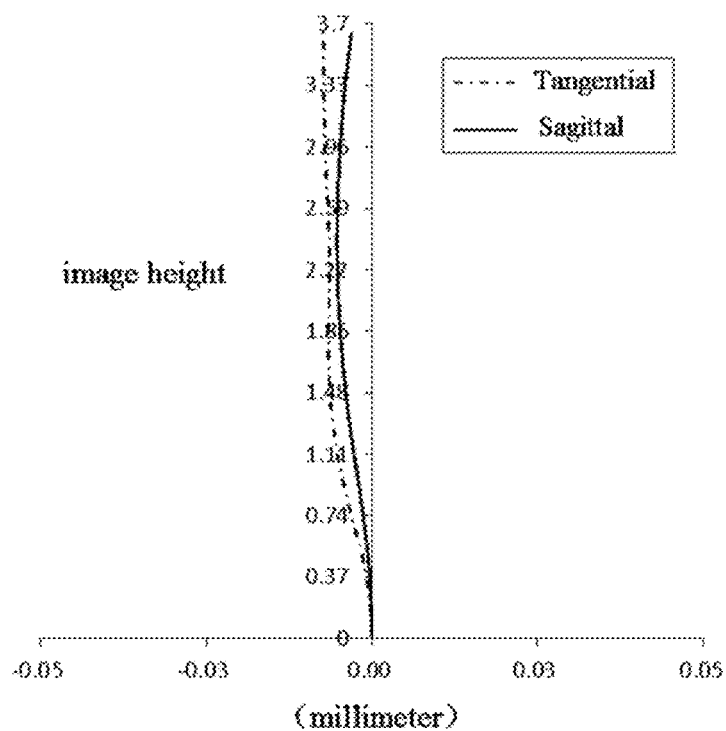
Figure 11C:
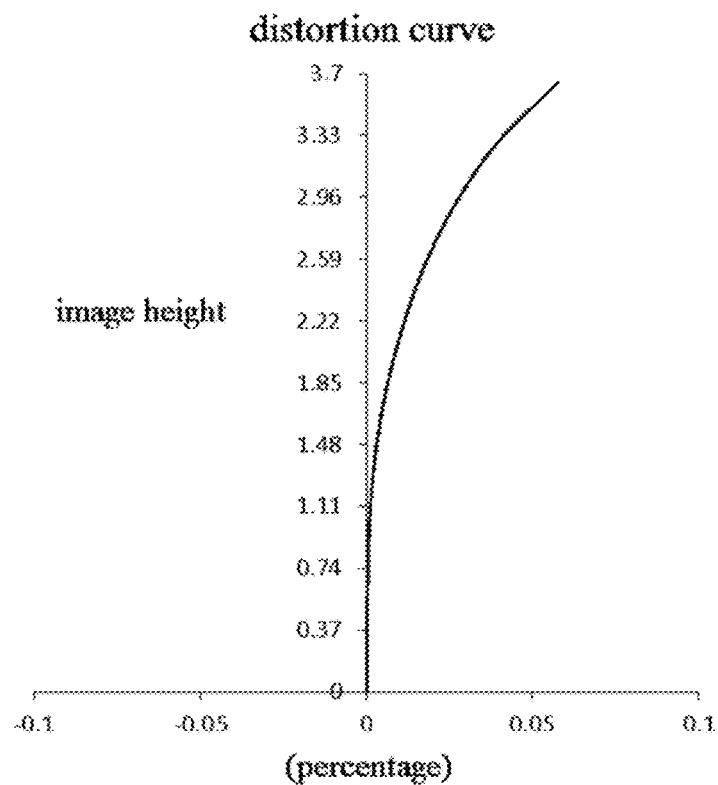
Figure 11D:
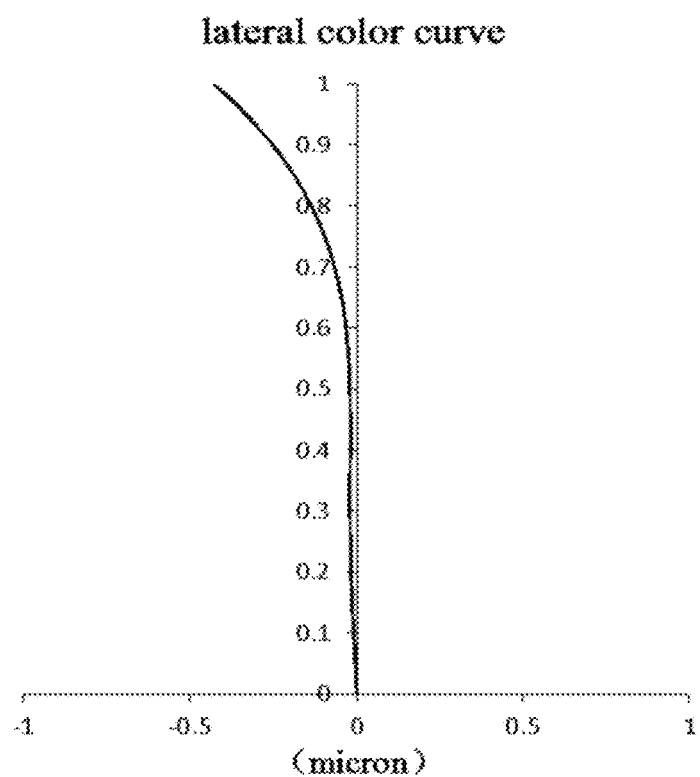

FIG. 11A shows a longitudinal aberration curve of the optical imaging system according to Embodiment 5 to represent deviations of a convergence focal point after light with different wavelengths passes through the lens. FIG. 11B shows an astigmatism curve of the optical imaging system according to Embodiment 5 to represent a tangential image surface curvature and a sagittal image surface curvature. FIG. 11C shows a distortion curve of the optical imaging system according to Embodiment 5 to represent distortion values corresponding to different image heights. FIG. 11D shows a lateral color curve of the optical imaging system according to Embodiment 5 to represent deviations of different image heights on the imaging surface after the light passes through the lens. FIG. 22E shows a MTF curve of the optical imaging system according to Embodiment 5 to represent variations of a modulation degree with a spatial frequency. According to FIGS. 11A-11D and FIG. 22E, it can be seen that the optical imaging system provided in Embodiment 5 may achieve high imaging quality.

Embodiment 6

Figure 12:
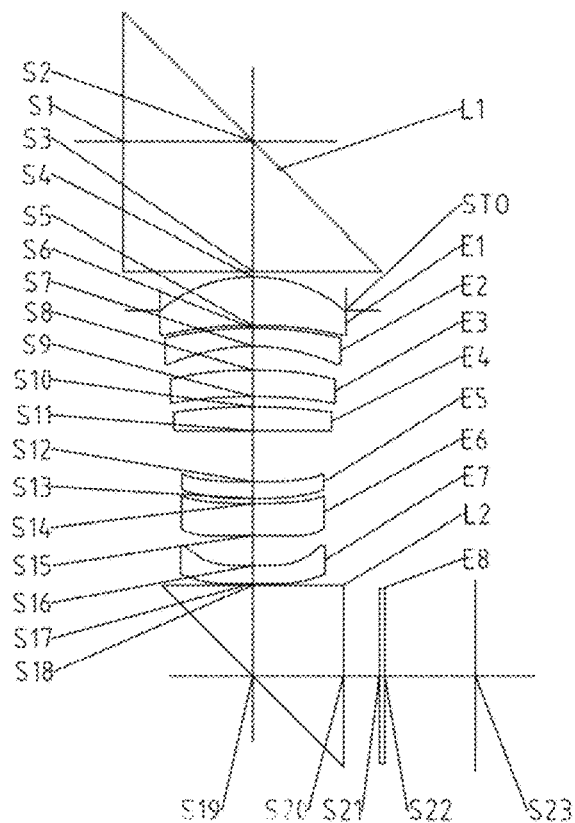
FIG. 12 shows a structural schematic diagram of an optical imaging system according to Embodiment 6 of the disclosure.

An optical imaging system according to Embodiment 6 of the disclosure will be described below with reference to FIGS. 12-13D. FIG. 12 shows a structural schematic diagram of an optical imaging system according to Embodiment 6 of the disclosure.

As shown in FIG. 12, the optical imaging system sequentially includes from an object side to an image side along a second optical axis: a first prism L1, a diaphragm STO, a first lens E1, a second lens E2, a third lens E3, a fourth lens E4, a fifth lens E5, a sixth lens E6, a seventh lens E7, a second prism L2 and an optical filter E8. The first prism L1 is a first refraction optical element in a first imaging lens group, the second prism L2 is a second refraction optical element in a second imaging lens group.

The first prism L1 includes an incidence surface S1, a reflecting surface S2 and an emergence surface S3. The first lens E1 has a positive refractive power, an object-side surface S4 thereof is a convex surface, and an image-side surface S5 is a concave surface. The second lens E2 has a negative refractive power, an object-side surface S6 thereof is a convex surface, and an image-side surface S7 is a concave surface. The third lens E3 has a negative refractive power, an object-side surface S8 thereof is a convex surface, and an image-side surface S9 is a concave surface. The fourth lens E4 has a positive refractive power, an object-side surface S10 thereof is a convex surface, and an image-side surface S11 is a convex surface. The fifth lens E5 has a positive refractive power, an object-side surface S12 thereof is a concave surface, and an image-side surface S13 is a convex surface. The sixth lens E6 has a negative refractive power, an object-side surface S14 thereof is a concave surface, and an image-side surface S15 is a concave surface. The seventh lens E7 has a negative refractive power, an object-side surface S16 thereof is a concave surface, and an image-side surface S17 is a concave surface. The second prism L2 includes an incidence surface S18, a reflecting surface S19 and an emergence surface S20. The optical filter E8 has an object-side surface S21 and an image-side surface S22. The optical imaging system has an imaging surface S23. Light from an object penetrates through the incidence surface S1 of the first prism L1 along a first optical axis, sequentially penetrates through each of the surfaces S3 to S18 after deflected by the reflecting surface S2 of the first prism L1 to be along the second optical axis, then sequentially penetrates through each of the surfaces S20 to S21 after deflected by the reflecting surface S19 of the second prism L2 to be along a third optical axis, and is finally imaged on the imaging surface S23.

In Embodiment 6, a value of a total effective focal length f of the optical imaging system is 24.90 mm. TTLz is an on-axis distance from the object-side surface S1 of the first prism L1 to the imaging surface S23 on the first optical axis (or a normal direction of the imaging surface S23), and a value of TTLz is 13.59 mm. ImgH is a half of a diagonal length of an effective pixel region on the imaging surface S23, and a value of ImgH is 3.65 mm. FOV is a maximum field of view, and a value of FOV is 16.7°.

Table 11 shows a basic parameter table of the optical imaging system of Embodiment 6, wherein the units of the curvature radius, the thickness/distance and the focal length are all millimeters (mm). Table 12 shows high-order coefficients that can be used for each aspheric mirror surface in Embodiment 6. A surface type of each aspheric surface may be defined by formula (1) given in Embodiment 1.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Spherical | Infinite | 5.0000 | 1.52 | 64.2 | | |
| S2 | Spherical | Infinite | 5.0000 | 1.52 | 64.2 | | |
| S3 | Spherical | Infinite | 1.5000 | | | | |
| STO | Spherical | Infinite | −1.2985 | | | | |
| S4 | Aspheric | 5.5386 | 1.8839 | 1.55 | 56.1 | 12.62 | 0.0130 |
| S5 | Aspheric | 24.9003 | 0.0920 | | | | 1.3465 |
| S6 | Aspheric | 13.6248 | 0.7037 | 1.67 | 19.2 | −23.08 | 0.6289 |
| S7 | Aspheric | 7.1259 | 0.9240 | | | | −0.0202 |
| S8 | Aspheric | 22.3952 | 1.0174 | 1.55 | 56.1 | −286.25 | −1.5471 |
| S9 | Aspheric | 19.2736 | 0.3974 | | | | 5.5428 |
| S10 | Aspheric | 19.9019 | 0.9205 | 1.55 | 56.1 | 31.12 | −10.8318 |
| S11 | Spherical | −114.1122 | 1.9698 | | | | −99.0000 |
| S12 | Spherical | −122.6040 | 0.6490 | 1.67 | 19.2 | 57.73 | −99.0000 |
| S13 | Spherical | −29.6978 | 0.2017 | | | | 24.7649 |
| S14 | Aspheric | −15.6200 | 1.1987 | 1.55 | 56.1 | −20.98 | −1.2452 |
| S15 | Aspheric | 44.0705 | 1.1649 | | | | 94.0954 |
| S16 | Aspheric | −500.0000 | 0.6859 | 1.55 | 56.1 | −36.08 | −99.0000 |
| S17 | Aspheric | 20.5099 | 0.0696 | | | | −33.0396 |
| S18 | Spherical | Infinite | 3.5000 | 1.52 | 64.2 | | |

TABLE 11-continued

| Surface number | Surface type | Curvature radius | Thickness/ distance | Material Refractive index | Material Abbe number | Focal length | Conic coefficient |
|---|---|---|---|---|---|---|---|
| S19 | Spherical | Infinite | 3.5000 | 1.52 | 64.2 | | |
| S20 | Spherical | Infinite | 1.3803 | | | | |
| S21 | Spherical | Infinite | 0.2100 | 1.52 | 64.2 | | |
| S22 | Spherical | Infinite | 3.4897 | | | | |
| S23 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S4 | −1.4317E−02 | 7.4735E−03 | −1.3987E−04 | 1.9954E−04 | 1.5160E−04 | 2.9709E−05 | 1.6811E−05 | 3.6151E−07 | 1.0669E−07 |
| S5 | −1.5102E−01 | 2.2640E−02 | −4.1566E−03 | 1.7690E−03 | 3.8113E−04 | 4.0245E−04 | 1.7353E−04 | 1.7329E−04 | 1.9094E−05 |
| S6 | 4.9011E−02 | −4.5228E−03 | −4.0677E−04 | 8.6595E−04 | 1.1443E−04 | 5.2401E−04 | 1.2509E−04 | 1.9341E−04 | 7.9763E−06 |
| S7 | 7.8661E−02 | −5.1458E−03 | −4.9760E−04 | 5.6643E−04 | 2.9217E−05 | 2.8635E−04 | −2.3809E−05 | 3.7640E−05 | −5.1615E−06 |
| S8 | −1.4908E−01 | 2.1118E−02 | −4.1865E−03 | 3.0970E−03 | 1.2995E−04 | −2.0271E−04 | −2.9708E−04 | −1.4060E−04 | −4.9490E−06 |
| S9 | 1.5454E−02 | −1.1106E−02 | 4.7042E−03 | 3.1000E−04 | 5.6948E−04 | −6.5494E−04 | −6.9639E−04 | −3.5153E−04 | −2.4464E−05 |
| S10 | 1.5358E−02 | −6.2115E−03 | 2.0719E−03 | −1.6515E−03 | 1.7054E−03 | 4.2373E−04 | −2.3312E−04 | −2.3359E−04 | −4.5781E−05 |
| S11 | −5.7510E−02 | 2.0689E−02 | −3.7941E−03 | 1.0670E−03 | 1.0965E−03 | 3.9001E−04 | −1.4927E−04 | −1.4925E−04 | −4.3710E−05 |
| S12 | 2.3614E−01 | −8.8496E−03 | 4.1107E−03 | 2.8145E−03 | −5.1995E−04 | 2.2642E−04 | −5.5285E−05 | −9.1193E−05 | −2.5436E−05 |
| S13 | 1.9033E−01 | −1.5534E−02 | 3.0941E−03 | 3.0384E−03 | −3.1046E−04 | 5.4652E−04 | 4.5604E−05 | −5.9774E−05 | −2.9481E−05 |
| S14 | 8.8759E−03 | 3.2427E−02 | −7.8604E−03 | 1.4903E−03 | 3.8103E−04 | 2.4633E−04 | 2.1025E−04 | 7.9898E−05 | −5.4087E−06 |
| S15 | 2.5643E−01 | 4.3981E−02 | −7.6276E−03 | 1.0597E−04 | −2.8182E−04 | −2.9046E−04 | 1.2115E−04 | 6.0500E−05 | −1.3330E−05 |
| S16 | 7.7111E−01 | −2.2281E−02 | −6.2922E−03 | −3.7083E−03 | −1.6925E−03 | −4.3554E−04 | 1.2939E−04 | 1.2833E−04 | 1.0803E−05 |
| S17 | 5.7666E−01 | −5.8714E−02 | −1.9690E−05 | −1.8275E−03 | −8.2443E−04 | −2.8769E−04 | −5.8941E−05 | −2.9599E−05 | −2.7995E−05 |

Figure 13A:
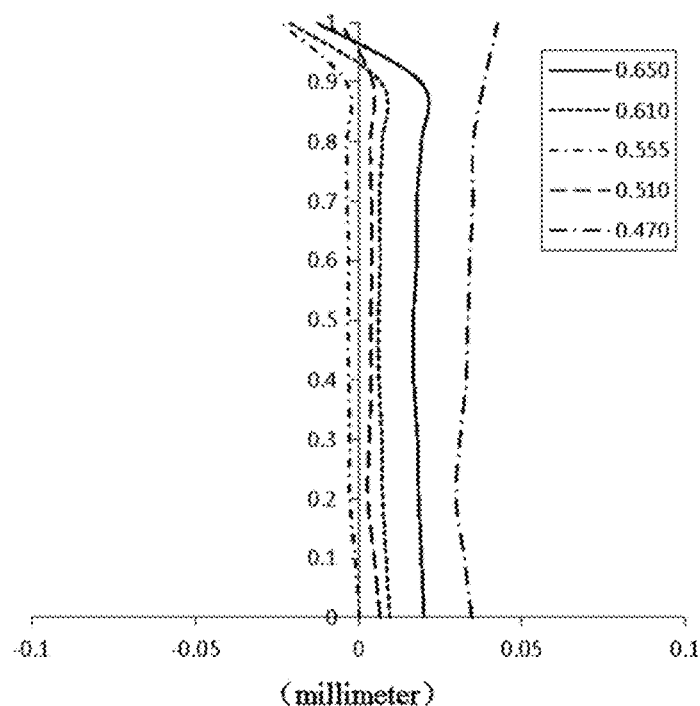
FIGS. 13A-13D show a longitudinal aberration curve, an astigmatism curve, a distortion curve and a lateral color curve of an optical imaging system according to Embodiment 6 respectively.
Figure 13B:
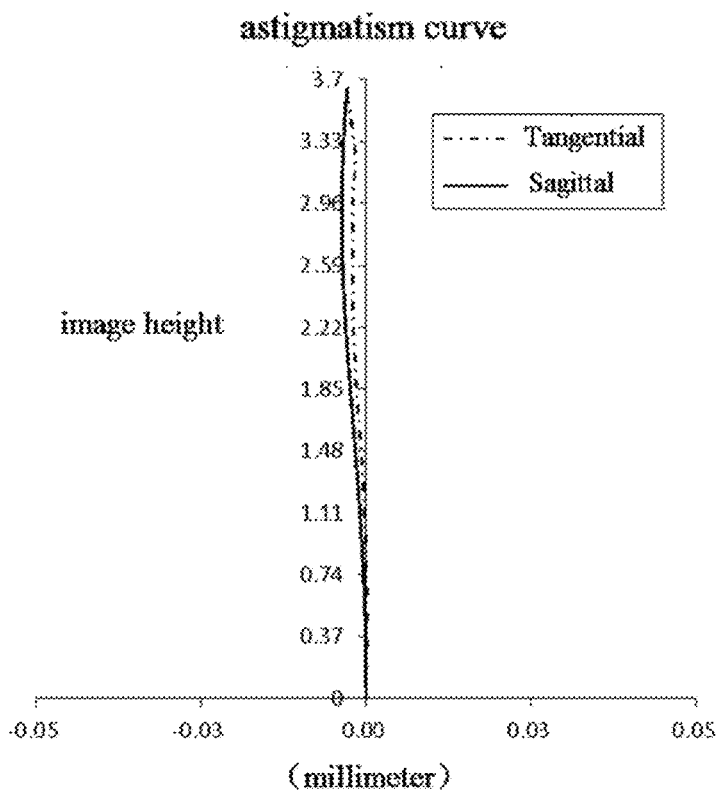
Figure 13C:
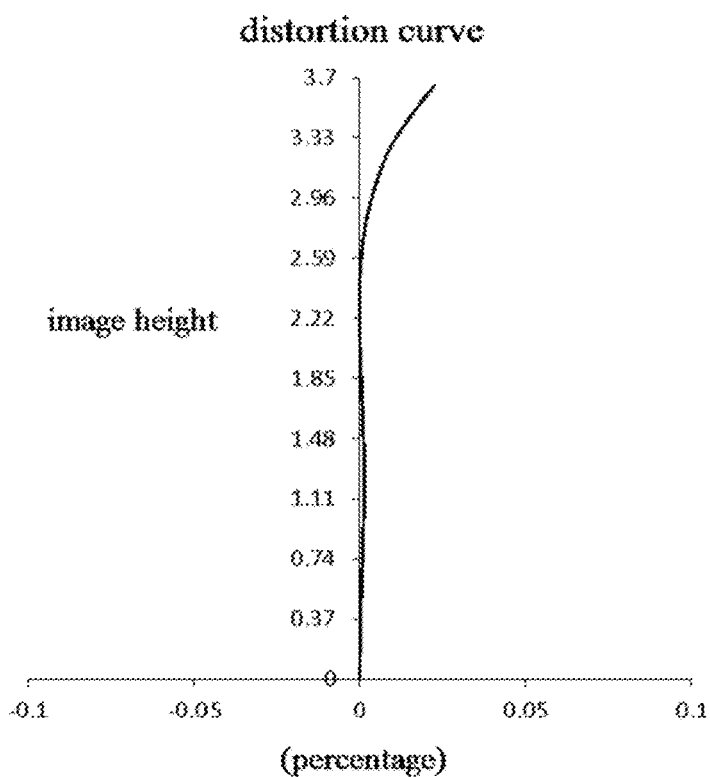
Figure 13D:
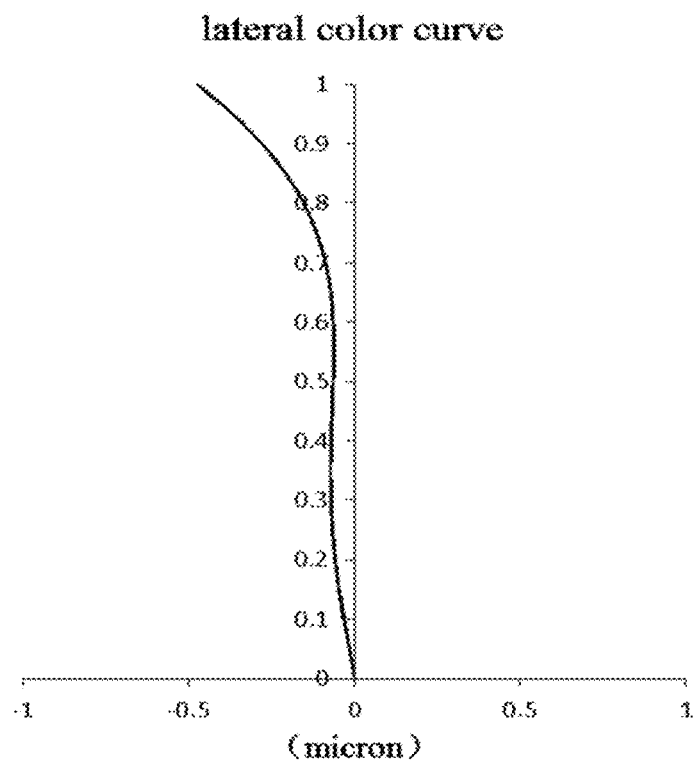

FIG. 13A shows a longitudinal aberration curve of the optical imaging system according to Embodiment 6 to represent deviations of a convergence focal point after light with different wavelengths passes through the lens. FIG. 13B shows an astigmatism curve of the optical imaging system according to Embodiment 6 to represent a tangential image surface curvature and a sagittal image surface curvature. FIG. 13C shows a distortion curve of the optical imaging system according to Embodiment 6 to represent distortion values corresponding to different image heights. FIG. 13D shows a lateral color curve of the optical imaging system according to Embodiment 6 to represent deviations of different image heights on the imaging surface after the light passes through the lens. FIG. 22F shows a MTF curve of the optical imaging system according to Embodiment 6 to represent variations of a modulation degree with a spatial frequency. According to FIGS. 13A-13D and FIG. 22F, it can be seen that the optical imaging system provided in Embodiment 6 may achieve high imaging quality.

Embodiment 7

Figure 14:
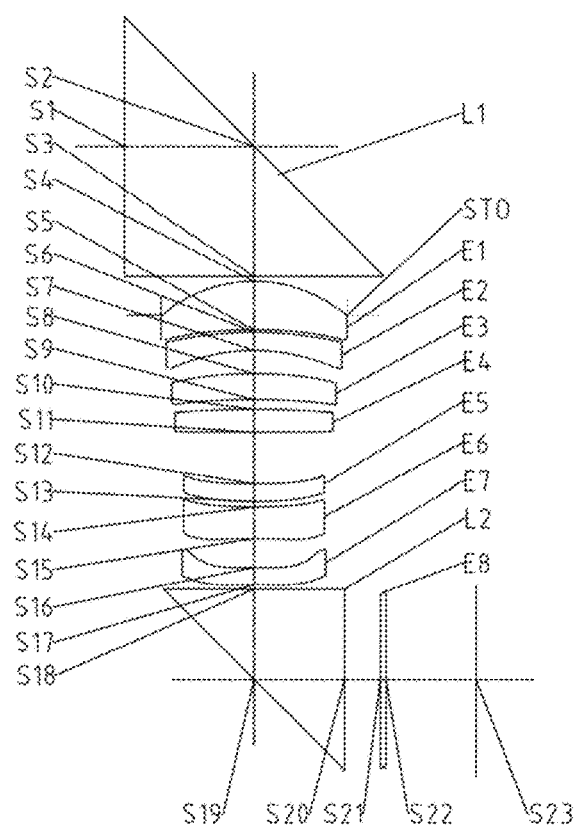
FIG. 14 shows a structural schematic diagram of an optical imaging system according to Embodiment 7 of the disclosure.

An optical imaging system according to Embodiment 7 of the disclosure will be described below with reference to FIGS. 14-15D. FIG. 14 shows a structural schematic diagram of an optical imaging system according to Embodiment 7 of the disclosure.

As shown in FIG. 14, the optical imaging system sequentially includes from an object side to an image side along a second optical axis: a first prism L1, a diaphragm STO, a first lens E1, a second lens E2, a third lens E3, a fourth lens E4, a fifth lens E5, a sixth lens E6, a seventh lens E7, a second prism L2 and an optical filter E8. The first prism L1 is a first refraction optical element in a first imaging lens group, the second prism L2 is a second refraction optical element in a second imaging lens group.

The first prism L1 includes an incidence surface S1, a reflecting surface S2 and an emergence surface S3. The first lens E1 has a positive refractive power, an object-side surface S4 thereof is a convex surface, and an image-side surface S5 is a concave surface. The second lens E2 has a negative refractive power, an object-side surface S6 thereof is a convex surface, and an image-side surface S7 is a concave surface. The third lens E3 has a positive refractive power, an object-side surface S8 thereof is a convex surface, and an image-side surface S9 is a concave surface. The fourth lens E4 has a positive refractive power, an object-side surface S10 thereof is a convex surface, and an image-side surface S11 is a convex surface. The fifth lens E5 has a positive refractive power, an object-side surface S12 thereof is a concave surface, and an image-side surface S13 is a convex surface. The sixth lens E6 has a negative refractive power, an object-side surface S14 thereof is a concave surface, and an image-side surface S15 is a concave surface. The seventh lens E7 has a negative refractive power, an object-side surface S16 thereof is a concave surface, and an image-side surface S17 is a concave surface. The second prism L2 includes an incidence surface S18, a reflecting surface S19 and an emergence surface S20. The optical filter E8 has an object-side surface S21 and an image-side surface S22. The optical imaging system has an imaging surface S23. Light from an object penetrates through the incidence surface S1 of the first prism L1 along a first optical axis, sequentially penetrates through each of the surfaces S3 to S18 after deflected by the reflecting surface S2 of the first prism L1 to be along the second optical axis, then sequentially penetrates through each of the surfaces S20 to S21 after deflected by the reflecting surface S19 of the second prism L2 to be along a third optical axis, and is finally imaged on the imaging surface S23.

In Embodiment 7, a value of a total effective focal length f of the optical imaging system is 24.90 mm. TTLz is an on-axis distance from the object-side surface S1 of the first prism L1 to the imaging surface S23 on the first optical axis (or a normal direction of the imaging surface S23), and a value of TTLz is 13.58 mm. ImgH is a half of a diagonal length of an effective pixel region on the imaging surface S23, and a value of ImigH is 3.65 mm. FOV is a maximum field of view, and a value of FOV is 16.7°.

Table 13 shows a basic parameter table of the optical imaging system of Embodiment 7, wherein the units of the curvature radius, the thickness/distance and the focal length are all millimeters (mm). Table 14 shows high-order coefficients that can be used for each aspheric mirror surface in Embodiment 7. A surface type of each aspheric surface may be defined by formula (1) given in Embodiment 1.

Figure 15A:
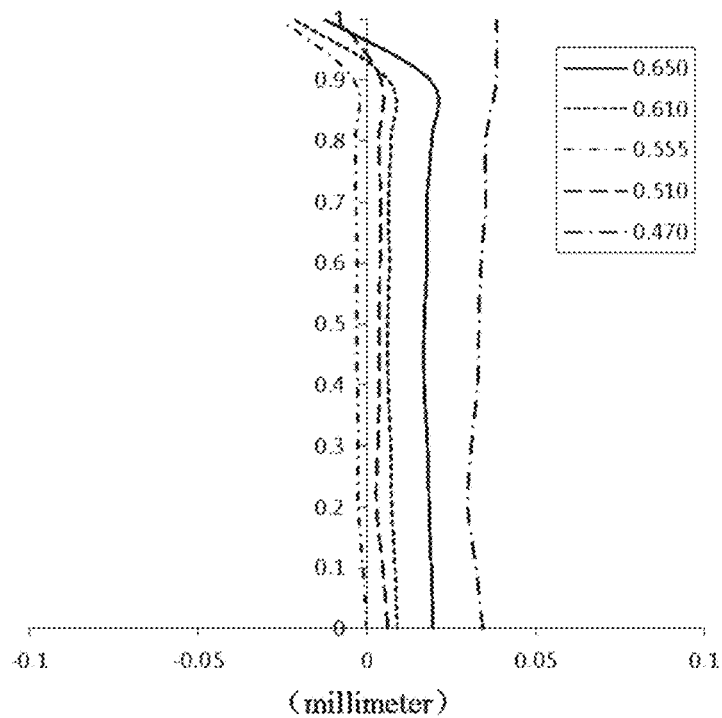
FIGS. 15A-15D show a longitudinal aberration curve, an astigmatism curve, a distortion curve and a lateral color curve of an optical imaging system according to Embodiment 7 respectively.
Figure 15B:
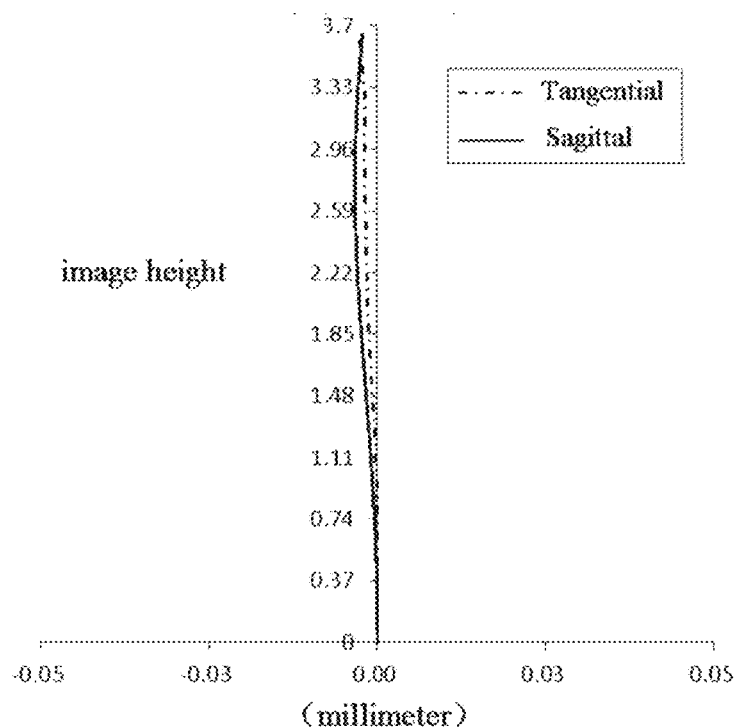
Figure 15C:
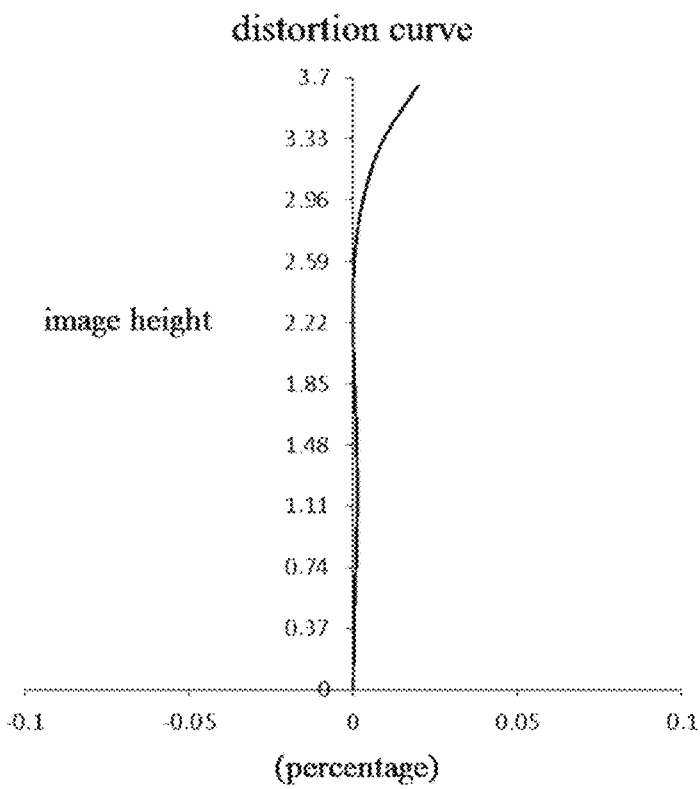
Figure 15D:
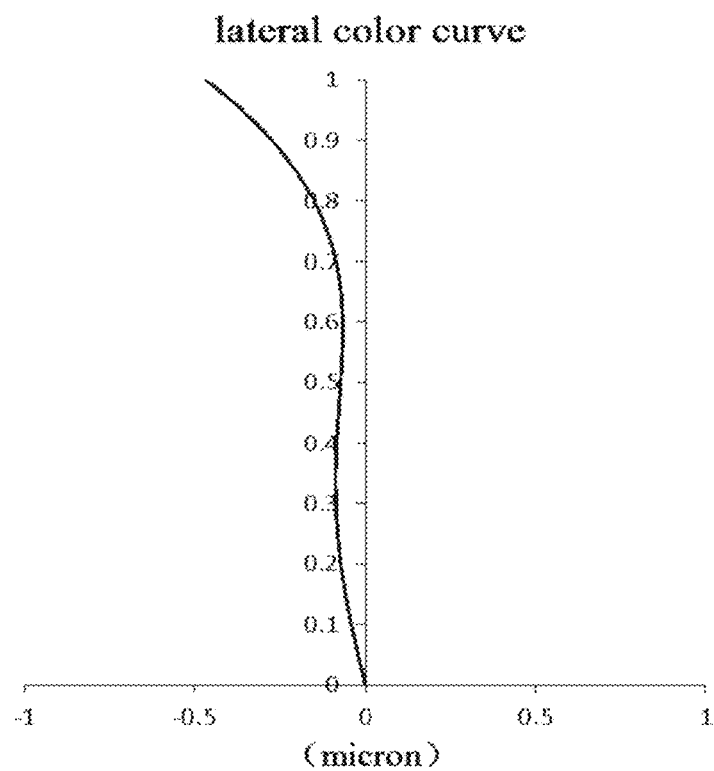

FIG. 15A shows a longitudinal aberration curve of the optical imaging system according to Embodiment 7 to represent deviations of a convergence focal point after light with different wavelengths passes through the lens. FIG. 15B shows an astigmatism curve of the optical imaging system according to Embodiment 7 to represent a tangential image surface curvature and a sagittal image surface curvature. FIG. 15C shows a distortion curve of the optical imaging system according to Embodiment 7 to represent distortion values corresponding to different image heights. FIG. 15D shows a lateral color curve of the optical imaging system according to Embodiment 7 to represent deviations of different image heights on the imaging surface after the light passes through the lens. FIG. 22G shows a MTF curve of the optical imaging system according to Embodiment 7 to represent variations of a modulation degree with a spatial frequency. According to FIGS. 15A-15D and FIG. 22G, it

TABLE 13

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Spherical | Infinite | 5.0000 | 1.52 | 64.2 | | |
| S2 | Spherical | Infinite | 5.0000 | 1.52 | 64.2 | | |
| S3 | Spherical | Infinite | 1.5000 | | | | |
| STO | Spherical | Infinite | −1.3028 | | | | |
| S4 | Aspheric | 5.5190 | 1.8753 | 1.55 | 56.1 | 12.66 | 0.0088 |
| S5 | Aspheric | 24.0970 | 0.0874 | | | | 1.9578 |
| S6 | Aspheric | 13.3373 | 0.7061 | 1.67 | 19.2 | −23.02 | 0.6238 |
| S7 | Aspheric | 7.0325 | 0.9036 | | | | −0.0210 |
| S8 | Aspheric | 22.4776 | 0.9988 | 1.55 | 56.1 | 400.00 | −2.1141 |
| S9 | Aspheric | 24.6640 | 0.3761 | | | | 6.3681 |
| S10 | Aspheric | 29.9262 | 0.8911 | 1.55 | 56.1 | 36.40 | −13.2351 |
| S11 | Spherical | −58.5232 | 1.9795 | | | | −99.0000 |
| S12 | Spherical | −80.7353 | 0.6684 | 1.67 | 19.2 | 57.14 | −38.0561 |
| S13 | Spherical | −26.2381 | 0.2196 | | | | 22.7655 |
| S14 | Aspheric | −14.3577 | 1.2238 | 1.55 | 56.1 | −18.37 | −1.8221 |
| S15 | Aspheric | 34.2275 | 1.1215 | | | | 92.8829 |
| S16 | Aspheric | 30.7398 | 0.6591 | 1.55 | 56.1 | −46.17 | −18.6946 |
| S17 | Aspheric | 13.7439 | 0.1724 | | | | −50.5308 |
| S18 | Spherical | Infinite | 3.5000 | 1.52 | 64.2 | | |
| S19 | Spherical | Infinite | 3.5000 | 1.52 | 64.2 | | |
| S20 | Spherical | Infinite | 1.3843 | | | | |
| S21 | Spherical | Infinite | 0.2100 | 1.52 | 64.2 | | |
| S22 | Spherical | Infinite | 3.4857 | | | | |
| S23 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S4 | −1.3214E−02 | 7.5415E−03 | −3.0083E−04 | 1.3863E−04 | 1.4060E−04 | 3.9409E−06 | 1.2607E−05 | −2.0153E−06 | −3.9391E−07 |
| S5 | −1.5171E−01 | 2.2528E−02 | −4.5455E−03 | 1.6739E−03 | 3.2063E−04 | 3.4469E−04 | 1.5218E−04 | 1.7572E−04 | 1.7070E−05 |
| S6 | 4.9033E−02 | −4.4079E−03 | −3.1124E−04 | 8.0589E−04 | 6.9097E−05 | 5.4168E−04 | 7.1586E−05 | 2.0593E−04 | −1.7888E−07 |
| S7 | 7.8669E−02 | −5.0115E−03 | −3.1474E−04 | 5.6915E−04 | 4.0196E−05 | 3.3068E−04 | −6.6021E−05 | 5.0784E−05 | −1.6006E−05 |
| S8 | −1.4854E−01 | 2.1469E−02 | −4.1955E−03 | 3.1405E−03 | 1.5575E−04 | −2.4882E−04 | −2.4030E−04 | −1.3135E−04 | −2.2990E−05 |
| S9 | 1.5063E−02 | −1.0996E−02 | 5.1308E−03 | 2.0726E−04 | 6.2281E−04 | −5.6567E−04 | −4.5725E−04 | −3.3514E−04 | −4.9458E−05 |
| S10 | 1.5767E−02 | −6.3808E−03 | 1.9008E−03 | −1.6308E−03 | 1.6041E−03 | 4.2449E−04 | −1.3077E−04 | −2.1809E−04 | −5.8837E−05 |
| S11 | −5.7716E−02 | 2.0817E−02 | −4.3160E−03 | 1.1126E−03 | 8.4921E−04 | 4.1980E−04 | −7.1902E−05 | −9.2624E−05 | −3.8200E−05 |
| S12 | 2.3635E−01 | −9.7245E−03 | 4.1063E−03 | 2.9156E−03 | −6.4613E−04 | 2.4449E−04 | −5.7069E−06 | −3.6810E−05 | −1.9982E−05 |
| S13 | 1.9008E−01 | −1.6629E−02 | 2.8829E−03 | 2.9105E−03 | −5.2244E−04 | 5.0606E−04 | 7.2417E−05 | 4.8317E−06 | −3.8321E−05 |
| S14 | 7.8869E−03 | 3.1758E−02 | −8.6325E−03 | 1.2625E−03 | 3.2397E−04 | 1.4923E−04 | 1.5537E−04 | 9.1299E−05 | −1.6423E−05 |
| S15 | 2.5649E−01 | 4.3822E−02 | −7.3257E−03 | 5.4588E−05 | −1.8797E−04 | −3.4948E−04 | 9.2187E−05 | 5.7240E−05 | −1.2132E−05 |
| S16 | 7.9407E−01 | −1.9840E−02 | −3.4273E−03 | −2.8653E−03 | −1.3487E−03 | −5.0446E−04 | 1.7064E−05 | 9.0943E−05 | 8.7218E−06 |
| S17 | 5.8735E−01 | −5.4469E−02 | 1.6533E−04 | −1.5737E−03 | −6.8088E−04 | −2.5636E−04 | −4.3357E−05 | −1.8154E−05 | −2.5556E−05 | can be seen that the optical imaging system provided in Embodiment 7 may achieve high imaging quality.

Embodiment 8

Figure 16:
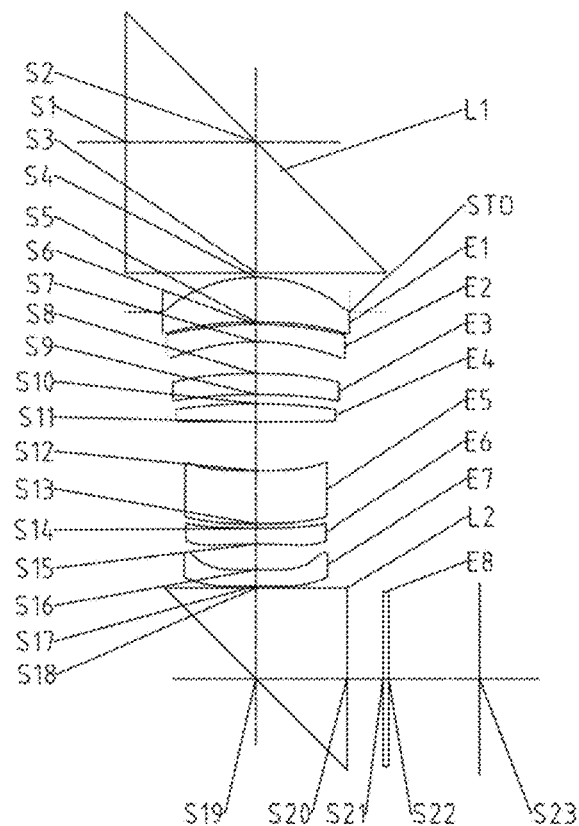
FIG. 16 shows a structural schematic diagram of an optical imaging system according to Embodiment 8 of the disclosure.

An optical imaging system according to Embodiment 8 of the disclosure will be described below with reference to FIGS. 16-17D. FIG. 16 shows a structural schematic diagram of an optical imaging system according to Embodiment 8 of the disclosure.

As shown in FIG. 16, the optical imaging system sequentially includes from an object side to an image side along a second optical axis: a first prism L1, a diaphragm STO, a first lens E1, a second lens E2, a third lens E3, a fourth lens E4, a fifth lens E5, a sixth lens E6, a seventh lens E7, a second prism L2 and an optical filter E8. The first prism L1 is a first refraction optical element in a first imaging lens group, the second prism L2 is a second refraction optical element in a second imaging lens group.

The first prism L1 includes an incidence surface S1, a reflecting surface S2 and an emergence surface S3. The first lens E1 has a positive refractive power, an object-side surface S4 thereof is a convex surface, and an image-side surface S5 is a concave surface. The second lens E2 has a negative refractive power, an object-side surface S6 thereof is a convex surface, and an image-side surface S7 is a concave surface. The third lens E3 has a negative refractive power, an object-side surface S8 thereof is a convex surface, and an image-side surface S9 is a concave surface. The fourth lens E4 has a positive refractive power, an object-side surface S10 thereof is a convex surface, and an image-side surface S11 is a convex surface. The fifth lens E5 has a negative refractive power, an object-side surface S12 thereof is a concave surface, and an image-side surface S13 is a convex surface. The sixth lens E6 has a negative refractive power, an object-side surface S14 thereof is a concave surface, and an image-side surface S15 is a concave surface. The seventh lens E7 has a negative refractive power, an object-side surface S16 thereof is a convex surface, and an image-side surface S17 is a concave surface. The second prism L2 includes an incidence surface S18, a reflecting surface S19 and an emergence surface S20. The optical filter E8 has an object-side surface S21 and an image-side surface S22. The optical imaging system has an imaging surface S23. Light from an object penetrates through the incidence surface S1 of the first prism L1 along a first optical axis, sequentially penetrates through each of the surfaces S3 to S18 after deflected by the reflecting surface S2 of the first prism L1 to be along the second optical axis, then sequentially penetrates through each of the surfaces S20 to S21 after deflected by the reflecting surface S19 of the second prism L2 to be along a third optical axis, and is finally imaged on the imaging surface S23.

In Embodiment 8, a value of a total effective focal length f of the optical imaging system is 24.90 mm. TTLz is an on-axis distance from the object-side surface S1 of the first prism L1 to the imaging surface S23 on the first optical axis (or a normal direction of the imaging surface S23), and a value of TTLz is 13.59 mm. ImgH is a half of a diagonal length of an effective pixel region on the imaging surface S23, and a value of ImgH is 3.65 mm. FOV is a maximum field of view, and a value of FOV is 16.7°.

Table 15 shows a basic parameter table of the optical imaging system of Embodiment 8, wherein the units of the curvature radius, the thickness/distance and the focal length are all millimeters (mm). Table 16 shows high-order coefficients that can be used for each aspheric mirror surface in Embodiment 8. A surface type of each aspheric surface may be defined by formula (1) given in Embodiment 1.

TABLE 15

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| S1 | Spherical | Infinite | 5.0000 | 1.52 | 64.2 | | |
| S2 | Spherical | Infinite | 5.0000 | 1.52 | 64.2 | | |
| S3 | Spherical | Infinite | 1.5000 | | | | |
| STO | Spherical | Infinite | −1.3300 | | | | |
| S4 | Aspheric | 5.4417 | 1.7150 | 1.55 | 56.1 | 13.12 | 0.0204 |
| S5 | Aspheric | 20.1450 | 0.0883 | | | | 1.1649 |
| S6 | Aspheric | 13.4515 | 0.6700 | 1.67 | 19.2 | −29.86 | 0.6127 |
| S7 | Aspheric | 7.9140 | 1.2233 | | | | −0.0184 |
| S8 | Aspheric | 25.9882 | 0.8000 | 1.55 | 56.1 | −155.97 | 1.2084 |
| S9 | Aspheric | 19.6943 | 0.3636 | | | | 3.0433 |
| S10 | Aspheric | 20.6555 | 0.6972 | 1.55 | 56.1 | 28.09 | −3.8487 |
| S11 | Spherical | −58.7931 | 1.8780 | | | | −76.0560 |
| S12 | Spherical | −33.2265 | 2.0345 | 1.67 | 19.2 | −200.00 | −87.5122 |
| S13 | Spherical | −45.1212 | 0.1541 | | | | 22.3985 |
| S14 | Aspheric | −23.2177 | 0.6000 | 1.55 | 56.1 | −23.77 | −2.2027 |
| S15 | Aspheric | 29.6839 | 0.9891 | | | | 99.0000 |
| S16 | Aspheric | 24.7348 | 0.6176 | 1.55 | 56.1 | −55.65 | −83.6432 |
| S17 | Aspheric | 13.5140 | 0.0794 | | | | −53.3816 |
| S18 | Spherical | Infinite | 3.5000 | 1.52 | 64.2 | | |
| S19 | Spherical | Infinite | 3.5000 | 1.52 | 64.2 | | |
| S20 | Spherical | Infinite | 1.3842 | | | | |
| S21 | Spherical | Infinite | 0.2100 | 1.52 | 64.2 | | |
| S22 | Spherical | Infinite | 3.4858 | | | | |
| S23 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S4 | −1.7709E−02 | 9.4099E−03 | 2.5718E−04 | 2.9546E−04 | 1.0575E−04 | 1.6712E−05 | −1.0133E−05 | 2.1031E−05 | 5.1410E−06 |
| S5 | −1.5017E−01 | 2.1877E−02 | −3.1636E−03 | 1.4610E−03 | 4.5433E−04 | 4.6518E−04 | 2.1273E−04 | 2.7989E−04 | −3.4554E−05 |
| S6 | 4.9186E−02 | −4.8487E−03 | −2.8829E−04 | 5.2203E−04 | 2.4725E−04 | 2.8863E−04 | 1.0946E−04 | 1.2146E−04 | −4.8461E−06 |
| S7 | 7.8515E−02 | −4.2027E−03 | −6.3868E−04 | 4.2971E−04 | 1.5289E−04 | −1.6317E−05 | −3.9913E−05 | −1.1791E−04 | 2.9781E−05 |
| S8 | −1.5109E−01 | 2.0607E−02 | −5.5655E−03 | 2.4257E−03 | −4.4933E−06 | −5.2848E−05 | −4.1875E−04 | −2.3528E−04 | 4.6481E−05 |
| S9 | 1.9009E−02 | −1.1083E−02 | 4.6684E−03 | −2.8677E−04 | 8.1700E−04 | 3.6278E−05 | −8.6528E−04 | −4.3127E−04 | 6.9850E−06 |
| S10 | 1.0756E−02 | −6.4981E−03 | 2.1655E−03 | −1.3046E−03 | 1.6291E−03 | 5.9663E−04 | −1.8306E−05 | −2.5636E−04 | −5.7848E−05 |
| S11 | −5.1752E−02 | 2.0938E−02 | −5.2195E−03 | 1.4762E−03 | 5.3558E−04 | 2.0522E−04 | 2.3276E−04 | −1.3589E−04 | −4.5138E−05 |
| S12 | 2.2595E−01 | 3.5274E−03 | 2.0832E−03 | 9.9501E−04 | −4.1529E−04 | −6.8556E−05 | 4.2325E−05 | −8.0574E−05 | −1.1942E−05 |
| S13 | 1.8923E−01 | −2.5957E−02 | 7.6451E−03 | −2.2063E−03 | 2.0445E−03 | −1.0231E−03 | 6.9285E−04 | −5.2876E−04 | 1.6155E−04 |
| S14 | 7.4039E−03 | 1.4509E−02 | −3.9462E−03 | −2.4755E−03 | 4.0546E−03 | −2.3540E−03 | 1.1080E−03 | −7.5232E−04 | 3.4304E−04 |
| S15 | 2.3221E−01 | 6.0366E−02 | −1.1624E−02 | −1.1030E−04 | 7.7879E−04 | −1.4085E−03 | 4.3484E−04 | −8.8084E−05 | 9.2692E−05 |
| S16 | 7.9769E−01 | −2.5531E−02 | −2.7333E−03 | −2.0675E−03 | −9.2072E−04 | −5.9465E−04 | 1.3254E−05 | 8.2968E−05 | 2.5463E−06 |
| S17 | 5.8188E−01 | −6.2382E−02 | 7.5851E−04 | −1.0565E−03 | −5.3016E−04 | −2.4106E−04 | −9.7637E−06 | −1.5959E−05 | −2.7566E−05 |

Figure 17A:
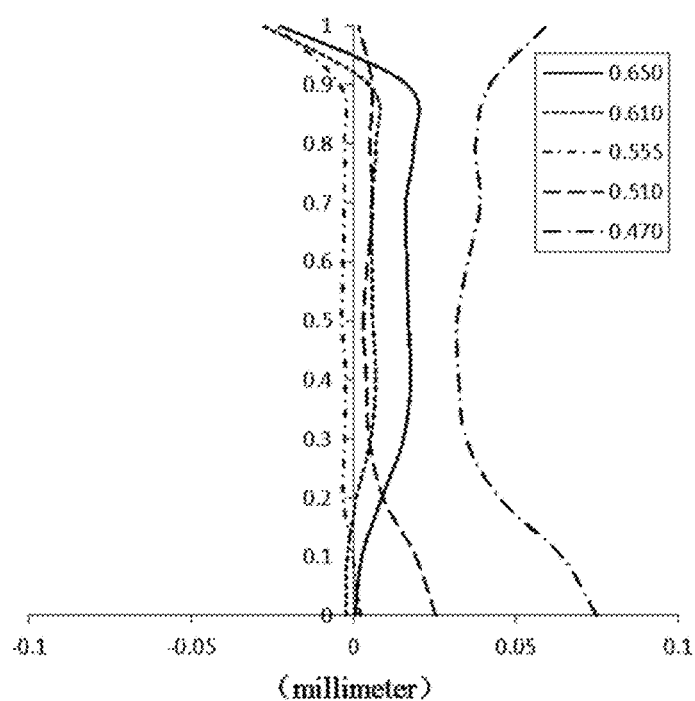
FIGS. 17A-17D show a longitudinal aberration curve, an astigmatism curve, a distortion curve and a lateral color curve of an optical imaging system according to Embodiment 8 respectively.
Figure 17B:
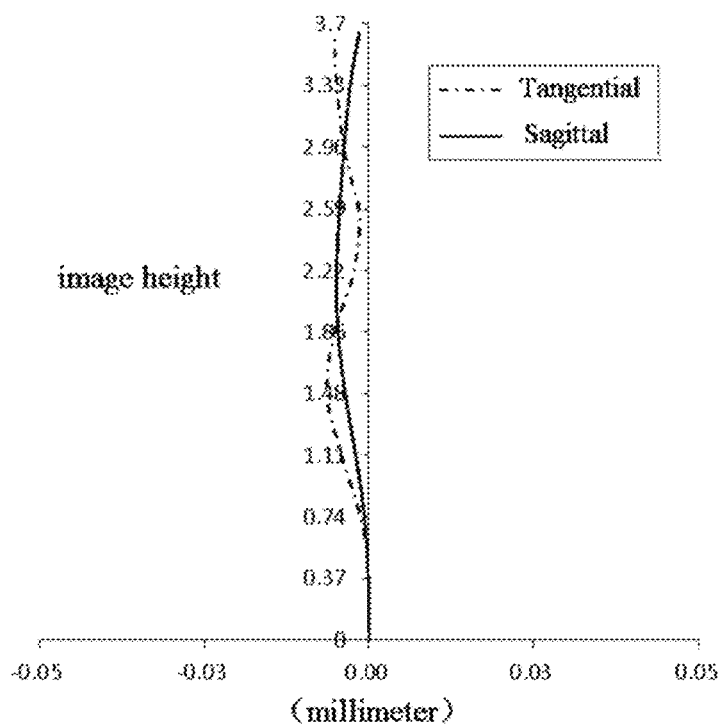
Figure 17C:
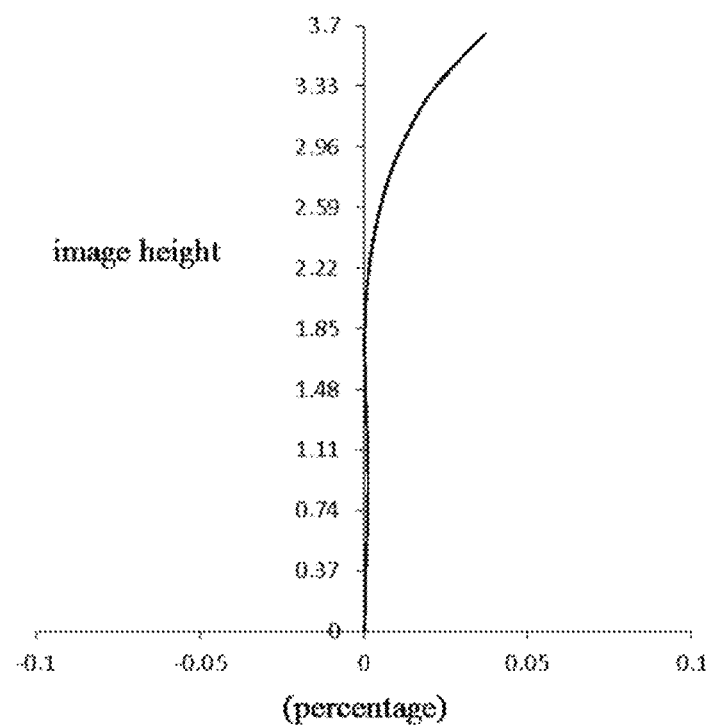
Figure 17D:
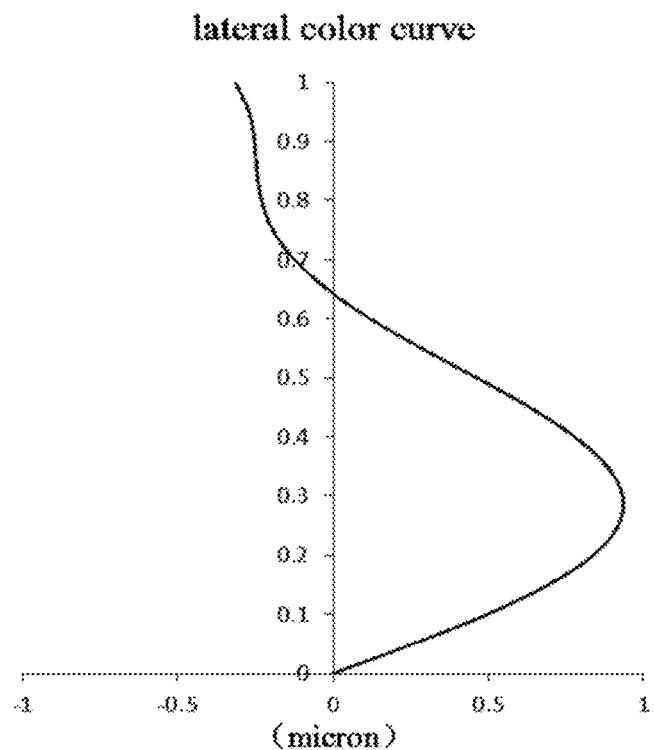

FIG. 17A shows a longitudinal aberration curve of the optical imaging system according to Embodiment 8 to represent deviations of a convergence focal point after light with different wavelengths passes through the lens. FIG. 17B shows an astigmatism curve of the optical imaging system according to Embodiment 8 to represent a tangential image surface curvature and a sagittal image surface curvature. FIG. 17C shows a distortion curve of the optical imaging system according to Embodiment 8 to represent distortion values corresponding to different image heights. FIG. 17D shows a lateral color curve of the optical imaging system according to Embodiment 8 to represent deviations of different image heights on the imaging surface after the light passes through the lens. FIG. 22H shows a MTF curve of the optical imaging system according to Embodiment 8 to represent variations of a modulation degree with a spatial frequency. According to FIGS. 17A-17D and FIG. 22H, it can be seen that the optical imaging system provided in Embodiment 8 may achieve high imaging quality.

Embodiment 9

Figure 18:
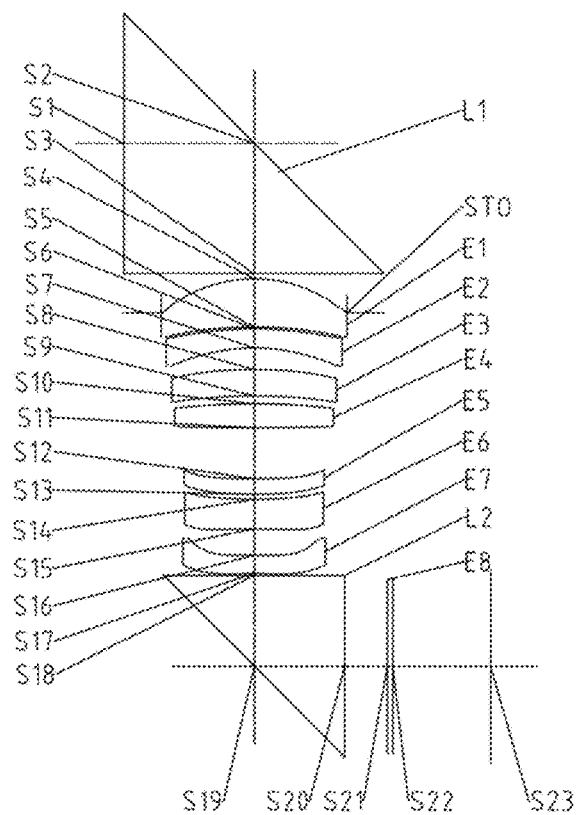
FIG. 18 shows a structural schematic diagram of an optical imaging system according to Embodiment 9 of the disclosure.

An optical imaging system according to Embodiment 9 of the disclosure will be described below with reference to FIGS. 18-19D. FIG. 18 shows a structural schematic diagram of an optical imaging system according to Embodiment 9 of the disclosure.

As shown in FIG. 18, the optical imaging system sequentially includes from an object side to an image side along a second optical axis: a first prism L1, a diaphragm STO, a first lens E1, a second lens E2, a third lens E3, a fourth lens E4, a fifth lens E5, a sixth lens E6, a seventh lens E7, a second prism L2 and an optical filter E8. The first prism L1 is a first refraction optical element in a first imaging lens group, the second prism L2 is a second refraction optical element in a second imaging lens group.

The first prism L1 includes an incidence surface S1, a reflecting surface S2 and an emergence surface S3. The first lens E1 has a positive refractive power, an object-side surface S4 thereof is a convex surface, and an image-side surface S5 is a concave surface. The second lens E2 has a negative refractive power, an object-side surface S6 thereof is a convex surface, and an image-side surface S7 is a concave surface. The third lens E3 has a negative refractive power, an object-side surface S8 thereof is a convex surface, and an image-side surface S9 is a concave surface. The fourth lens E4 has a positive refractive power, an object-side surface S10 thereof is a convex surface, and an image-side surface S11 is a convex surface. The fifth lens E5 has a positive refractive power, an object-side surface S12 thereof is a concave surface, and an image-side surface S13 is a convex surface. The sixth lens E6 has a negative refractive power, an object-side surface S14 thereof is a concave surface, and an image-side surface S15 is a concave surface. The seventh lens E7 has a negative refractive power, an object-side surface S16 thereof is a convex surface, and an image-side surface S17 is a concave surface. The second prism L2 includes an incidence surface S18, a reflecting surface S19 and an emergence surface S20. The optical filter E8 has an object-side surface S21 and an image-side surface S22. The optical imaging system has an imaging surface S23. Light from an object penetrates through the incidence surface S1 of the first prism L1 along a first optical axis, sequentially penetrates through each of the surfaces S3 to S18 after deflected by the reflecting surface S2 of the first prism L1 to be along the second optical axis, then sequentially penetrates through each of the surfaces S20 to S21 after deflected by the reflecting surface S19 of the second prism L2 to be along a third optical axis, and is finally imaged on the imaging surface S23.

In Embodiment 9, a value of a total effective focal length f of the optical imaging system is 24.90 mm. TTLz is an on-axis distance from the object-side surface S1 of the first prism L1 to the imaging surface S23 on the first optical axis (or a normal direction of the imaging surface S23), and a value of TTLz is 14.12 mm. ImgH is a half of a diagonal length of an effective pixel region on the imaging surface S23, and a value of ImgH is 3.65 mm. FOV is a maximum field of view, and a value of FOV is 16.7°.

Table 17 shows a basic parameter table of the optical imaging system of Embodiment 9, wherein the units of the curvature radius, the thickness/distance and the focal length are all millimeters (mm). Table 18 shows high-order coefficients that can be used for each aspheric mirror surface in Embodiment 9. A surface type of each aspheric surface may be defined by formula (1) given in Embodiment 1.

TABLE 17

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Spherical | Infinite | 5.0000 | 1.52 | 64.2 | | |
| S2 | Spherical | Infinite | 5.0000 | 1.52 | 64.2 | | |
| S3 | Spherical | Infinite | 1.5000 | | | | |
| STO | Spherical | Infinite | −1.3064 | | | | |
| S4 | Aspheric | 5.4885 | 1.8640 | 1.55 | 56.1 | 12.56 | −0.0025 |
| S5 | Aspheric | 24.2463 | 0.0646 | | | | 2.5212 |
| S6 | Aspheric | 13.6081 | 0.7332 | 1.67 | 19.2 | −22.83 | 0.5744 |
| S7 | Aspheric | 7.0788 | 0.8365 | | | | −0.0334 |
| S8 | Aspheric | 24.2570 | 1.0169 | 1.55 | 56.1 | −279.83 | 0.0079 |
| S9 | Aspheric | 20.6229 | 0.2994 | | | | 3.9641 |
| S10 | Aspheric | 24.6524 | 0.9289 | 1.55 | 56.1 | 28.77 | −6.9510 |
| S11 | Spherical | −42.7121 | 1.9345 | | | | −95.8474 |
| S12 | Spherical | −76.6590 | 0.6000 | 1.67 | 19.2 | 57.44 | −99.0000 |
| S13 | Spherical | −25.8792 | 0.1957 | | | | 23.5567 |
| S14 | Aspheric | −13.9207 | 1.1384 | 1.55 | 56.1 | −17.77 | −3.3126 |
| S15 | Aspheric | 32.9337 | 1.0159 | | | | 89.2510 |
| S16 | Aspheric | 27.5290 | 0.6970 | 1.55 | 56.1 | −49.02 | −30.0581 |
| S17 | Aspheric | 13.4485 | 0.0809 | | | | −46.5499 |
| S18 | Spherical | Infinite | 3.5000 | 1.52 | 64.2 | | |
| S19 | Spherical | Infinite | 3.5000 | 1.52 | 64.2 | | |
| S20 | Spherical | Infinite | 1.6433 | | | | |
| S21 | Spherical | Infinite | 0.2100 | 1.52 | 64.2 | | |
| S22 | Spherical | Infinite | 3.7462 | | | | |
| S23 | Spherical | Infinite | | | | | |

TABLE 18

| Surface number | A4 | A6 | A8 | A10 | A12 | A14 | A16 | A18 | A20 |
|---|---|---|---|---|---|---|---|---|---|
| S4 | −1.0309E−02 | 7.6631E−03 | −2.3895E−04 | 2.0958E−04 | 1.6181E−04 | 2.9329E−06 | 2.2444E−05 | −4.6550E−06 | −7.5663E−07 |
| S5 | −1.5242E−01 | 2.2282E−02 | −4.6235E−03 | 1.8794E−03 | 3.4085E−04 | 3.6473E−04 | 1.5418E−04 | 1.7170E−04 | 5.2643E−05 |
| S6 | 4.9398E−02 | −4.3727E−03 | −3.1871E−04 | 7.2557E−04 | 4.9909E−05 | 5.4864E−04 | 2.1765E−05 | 2.2633E−04 | 2.3976E−05 |
| S7 | 7.9231E−02 | −4.8699E−03 | −4.1604E−04 | 4.5649E−04 | −3.9805E−05 | 3.2104E−04 | −1.3232E−04 | 8.1677E−05 | −2.3923E−05 |
| S8 | −1.5037E−01 | 2.1598E−02 | −4.5492E−03 | 3.1194E−03 | 1.3141E−04 | −1.3715E−04 | −1.7688E−04 | −9.5963E−05 | −3.2269E−05 |
| S9 | 1.7730E−02 | −1.0799E−02 | 5.2726E−03 | −7.3246E−05 | 6.5299E−04 | −6.2077E−04 | −4.1120E−04 | −4.3934E−04 | −8.2794E−05 |
| S10 | 1.2859E−02 | −6.7530E−03 | 2.0079E−03 | −1.5882E−03 | 1.4842E−03 | 2.9822E−04 | −7.1544E−05 | −2.9223E−04 | −7.9680E−05 |
| S11 | −5.4679E−02 | 2.1575E−02 | −4.5168E−03 | 1.3309E−03 | 5.9022E−04 | 3.9918E−04 | −9.3126E−06 | −7.2807E−05 | −3.6504E−05 |
| S12 | 2.3488E−01 | −9.8446E−03 | 4.4883E−03 | 2.9928E−03 | −6.4217E−04 | 2.9691E−04 | −3.2856E−06 | −4.5053E−05 | −2.4508E−05 |
| S13 | 1.9052E−01 | −1.7082E−02 | 3.6479E−03 | 2.7849E−03 | −4.6216E−04 | 5.1589E−04 | 8.0753E−05 | −1.5752E−05 | −4.1496E−05 |
| S14 | 4.7849E−03 | 3.1899E−02 | −8.4772E−03 | 1.3019E−03 | 2.8514E−04 | 1.7048E−04 | 2.1631E−04 | 9.6805E−05 | −1.1965E−05 |
| S15 | 2.5766E−01 | 4.4027E−02 | −7.1941E−03 | −4.5675E−05 | −5.1794E−04 | −2.9651E−04 | 1.3205E−04 | 6.8931E−05 | −8.7153E−06 |
| S16 | 7.9641E−01 | −1.9435E−02 | −3.1931E−03 | −3.1150E−03 | −1.5976E−03 | −4.2815E−04 | 4.7828E−05 | 8.6467E−05 | 7.8870E−06 |
| S17 | 5.8402E−01 | −5.4292E−02 | 2.9715E−04 | −1.7895E−03 | −7.5085E−04 | −2.0769E−04 | −6.3562E−05 | −2.9258E−05 | −2.3578E−05 |

Figure 19A:
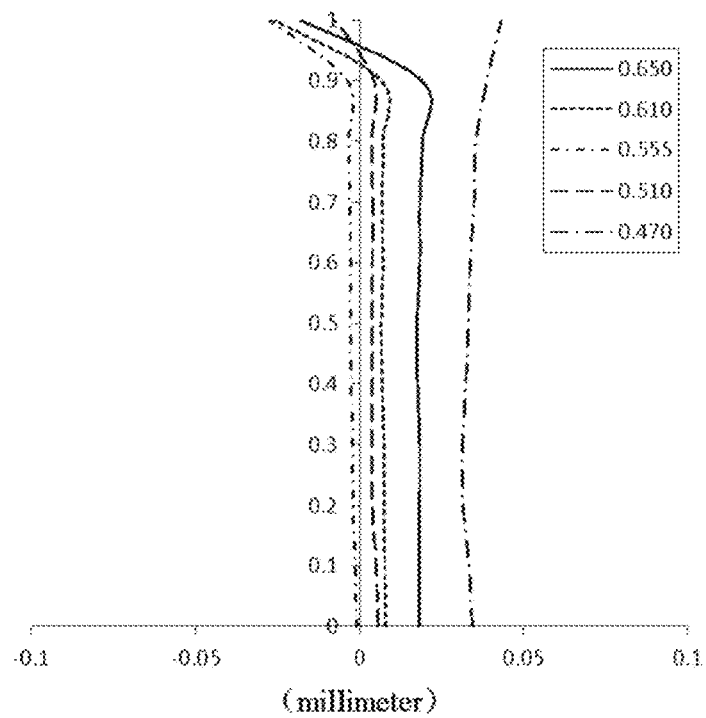
FIGS. 19A-19D show a longitudinal aberration curve, an astigmatism curve, a distortion curve and a lateral color curve of an optical imaging system according to Embodiment 9 respectively.
Figure 19B:
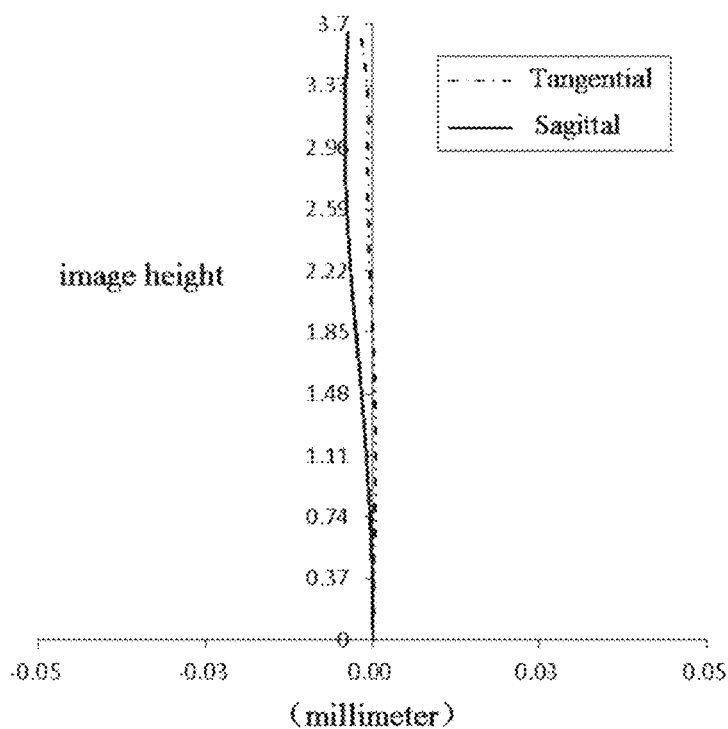
Figure 19C:
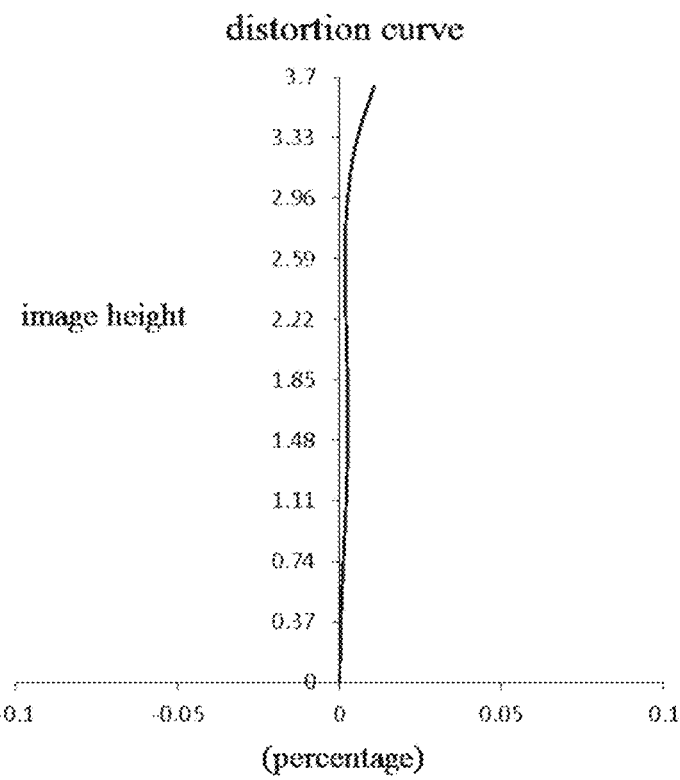
Figure 19D:
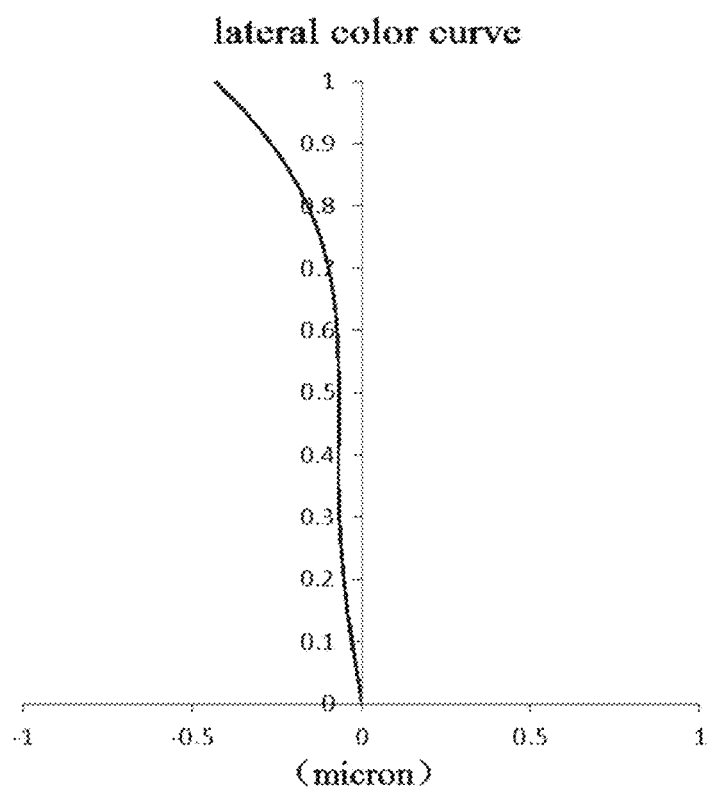

FIG. 19A shows a longitudinal aberration curve of the optical imaging system according to Embodiment 9 to represent deviations of a convergence focal point after light with different wavelengths passes through the lens. FIG. 19B shows an astigmatism curve of the optical imaging system according to Embodiment 9 to represent a tangential image surface curvature and a sagittal image surface curvature. FIG. 19C shows a distortion curve of the optical imaging system according to Embodiment 9 to represent distortion values corresponding to different image heights. FIG. 19D shows a lateral color curve of the optical imaging system according to Embodiment 9 to represent deviations of different image heights on the imaging surface after the light passes through the lens. FIG. 22I shows a MTF curve of the optical imaging system according to Embodiment 9 to represent variations of a modulation degree with a spatial frequency. According to FIGS. 19A-19D and FIG. 22I, it can be seen that the optical imaging system provided in Embodiment 9 may achieve high imaging quality.

Embodiment 10

Figure 20:
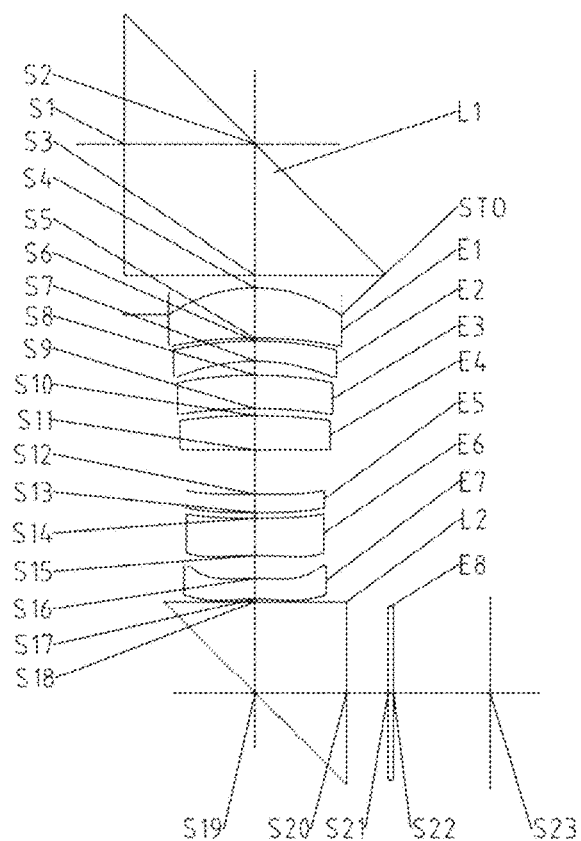
FIG. 20 shows a structural schematic diagram of an optical imaging system according to Embodiment 10 of the disclosure.

An optical imaging system according to Embodiment 10 of the disclosure will be described below with reference to FIGS. 20-21D. FIG. 20 shows a structural schematic diagram of an optical imaging system according to Embodiment 10 of the disclosure.

As shown in FIG. 20, the optical imaging system sequentially includes from an object side to an image side along a second optical axis: a first prism L1, a diaphragm STO, a first lens E1, a second lens E2, a third lens E3, a fourth lens E4, a fifth lens E5, a sixth lens E6, a seventh lens E7, a second prism L2 and an optical filter E8. The first prism L1 is a first refraction optical element in a first imaging lens group, the second prism L2 is a second refraction optical element in a second imaging lens group.

The first prism L1 includes an incidence surface S1, a reflecting surface S2 and an emergence surface S3. The first lens E1 has a positive refractive power, an object-side surface S4 thereof is a convex surface, and an image-side surface S5 is a concave surface. The second lens E2 has a negative refractive power, an object-side surface S6 thereof is a convex surface, and an image-side surface S7 is a concave surface. The third lens E3 has a negative refractive power, an object-side surface S8 thereof is a convex surface, and an image-side surface S9 is a concave surface. The fourth lens E4 has a positive refractive power, an object-side surface S10 thereof is a convex surface, and an image-side surface S11 is a convex surface. The fifth lens E5 has a positive refractive power, an object-side surface S12 thereof is a convex surface, and an image-side surface S13 is a convex surface. The sixth lens E6 has a negative refractive power, an object-side surface S14 thereof is a concave surface, and an image-side surface S15 is a concave surface. The seventh lens E7 has a negative refractive power, an object-side surface S16 thereof is a convex surface, and an image-side surface S17 is a concave surface. The second prism L2 includes an incidence surface S18, a reflecting surface S19 and an emergence surface S20. The optical filter E8 has an object-side surface S21 and an image-side surface S22. The optical imaging system has an imaging surface S23. Light from an object penetrates through the incidence surface S1 of the first prism L1 along a first optical axis, sequentially penetrates through each of the surfaces S3 to S18 after deflected by the reflecting surface S2 of the first prism L1 to be along the second optical axis, then sequentially penetrates through each of the surfaces S20 to S21 after deflected by the reflecting surface S19 of the second prism L2 to be along a third optical axis, and is finally imaged on the imaging surface S23.

In Embodiment 10, a value of a total effective focal length f of the optical imaging system is 24.90 mm. TTLz is an on-axis distance from the object-side surface S1 of the first prism L1 to the imaging surface S23 on the first optical axis (or a normal direction of the imaging surface S23), and a value of TTLz is 13.99 mm. ImgH is a half of a diagonal length of an effective pixel region on the imaging surface S23, and a value of ImgH is 3.65 mm. FOV is a maximum field of view, and a value of FOV is 16.7°.

Table 19 shows a basic parameter table of the optical imaging system of Embodiment 10, wherein the units of the curvature radius, the thickness/distance and the focal length are all millimeters (mm). Table 20 shows high-order coefficients that can be used for each aspheric mirror surface in Embodiment 10. A surface type of each aspheric surface may be defined by formula (1) given in Embodiment 1.

TABLE 19

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| S1 | Spherical | Infinite | 5.0000 | 1.52 | 64.2 | | |
| S2 | Spherical | Infinite | 5.0000 | 1.52 | 64.2 | | |
| S3 | Spherical | Infinite | 1.5000 | | | | |
| STO | Spherical | Infinite | −1.0232 | | | | |
| S4 | Aspheric | 5.7456 | 1.9311 | 1.55 | 56.1 | 12.96 | −0.0212 |
| S5 | Aspheric | 26.9134 | 0.1029 | | | | 1.0202 |
| S6 | Aspheric | 12.8911 | 0.7762 | 1.67 | 19.2 | −23.48 | 0.5222 |
| S7 | Aspheric | 6.9456 | 0.5446 | | | | −0.0424 |
| S8 | Aspheric | 24.9234 | 1.2733 | 1.55 | 56.1 | −136.90 | 2.6623 |
| S9 | Aspheric | 18.3530 | 0.2725 | | | | 3.4210 |
| S10 | Aspheric | 21.0129 | 1.3161 | 1.55 | 56.1 | 30.30 | −6.3727 |
| S11 | Spherical | −75.9977 | 1.6944 | | | | −84.5157 |
| S12 | Spherical | 54.9370 | 0.7075 | 1.67 | 19.2 | 68.45 | 99.0000 |
| S13 | Spherical | −294.5142 | 0.2190 | | | | 25.9310 |
| S114 | Aspheric | −19.5720 | 1.4029 | 1.55 | 56.1 | −20.51 | −22.2129 |
| S15 | Aspheric | 26.8345 | 0.8765 | | | | 85.8645 |
| S16 | Aspheric | 12.9182 | 0.7883 | 1.55 | 56.1 | −57.60 | 0.5799 |
| S17 | Aspheric | 8.9589 | 0.1106 | | | | −25.6711 |
| S18 | Spherical | Infinite | 3.5000 | 1.52 | 64.2 | | |
| S19 | Spherical | Infinite | 3.5000 | 1.52 | 64.2 | | |
| S20 | Spherical | Infinite | 1.5899 | | | | |
| S21 | Spherical | Infinite | 0.2100 | 1.52 | 64.2 | | |
| S22 | Spherical | Infinite | 3.6928 | | | | |
| S23 | Spherical | Infinite | | | | | |

TABLE 20

| Surface number | A4 | A6 | A8 | A10 | A12 | A14 | A16 | A18 | A20 |
|---|---|---|---|---|---|---|---|---|---|
| S4 | −7.1707E−03 | 7.5338E−03 | −5.4690E−05 | −3.2930E−05 | −6.3922E−05 | −1.4440E−04 | −9.9177E−05 | −6.2924E−05 | −1.1445E−05 |
| S5 | −1.5064E−01 | 2.4246E−02 | −3.1054E−03 | 2.5195E−03 | 6.5580E−04 | 4.5659E−04 | 3.6438E−04 | 2.7040E−04 | 1.1053E−04 |
| S6 | 4.9831E−02 | −4.7828E−03 | 3.6659E−04 | 1.4888E−03 | 4.4194E−04 | 6.9786E−04 | 3.7131E−04 | 3.0241E−04 | 3.3926E−05 |
| S7 | 7.9758E−02 | −5.9381E−03 | −2.3776E−04 | 1.2862E−03 | 3.5454E−04 | 7.4833E−04 | 3.2708E−04 | 2.1274E−04 | −6.5676E−05 |
| S8 | −1.5241E−01 | 1.9529E−02 | −5.2011E−03 | 2.6190E−03 | −7.8094E−04 | −3.3617E−04 | −1.0571E−04 | 1.0983E−05 | −2.0859E−05 |
| S9 | 1.8956E−02 | −1.0618E−02 | 4.2533E−03 | 5.9042E−05 | 2.5124E−04 | −8.3788E−04 | −4.1313E−04 | −9.8086E−05 | 2.2466E−04 |
| S10 | 1.2007E−02 | −6.1423E−03 | 2.0646E−03 | −1.7147E−03 | 2.0996E−03 | 2.1510E−04 | −1.6192E−04 | −1.5309E−04 | 1.5048E−04 |
| S11 | −5.6466E−02 | 2.1179E−02 | −3.8977E−03 | 6.4186E−04 | 1.5328E−03 | 1.7345E−04 | −8.7393E−05 | −3.0305E−05 | 3.5304E−05 |
| S12 | 2.2696E−01 | −7.8502E−03 | 4.8319E−03 | 2.1275E−03 | −5.2240E−05 | −1.1037E−04 | −7.4323E−06 | −5.5764E−05 | −1.3056E−05 |

TABLE 20-continued

| Surface number | A4 | A6 | A8 | A10 | A12 | A14 | A16 | A18 | A20 |
|---|---|---|---|---|---|---|---|---|---|
| S13 | 1.9620E−01 | −1.5442E−02 | 3.7593E−03 | 1.5660E−03 | 3.7591E−05 | 4.7818E−05 | 1.0764E−04 | −5.4917E−05 | −2.6408E−05 |
| S14 | −1.5300E−02 | 3.0723E−02 | −9.2226E−03 | 6.7833E−04 | 8.4767E−04 | 2.4262E−04 | 3.1341E−05 | −6.7449E−05 | −4.5773E−05 |
| S15 | 2.5580E−01 | 4.6155E−02 | −5.5932E−03 | 2.7083E−04 | 3.4194E−04 | −2.9520E−04 | −1.3569E−04 | 2.4751E−05 | −9.9002E−06 |
| S16 | 7.8836E−01 | −1.9571E−02 | −5.5140E−04 | −1.2357E−03 | −5.0029E−04 | −5.3490E−04 | −2.6835E−04 | −4.9014E−06 | 3.4622E−07 |
| S17 | 5.4720E−01 | −5.2478E−02 | 1.4863E−03 | −8.9455E−04 | −5.5039E−04 | −3.3484E−04 | −9.8935E−05 | 9.3598E−07 | −1.9921E−05 |

Figure 21A:
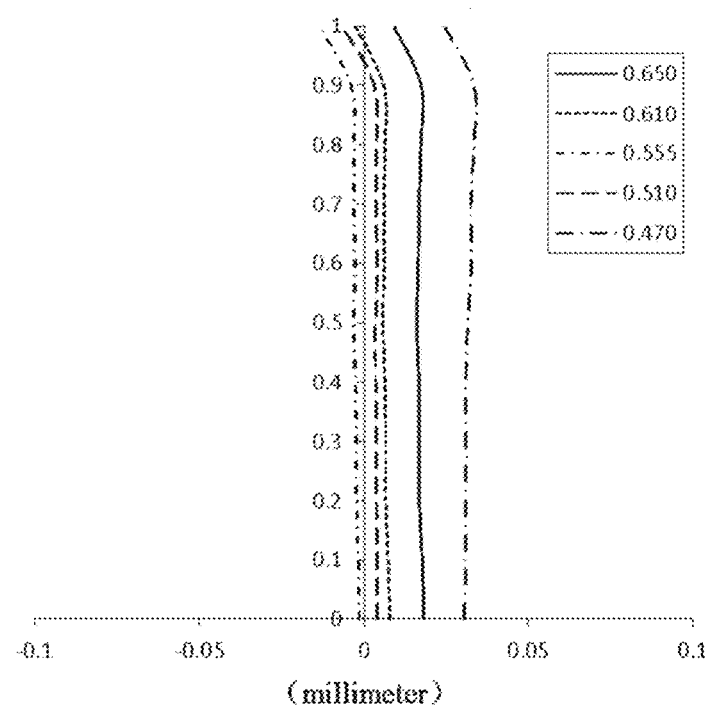
FIGS. 21A-21D show a longitudinal aberration curve, an astigmatism curve, a distortion curve and a lateral color curve of an optical imaging system according to Embodiment 10 respectively.
Figure 21B:
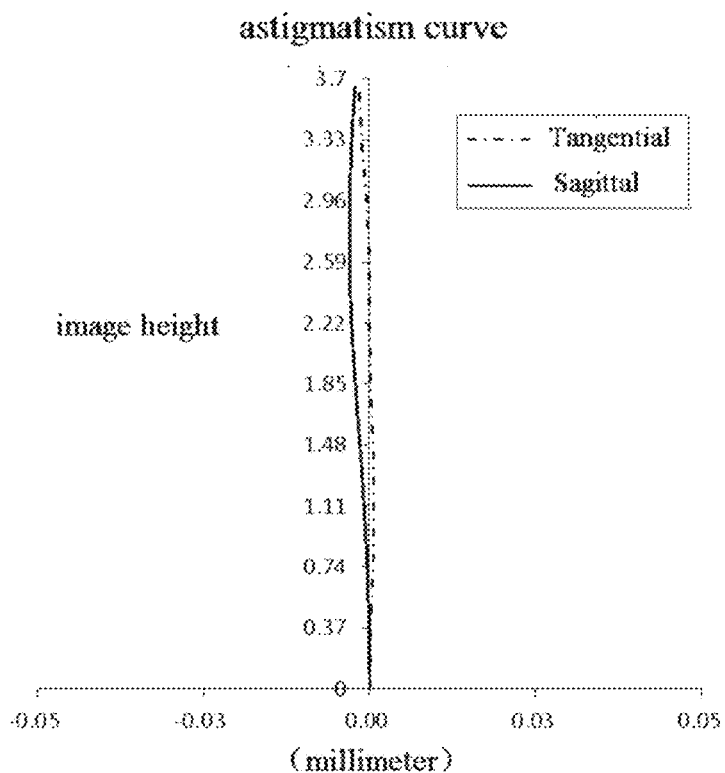
Figure 21C:
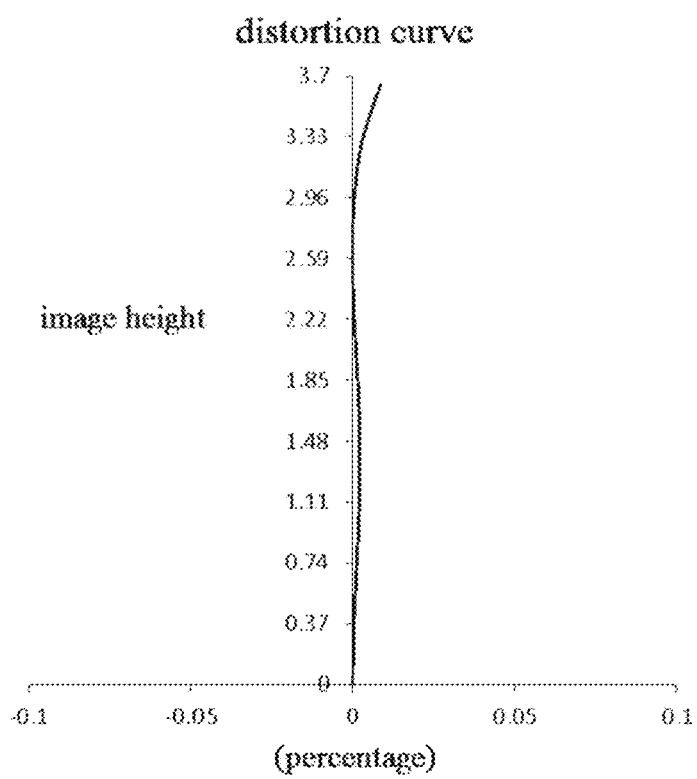
Figure 21D:
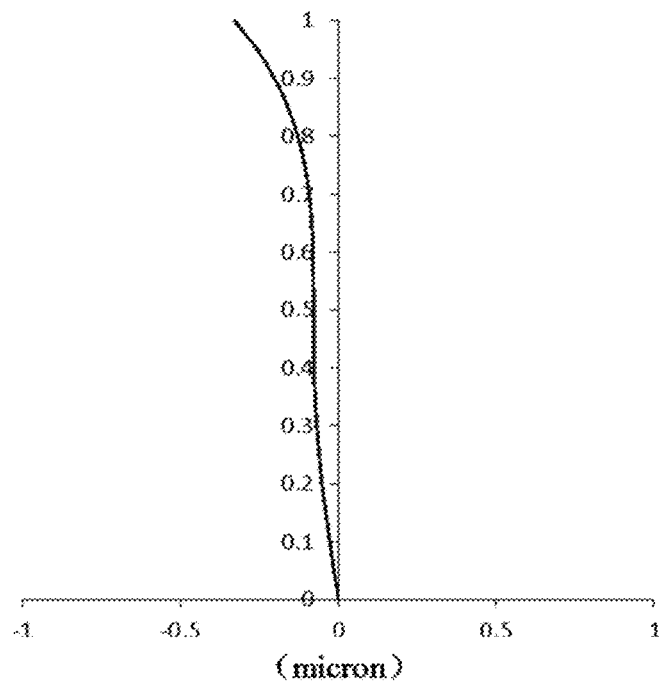
Figure 22J:
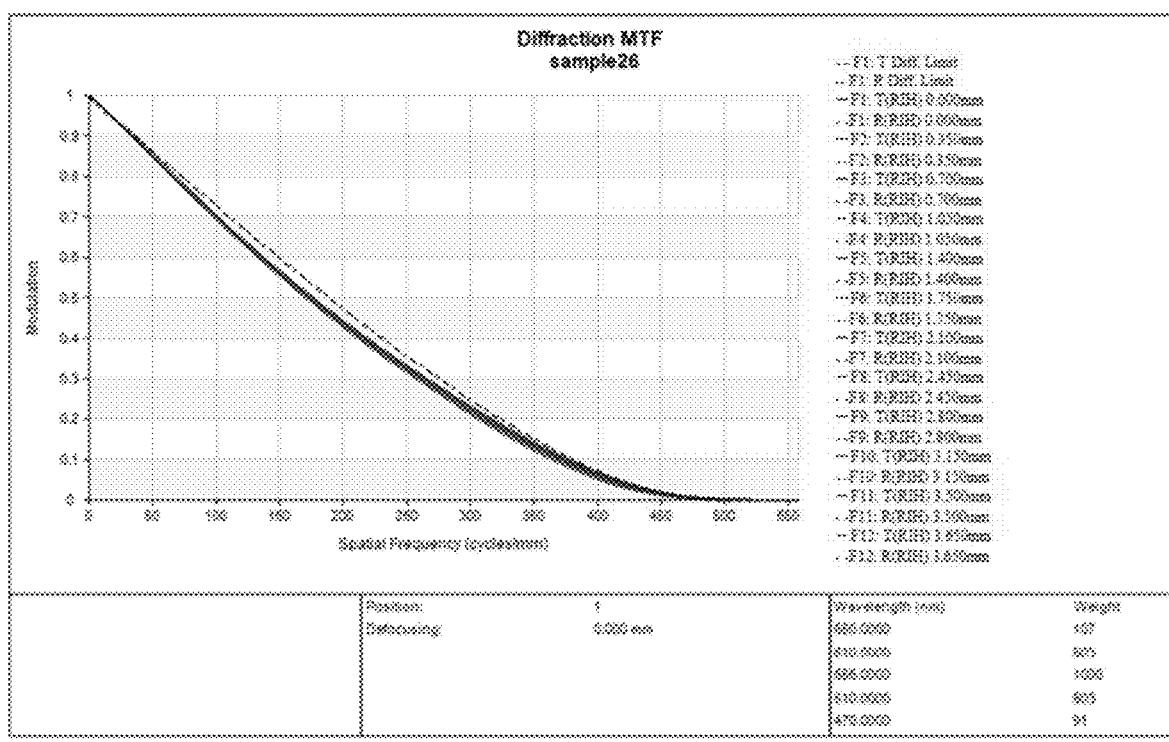

FIG. 21A shows a longitudinal aberration curve of the optical imaging system according to Embodiment 10 to represent deviations of a convergence focal point after light with different wavelengths passes through the lens. FIG. 21B shows an astigmatism curve of the optical imaging system according to Embodiment 10 to represent a tangential image surface curvature and a sagittal image surface curvature. FIG. 21C shows a distortion curve of the optical imaging system according to Embodiment 10 to represent distortion values corresponding to different image heights. FIG. 21D shows a lateral color curve of the optical imaging system according to Embodiment 10 to represent deviations of different image heights on the imaging surface after the light passes through the lens. FIG. 22J shows a MTF curve of the optical imaging system according to Embodiment 10 to represent variations of a modulation degree with a spatial frequency. According to FIGS. 21A-21D and FIG. 22J, it can be seen that the optical imaging system provided in Embodiment 10 may achieve high imaging quality.

From the above, Embodiment 1 to Embodiment 10 satisfy a relationship shown in Table 21 respectively.

TABLE 21

| Conditional expression | Embodiment | | | | | | | | | |
|---|---|---|---|---|---|---|---|---|---|---|
| | 1 | 2 | 3 | 4 | 5 | 6 | 7 | 8 | 9 | 10 |
| TTLz/f | 0.55 | 0.56 | 0.56 | 0.55 | 0.54 | 0.55 | 0.55 | 0.55 | 0.57 | 0.56 |
| \|Dist\| | 0.02 | 0.01 | 0.03 | 0.01 | 0.06 | 0.02 | 0.02 | 0.04 | 0.01 | 0.01 |
| f1/f4 | 0.44 | 0.40 | 0.80 | 0.40 | 0.40 | 0.41 | 0.35 | 0.47 | 0.44 | 0.43 |
| (f2 + f6)/f7 | 0.88 | 0.81 | 0.78 | 0.84 | 1.46 | 1.22 | 0.90 | 0.96 | 0.83 | 0.76 |
| R1/(R3 − R4) | 0.86 | 0.57 | 0.65 | 0.92 | 0.85 | 0.85 | 0.88 | 0.98 | 0.84 | 0.97 |
| R6/R7 | 0.82 | 0.76 | 0.92 | 1.22 | 1.03 | 0.97 | 0.82 | 0.95 | 0.84 | 0.87 |
| R14/f | 0.69 | 0.37 | 0.48 | 0.45 | 0.51 | 0.82 | 0.55 | 0.54 | 0.54 | 0.36 |
| ΣCT/PL1 | 0.70 | 0.83 | 0.77 | 0.76 | 0.73 | 0.71 | 0.70 | 0.71 | 0.70 | 0.82 |
| ΣAT/PL2 | 0.66 | 0.52 | 0.62 | 0.61 | 0.63 | 0.68 | 0.67 | 0.67 | 0.62 | 0.53 |
| CT6/(CT1 + CT7) | 0.51 | 0.45 | 0.52 | 0.53 | 0.44 | 0.47 | 0.48 | 0.26 | 0.44 | 0.52 |
| (CT4 + CT5)/T45 | 0.79 | 1.25 | 1.03 | 0.95 | 0.85 | 0.80 | 0.79 | 1.45 | 0.79 | 1.19 |
| f/EPD | 3.50 | 3.50 | 3.50 | 3.50 | 3.50 | 3.50 | 3.50 | 3.50 | 3.50 | 3.80 |

The disclosure also provides an imaging device, which is provided with an electronic photosensitive element for imaging. The electronic photosensitive element may be a Charge-Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the above-mentioned optical imaging system.

The above description is only description about the preferred embodiments of the disclosure and adopted technical principles. It is understood by those skilled in the art that the scope of protection involved in the disclosure is not limited to the technical solutions formed by specifically combining the technical characteristics and should also cover other technical solutions formed by freely combining the technical characteristics or equivalent characteristics thereof without departing from the concept of the disclosure, for example, technical solutions formed by mutually replacing the characteristics and (but not limited to) the technical characteristics with similar functions disclosed in the disclosure.

What is claimed is:

1. An optical imaging system, having a first optical axis, a second optical axis perpendicular to the first optical axis and a third optical axis perpendicular to the second optical axis, wherein the first optical axis is parallel to the third optical axis, the optical imaging system comprises:
   a first imaging lens group, arranged along the first optical axis and comprising a first refraction optical element configured to deflect light entering along a direction of the first optical axis to be propagated along a direction of the second optical axis;
   a second imaging lens group, sequentially comprising from an object side to an image side along the second optical axis: a first lens, a second lens, a third lens, a fourth lens, a fifth lens, a sixth lens and a seventh lens with refractive power respectively; and
   a third imaging lens group, arranged along the third optical axis and comprising a second refraction optical element configured to deflect light entering along the direction of the second optical axis to be propagated along a direction of the third optical axis;
   wherein TTLz is a distance from an object-side end of the first imaging lens group to an imaging surface of the optical imaging system in a direction parallel to the direction of the third optical axis, and TTLz and a total effective focal length f of the optical imaging system satisfy TTLz/f<0.7.

2. The optical imaging system according to claim 1, wherein an optical distortion Dist of the optical imaging system satisfies |Dist|<0.1%.

3. The optical imaging system according to claim 1, wherein an effective focal length f1 of the first lens and an effective focal length f4 of the fourth lens satisfy 0<f1/f4<1.0.

4. The optical imaging system according to claim 1, wherein an effective focal length f2 of the second lens, an effective focal length f6 of the sixth lens and an effective focal length f7 of the seventh lens satisfy $0.5<(f2+f6)/f7<2.0$.

5. The optical imaging system according to claim 1, wherein the first refraction optical element is a first prism, and the second refraction optical element is a second prism.

6. The optical imaging system according to claim 5, wherein ΣCT is a sum of thicknesses of any lens in the first lens to the seventh lens on the second optical axis, PL1 is a sum of a thickness of the first prism on the first optical axis and a thickness of the first prism on the second optical axis, and ΣCT and PL1 satisfy $0.5<\Sigma CT/PL1<1.0$.

7. The optical imaging system according to claim 5, wherein ΣAT is a sum of spacing distances of any two adjacent lenses in the first lens to the seventh lens on the second optical axis, PL2 is a sum of a thickness of the second prism on the second optical axis and a thickness of the second prism on the third optical axis, and ΣAT and PL2 satisfy $0.3<\Sigma AT/PL2<0.8$.

8. The optical imaging system according to claim 1, wherein a curvature radius R1 of an object-side surface of the first lens, a curvature radius R3 of an object-side surface of the second lens and a curvature radius R4 of an image-side surface of the second lens satisfy $0.3<R1/(R3-R4)<1.3$.

9. The optical imaging system according to claim 1, wherein a curvature radius R6 of an image-side surface of the third lens and a curvature radius R7 of an object-side surface of the fourth lens may satisfy $0.5<R6/R7<1.5$.

10. The optical imaging system according to claim 1, wherein a curvature radius R14 of an image-side surface of the seventh lens and the total effective focal length f of the optical imaging system may satisfy $0<R14/f<1.0$.

11. The optical imaging system according to claim 1, wherein a center thickness CT1 of the first lens on the second optical axis, a center thickness CT6 of the sixth lens on the second optical axis and a center thickness CT7 of the seventh lens on the second optical axis may satisfy $0<CT6/(CT1+CT7)<1.0$.

12. The optical imaging system according to claim 1, wherein a center thickness CT4 of the fourth lens on the second optical axis, a center thickness CT5 of the fifth lens on the second optical axis and a spacing distance T45 of the fourth lens and the fifth lens on the second optical axis may satisfy $0.6<(CT4+CT5)/T45<1.6$.

13. The optical imaging system according to claim 1, wherein
the first lens has a positive refractive power, and an object-side surface thereof is a convex surface;
the second lens has a negative refractive power;
an image-side surface of the third lens is a concave surface;
the fourth lens has a positive refractive power, and an object-side surface thereof is a convex surface; and
an image-side surface of the seventh lens is a concave surface.

14. An optical imaging system, having a first optical axis, a second optical axis perpendicular to the first optical axis and a third optical axis perpendicular to the second optical axis, wherein the first optical axis is parallel to the third optical axis, the optical imaging system comprises:
a first imaging lens group, arranged along the first optical axis and comprising a first refraction optical element configured to deflect light entering along a direction of the first optical axis to be propagated along a direction of the second optical axis;
a second imaging lens group, sequentially comprising, from an object side to an image side along the second optical axis, a first lens, a second lens, a third lens, a fourth lens, a fifth lens, a sixth lens and a seventh lens with refractive power respectively; and
a third imaging lens group, arranged along the third optical axis and comprising a second refraction optical element configured to deflect light entering along the direction of the second optical axis to be propagated along a direction of the third optical axis;
wherein an optical distortion Dist of the optical imaging system satisfies $|Dist|<0.1\%$.

15. The optical imaging system according to claim 14, wherein an effective focal length f1 of the first lens and an effective focal length f4 of the fourth lens may satisfy $0<f1/f4<1.0$.

16. The optical imaging system according to claim 15, wherein TTLz is a distance from an object-side end of the first imaging lens group to an imaging surface of the optical imaging system in a direction parallel to the direction of the third optical axis, and TTLz and a total effective focal length f of the optical imaging system may satisfy $TTLz/f<0.7$.

17. The optical imaging system according to claim 14, wherein an effective focal length f2 of the second lens, an effective focal length f6 of the sixth lens and an effective focal length f7 of the seventh lens may satisfy $0.5<(f2+f6)/f7<2.0$.

18. The optical imaging system according to claim 14, wherein the first refraction optical element is a first prism, and the second refraction optical element is a second prism.

19. The optical imaging system according to claim 18, wherein ΣCT is a sum of thicknesses of any lens in the first lens to the seventh lens on the second optical axis, PL1 is a sum of a thickness of the first prism on the first optical axis and a thickness of the first prism on the second optical axis, and ΣCT and PL1 may satisfy $0.5<\Sigma CT/PL1<1.0$.

20. The optical imaging system according to claim 18, wherein ΣAT is a sum of spacing distances of any two adjacent lenses in the first lens to the seventh lens on the second optical axis, PL2 is a sum of a thickness of the second prism on the second optical axis and a thickness of the second prism on the third optical axis, and ΣAT and PL2 may satisfy $0.3<\Sigma AT/PL2<0.8$.

* * * * *